United States Patent
Nakamura et al.

(10) Patent No.: US 7,013,477 B2
(45) Date of Patent: Mar. 14, 2006

(54) BROADCAST RECEIVER, BROADCAST CONTROL METHOD, AND COMPUTER READABLE RECORDING MEDIUM

(75) Inventors: Yasufumi Nakamura, Kawasaki (JP); Tetsunori Ito, Inagi (JP)

(73) Assignee: Fujitsu Limited, Kawasaki (JP)

( * ) Notice: Subject to any disclaimer, the term of this patent is extended or adjusted under 35 U.S.C. 154(b) by 992 days.

(21) Appl. No.: 09/777,900

(22) Filed: Feb. 7, 2001

(65) Prior Publication Data

US 2001/0051516 A1    Dec. 13, 2001

(30) Foreign Application Priority Data

May 25, 2000    (JP)    ............... 2000-155256

(51) Int. Cl.
*H04N 7/025*    (2006.01)
*H04N 7/10*    (2006.01)

(52) U.S. Cl. ........................................... 725/32

(58) Field of Classification Search ............ 725/32–36, 725/40–44, 59; 345/700, 723; 348/563–568
See application file for complete search history.

(56) References Cited

U.S. PATENT DOCUMENTS

| | | | |
|---|---|---|---|
| 5,852,474 A | | 12/1998 | Nakagaki et al. |
| 5,973,723 A | * | 10/1999 | DeLuca ........................ 725/34 |
| 6,035,341 A | * | 3/2000 | Nunally et al. .............. 709/253 |
| 6,100,941 A | * | 8/2000 | Dimitrova et al. ........... 348/700 |
| 6,219,837 B1 | * | 4/2001 | Yeo et al. ...................... 725/38 |
| 6,236,395 B1 | * | 5/2001 | Sezan et al. ................. 345/723 |
| 6,577,346 B1 | * | 6/2003 | Perlman ...................... 348/460 |
| 2002/0176689 A1 | * | 11/2002 | Heo et al. ...................... 386/46 |

FOREIGN PATENT DOCUMENTS

| | | |
|---|---|---|
| DE | 44 23 748 A1 | 1/1996 |
| EP | 0 366 001 A2 | 5/1990 |
| EP | 0 804 028 A1 | 10/1997 |
| EP | 0 929 197 A2 | 7/1999 |
| JP | A-5-316440 | 11/1993 |
| JP | A-6-14274 | 1/1994 |
| JP | A-7-264529 | 10/1995 |
| JP | A-9-65287 | 3/1997 |
| JP | A-11-146296 | 5/1999 |

OTHER PUBLICATIONS

Communication dated Aug. 27, 2003 including European Search Report.

* cited by examiner

*Primary Examiner*—Vivek Srivastava
(74) *Attorney, Agent, or Firm*—Staas & Halsey LLP

(57) ABSTRACT

A broadcast receiver is provided. This broadcast receiver is capable of preventing the problem of an audience losing interest in broadcasted program, even during a CM (commercial message) broadcasting time range contained in this broadcast program, and without requiring the audience to not perform a zapping operation. In the broadcast receiver according to the present invention, a single set of highlight scene, or plural sets of highlight scenes, are detected from a broadcast program provided to the audience, and then stored in a storage device. Thereafter, when a CM broadcast program is commenced, the highlight scene is read out from the storage device and is reproduced.

54 Claims, 36 Drawing Sheets

FIG. 3

| STARTING TIME INSTANT | STARTING ADDRESS | END TIME INSTANT | END ADDRESS | LENGTH |
|---|---|---|---|---|
| 10:00:00 | a000 | 10:04:00 | a004 | 00:04:00 |
| 10:10:20 | a102 | 10:12:59 | a125 | 00:02:39 |
| 10:16:15 | a161 | 10:24:30 | a243 | 00:08:15 |
| 10:33:10 | a331 | 10:38:09 | a380 | 00:04:59 |
| ... | | ... | | ... |

| STARTING TIME INSTANT | STARTING ADDRESS | END TIME INSTANT | END ADDRESS | LENGTH |
|---|---|---|---|---|
| 10:13:00 | a130 | 10:15:00 | a150 | 00:02:00 |
| 10:28:00 | a280 | 10:30:00 | a300 | 00:02:00 |
| 10:43:00 | a430 | 10:45:00 | a450 | 00:02:00 |
| ... | | ... | | ... |

| STARTING TIME INSTANT | STARTING ADDRESS | END TIME INSTANT | END ADDRESS | LENGTH | WEIGHT |
|---|---|---|---|---|---|
| 10:00:00 | a000 | 10:04:00 | a004 | 00:04:00 | 10 |
| 10:10:20 | a102 | 10:12:59 | a125 | 00:02:39 | 8 |
| 10:16:15 | a161 | 10:24:30 | a243 | 00:08:15 | 4 |
| 10:33:10 | a331 | 10:38:09 | a380 | 00:04:59 | 7 |
| ... | | ... | | ... | |

| STARTING TIME INSTANT | STARTING ADDRESS | END TIME INSTANT | END ADDRESS | LENGTH | GENRE |
|---|---|---|---|---|---|
| 10:00:00 | a000 | 10:04:00 | a004 | 00:04:00 | 10 |
| 10:10:20 | a102 | 10:12:59 | a125 | 00:02:39 | 8 |
| 10:16:15 | a161 | 10:24:30 | a243 | 00:08:15 | 4 |
| 10:33:10 | a331 | 10:38:09 | a380 | 00:04:59 | 7 |
| ... | | ... | | ... | |

| GENRE | TASTE DEGREE |
|---|---|
| 1 | 10 |
| 2 | 2 |
| 3 | 5 |
| 4 | 6 |
| ... | ... |

BROADCAST RECEIVER, BROADCAST CONTROL METHOD, AND COMPUTER READABLE RECORDING MEDIUM

BACKGROUND OF THE INVENTION

1. Field of the Invention

The present invention generally relates to a broadcast receiver, a broadcast control method, and a computer readable recording medium. More specifically, the present invention is directed to a broadcast receiver and a broadcast control method, which are capable of effectively utilizing CM broadcasting time (commercial broadcasting time) within a broadcasting program, and also directed to a recording medium for recording thereon a computer readable program used to execute the broadcast control method.

2. Description of the Related Art

Very recently, various sorts of broadcasting networks appear in addition to the normally available television broadcasting system using the ground waves, known as cable television broadcasting systems and BS/CS satellite broadcasting systems using satellites. As a result, possibilities capable of selecting desirable programs are increased with respect to audiences. Also, the analog TV broadcasting systems such as the presently available ground wave TV broadcasting system will be replaced by the digital TV broadcasting systems such as the CS broadcasting system. Both the BS broadcasting systems and the ground wave broadcasting systems are to be replaced by the digital TV broadcasting systems in near future.

In near future, a watching style called a "time shift watching (listening/viewing) style" may be executed to constitute a general-purpose watching style, as large low cost capacities of random-accessible storage media (e.g., hard disks) are greatly realized and digital broadcasting systems substitute analog broadcasting systems.

The time shift watching style implies a style according to which random access media constituted in a logically-ring-shaped form are prepared as a buffer for temporarily storing reception data thereinto, and an audience watches a broadcast program while broadcast data received when the broadcast program is received is temporarily stored into the random access media. Since broadcast program data corresponding to the storage capacities of the random access media are saved therein, trick plays such as seek, pause, and replay operations may be realized at arbitrary timing within a watching broadcasting program by accessing this program data at random.

In receivers capable of realizing the time shift watching style, audiences may repeatedly view so-far-missed scenes. Also, even in such a case that a telephone call is made while an audience watches a broadcast program and/or a visiter suddenly comes so that the audience leaves from the present location to another location, if the present time is defined within a remaining storage capacity of random access media, then the audience may temporarily stop watching of the program, and after the audience finishes the subject matter, the audience again may restart watching of the interrupted program content.

Japanese Patent Application Laid-open No. Hei 6-14274 discloses the technique of the television receiver capable of realizing the time shift watching style, and also Japanese Patent Application Laid-open Hei 7-264529 describes the technique of such an apparatus capable of realizing the time shift watching style.

FIG. 38 is a diagram for representing a relationship between address positions and reproducing time of writing operation and reading operation with respect to a disk which is used as a buffer (will be referred to as a "buffer disk") when the time shift watching style is performed.

Since a broadcast receiver receives broadcast data in a constant bit rate, a data writing rate with respect to a buffer disk is constant. As a result, as indicated by a dotted line in FIG. 38, a relationship between time and an address during writing operation becomes a straight line. Accordingly, since broadcast data is read out from the buffer disk at the same rate as the write rate, broadcast data can be reproduced in the normal speed. Symbols "t0" to "t2" shown in FIG. 38 correspond to broadcast data reproduction in the normal speed.

In such a case that an audience again wishes to watch a broadcast program from the beginning portion thereof at the time instant "t2" shown in FIG. 38, a position of an address "a0" is sought to set a read address. Thereafter, if the broadcast data is read at the normal speed rate, then the audience can again watch this broadcast program from the beginning portion thereof.

In such a case that the audience wants to reproduce the broadcast data in the fast forward mode in the time shift watching style, the read rate is set to become higher than the normal rate. This corresponds to the time instants "t2" to "t3" shown in FIG. 38. During the time period, the inclination of the straight line becomes larger than that when the reproduction is performed in the normal speed.

Symbols "t3" to "t6" shown in FIG. 38 represent that the broadcast data is reproduced under time shift condition and also in the normal speed. This is called an offset watching style. In this offset watching style, a straight line of a writing rate and also a straight line of a reading rate in FIG. 38 become in parallel to each other. In this case, a delay from the actual broadcasting time instant is equal to (t3−t1), since a scene which has been broadcasted at the time instant "t1" is watched at a time instant "t3".

In the case of such a receiver which supports a reverse reproducing operation, when the broadcast data is reverse-reproduced, it becomes time instants "t6" to "t7" shown in FIG. 38. Since the broadcast data is read from the read address in the reverse direction, the read address is decreased while time has passed. The inclination of the straight line becomes a negative value.

When the audience pauses at a certain position while the broadcast data is reproduced, as shown in symbols "t7" to "t8" of FIG. 38, there is no change in the position of the read address a3, but only time is changed from the time instant "t7" to the time instant "t8." Thereafter, in order to catch up the real-time broadcast program, the write address is made equal to the read address. In FIG. 38, at the time instant "t8", the real-time broadcast program can be caught up. Subsequently, the audience can watch the program identical to the real-time broadcast.

Apparently, since future reception data which has not yet been stored cannot be read out from the buffer disk, a solid line which indicates a change in reading time cannot be located above a dotted line which represents a change in writing time.

As actions of audiences, a so-called "zapping action (zapping operation)" is usually carried out by these audiences. In this zapping action, when a commercial message (CM) program is commenced and this CM program has no direct relationship with a broadcast program which is being watched by an audience, this audience successively changes broadcast channels in order to seek other favorable programs. Various technical ideas capable of supporting this zapping action have been proposed.

Japanese Patent Application Laid-open No. Hei 5-316440 discloses the following technique of the TV receiver. That is, while the CM program contained in the broadcast program is detected from the speech control signal of the receiving broadcasting system, this TV receiver automatically switches this receiving broadcasting channel to other broadcasting channel, or a previously-registered specific channel. Furthermore, this patent application discloses such a technical idea that even after the present broadcasting channel has been changed into another broadcasting channel, the original broadcasting channel is kept under reception condition. At the time instant when the CM program of the original broadcasting program is ended, the television receiver is automatically returned to the original broadcasting channel.

As to such a technical point that another information is viewed during CM broadcasting, Japanese Patent Application Laid-open No. Hei 11-146296 discloses the technical idea capable of automatically displaying the image information such as the Internet home page while the CM program is detected. Also, this patent application describes that as the information provided instead of the CM program, the retrieved results obtained from the various sorts of information database which are stored in the CD-ROM and the like are exemplified in addition to the Internet home page.

In order to recognize a certain scene contained in a picture (video image) as a highlight scene, such a tag which may indicate "highlight scene" must be added. A tag may be realized by previously adding tag data when broadcast data is transmitted on the side of a transmission station. Alternatively, a tag may be added on the side of a receiver. There are two tag adding methods executed on the side of the receiver, namely a manual tag adding method and an automatic tag adding method. Since such a tag indicative of "highlight scene" is added to broadcast data, there are such merits that saved pictures may be simply retrieved, and contents of saved pictures may be grasped in short time.

Various retrieving methods have been proposed as to an automatic highlight scene retrieving method. For example, Japanese Patent Application Laid-open No. Hei 9-65287 discloses the technique of the featured scene listing method. That is, while the specific picture effect called a "desolve" contained in the broadcast program is sensed, the scene representative of the moving picture is specified.

However, the above-explained conventional techniques own the below-mentioned problems. That is, the audience is normally under relax condition while the audience watches the broadcast program at his home. Under such a circumstance, the audience never performs the time shift watching style unless there is such a specific reason that the program watching action by the audience is disturbed by the telephone call and/or the visitor. Also, in the conventional technique, the audience must issue such an instruction by himself, namely, a chance to replay a program watched in a real time mode in a half way.

The reasons why the zapping operation is carried out by audiences are mainly given as follows:

(1). In such a case that an audience does not have a clear decision on the next program after a presently watched broadcast program is ended, this audience owns a necessary and positive reason directed to a program search, namely the audience roughly checks all of presently watchable programs and then searches a favorable program.

(2). An audience owns such a passive reason: When the audience thinks a waste of time if the audience merely watches a CM program, this audience tries to search another channel program. Namely the presently watched CM program is replaced by the favorable broadcast program.

(3). An audience owns a positive reason without any necessity: Since this audience cannot be satisfied with the presently watched program, the audience tries to search the more enjoyable program.

(4). A reason is established by combining the above-explained reasons (1) to (3).

Generally speaking, such a zapping operation becomes effective in such a case that an audience can find out more favorable program in another channel, as compared with the presently watched program. However, there are many possibilities that while a CM program is broadcasted in a certain channel, CM programs are similarly broadcasted in other channel. Finally, since the audience could not find out his favorable program in another channel, this audience is returned to the originally watched program. Moreover, when the audience is returned to the original channel, there are many chances that the CM broadcast has already been accomplished, and therefore, this audience looses a head portion of a broadcast program after this CM broadcast is accomplished.

Also, since the zapping operation is required to perform the remote control many times, this remote control operation may cause very cumbersome operations for the audience. In the case that all of channels are not always free channels, but some channels are paid-channels, if an audience performs the zapping operation under careless condition, then the audience mistakenly watches such a paid-channel program, which may cause unnecessary expense.

When the conventional technique disclosed in Japanese Patent Application Laid-open No. Hei 5-316440 is used (namely, CM program is automatically detected to change present channel into another channel), the cumbersome manual operation required in the zapping operation can be eliminated. However, this conventional technique could not solve other difficulties. That is, the CM programs are similarly broadcasted in other channels, and/or no other favorable programs are broadcasted in other channels.

On the other hand, when the conventional technique disclosed in Japanese Patent Application Laid-open No. Hei 11-146296 is used (namely, other image information is displayed while CM program is broadcasted), the purpose for the CM program substitution (namely, audience watches information other than CM program) can be achieved. However, this conventional technique cannot meet such a requirement that the audience wishes to watch once again the highlight scene of the originally watched program by utilizing watching time for the CM program.

In general, a large number of CM programs are inserted into a time duration defined after a broadcast program is ended and before the next broadcast program is commenced. Also, spot news programs and weather forecast programs are inserted into this time duration. However, it is a waste of time when an audience watches the same news programs and weather forecast programs again which have been watched/known by this audience once already. As a consequence, the audience tries to change the presently watched channel to another channel. However, there are many occasions that news programs and/or weather forecast programs are similarly broadcasted in other channels at this channel change time. Therefore, the audience could not effectively utilize the time duration defined after one program is ended and before the next program is started, so that this audience may feel stress.

An object of the present invention is to provide a broadcast receiver, a broadcast control method, and also a recording medium for recording thereon a computer program, by which an audience can avoid loosing of his interests as to a content of a broadcast program even in a CM broadcasting time range contained in this broadcast program, while this audience no longer performs the zapping operation.

SUMMARY OF THE INVENTION

The present invention has been made to solve the above-described problems by employing the below-mentioned arrangements:

That is, a broadcast receiver, according to the present invention, is featured by comprising: a highlight scene detecting unit detecting a highlight scene of a broadcasted program; means for storing at least the detected highlight scene of the program into a storage device; a CM detecting unit detecting a CM (commercial message) broadcast program; and a reproducing control unit reproducing the highlight scene stored in the storage device while the CM program is broadcasted.

In the broadcast receiver of the present invention, the CM detecting unit includes a CM start detecting unit detecting a commencement of the CM broadcast; and when the CM broadcast is commenced, the reproduction of the highlight scene may be commenced.

In the present invention, a broadcast contains, for instance, a television broadcast and a radio broadcast. A broadcast receiver, according to the present invention, may be applied to a television broadcast receiver, a radio broadcast receiver (e.g., radio broadcasting system and/or radio-character broadcasting system) and the like.

Also, in the present invention, an "audience" involves both a person who watches a television broadcast program and a person (listener, or receiver) who listens to a radio broadcast program. A detection of a highlight scene may be realized as follows: A portion capable of satisfying a predetermined detection condition may be detected as a highlight scene by executing an image recognition process operation and/or a speech recognition process operation. Also, such a portion may be detected based upon an index contained in broadcast data, or in response to an instruction of an audience.

In accordance with the present invention, while an audience watches a broadcast program, when a CM program is commenced, the audience can watch a highlight scene of this broadcast program. In this way, the highlight scene of the broadcast program can be provided while the CM program is broadcasted. Thus, the audience need not perform the zapping operation which is carried out in the conventional broadcast receiver. Also, the present invention can avoid such a problem that the audience loses his interests and also his concentration with respect to the broadcast program which is being watched, which is derived from the fact that the audience mistakenly receives other information by watching the CM program and also by performing the zapping operation.

Also, the broadcast receiver, according to the present invention, may be arranged by such that the storage device stores thereinto a data portion of the broadcast data corresponding to a predetermined time duration at any time; and in such a case that when the CM broadcast is ended, the reproduction of the highlight scene has not yet accomplished, the reproducing control unit reproduces such broadcast data appeared just after the CM broadcast is ended after the reproduction of the highlight scene is reproduced. A term "broadcast data" involves picture (image) data and/or speech (voice) data related to a broadcast program, and furthermore, picture (image) data and/or speech (voice) data related to a CM program.

Also, the broadcast receiver, according to the present invention, may be arranged by that in such a case that when the broadcast data is reproduced, a next CM broadcast is commenced, if a time difference between a broadcast time instant and a reproduction time instant exceeds broadcast time of the next CM broadcast program, the reproducing control unit continues to reproduce the broadcast data without executing the reproduction of the highlight scene. A term "broadcast time instant" indicates a time instant elapsed in accordance with a broadcast program such as a television and a radio, whereas a term "reproducing time instant" indicates a time instant (actual time instant) when broadcast data stored in a storage device is reproduced.

Also, the broadcast receiver, according to the present invention, may have a structure such that the storage device stores thereinto a data portion of the broadcast data corresponding to a predetermined time duration at any time; and when the CM broadcast is commenced, the reproducing control unit reproduces as the highlight scene, a broadcast data portion which is stored in the storage device, and is defined from a time instant when the CM broadcast is started and until a preselected time duration is retraced.

Also, the broadcast receiver, according to the present invention, may have a structure such that the broadcast program contains first speech (voice) and second speech (voice); and the broadcast receiver is further comprised of: speech control means for providing any one of the first speech and the second speech when the broadcast program is provided in connection with a broadcast time instant; and also for providing the other speech between the first speech and the second speech when the highlight scene is reproduced.

Also, the broadcast receiver, according to the present invention, may be configured in such that the broadcast receiver is further comprised of: a highlight scene classifying unit classifying the highlight scenes stored in the storage device into plural sorts of classifications; and the reproducing control unit reads out such a highlight scene having a sort corresponding to a taste of an audience with having a top priority from the storage device to reproduce the read highlight in such a case that the CM broadcast is commenced.

Also, the broadcast receiver, according to the present invention, may have a structure such that the reproducing control unit reproduces any one of the highlight scene and a digest constituted of plural highlight scenes of a certain broadcast program during a time period defined after the certain broadcast program is ended and until a next broadcast program is commenced.

Further, a broadcast control method, according to the present invention, is featured by that a highlight scene of a broadcasted program is detected; at least the detected highlight scene of the program is stored into a storage device; a CM (commercial message) broadcast program is detected; and the highlight scene stored in the storage device while the CM program is broadcasted is reproduced.

Moreover, a computer readable recording medium for recording thereon a computer program, according to the present invention, is featured by such a recording medium for recording thereon a program used to cause a computer to execute: a step for detecting a highlight scene of a broadcasted program; a step for storing at least the detected highlight scene of the program into a storage device; a step for detecting a CM (commercial message) broadcast program; and a step for reproducing the highlight scene stored in the storage device while the CM program is broadcasted.

BRIEF DESCRIPTION OF THE DRAWINGS

Other objects and advantages of the present invention will become apparent during the following discussion in conjunction with the accompanying drawings, in which;

FIG. 3 is a diagram for explaining a highlight index storage unit of the broadcast receiver according to the first embodiment;

FIG. 4 is a diagram for explaining a CM index storage unit of the broadcast receiver according to the first embodiment;

FIG. 20 is a diagram for explaining a highlight index storage unit employed in a broadcast receiver according to an eighth embodiment of the present invention;

FIG. 27 is a diagram for explaining a highlight index storage unit employed in the broadcast receiver according to the 12th embodiment;

FIG. 28 is a diagram for explaining a user taste database employed in the broadcast receiver according to the 12th embodiment;

DETAILED DESCRIPTION OF THE PREFERRED EMBODIMENTS

Referring now to drawings, various embodiments of the present invention will be described in detail.

[First Embodiment]

Hardware Construction of Broadcast Receiver

Figure 1:
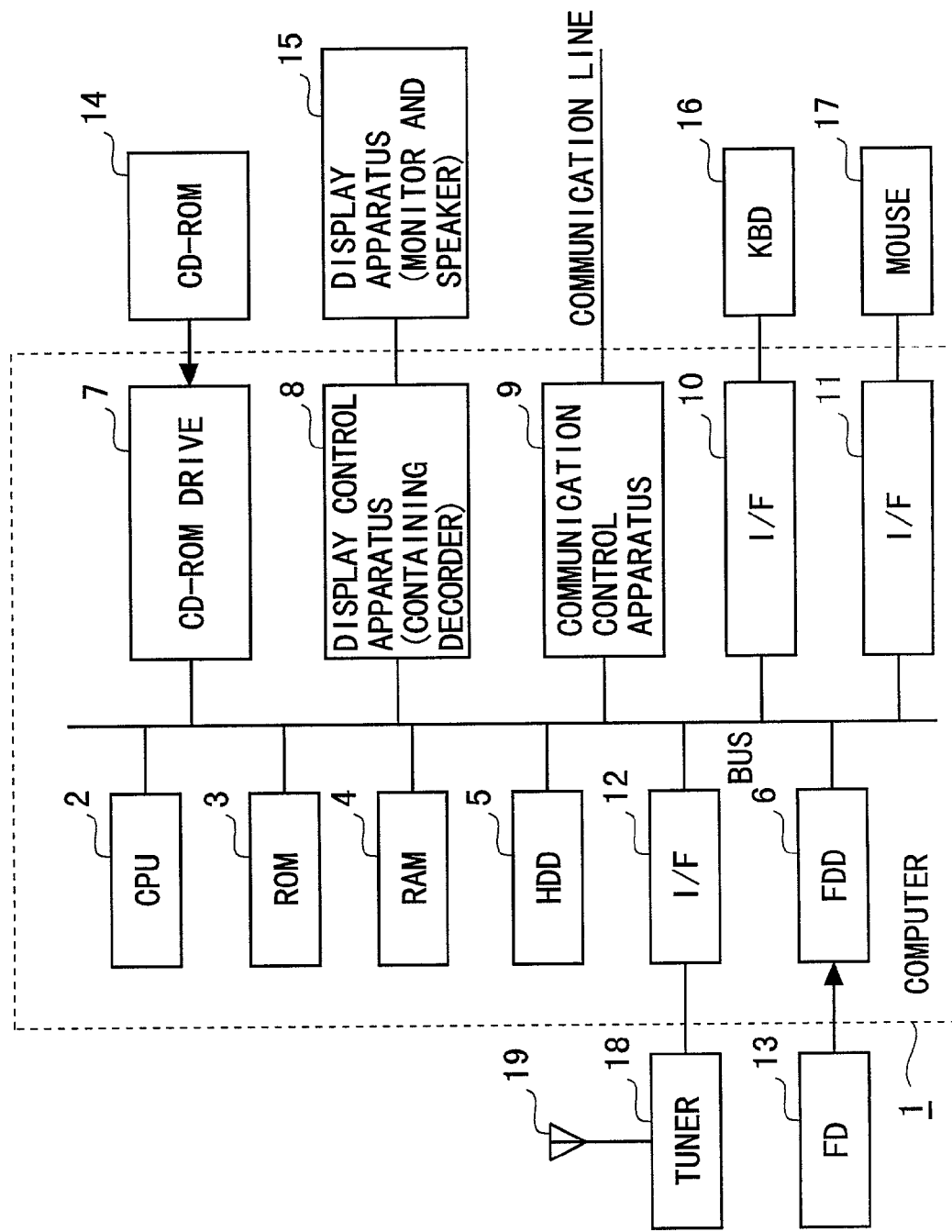
FIG. 1 schematically shows a hardware structure of a computer functioning as a broadcast receiver according to the present invention.

FIG. 1 is a hardware structural diagram of a computer 1 which may function as a broadcast receiver (will be simply referred to as a "receiver" hereinafter) according to the present invention, and may realize a broadcast control method according to the present invention. The computer 1 corresponds to, for instance, a personal computer, a workstation, and the like (so-called "TV-personal computer"), which is equipped with a digital television broadcasting reception function, and may function as a television broadcast receiver.

In FIG. 1, the computer 1 is provided with a CPU (Central Processing Unit) 2, a ROM (Read-Only Memory) 3, a RAM (Random Access Memory) 4, a hard disk (HD) 5, floppy disk drive (FDD) 6, a CD-ROM drive 7, a display control apparatus 8, a communication control apparatus 9, and a plurality of interface circuits (I/F) 10 to 12.

The ROM 3 previously stores thereinto an initiation program. The initiation program is executed by the CPU 2 when the power supply of the computer 1 is turned ON. As a result, both an operating system (OS) and either a single sort, or plural sorts of drive software (drivers) are loaded on the RAM 4, so that various sorts of process operations and control operations are brought into executable conditions. The single sort, or plural sorts of drivers and also the operating system, which have been previously stored in the hard disk HD 5, are used to execute a display process operation and a communication process operation.

Various sorts of computer programs for controlling the computer 1 are expanded to the RAM 4, and this RAM 4 is used as a work area of the CPU 2. As a result, the RAM 4 may save a process result by a computer program, such temporarily-processed data used to execute a process operation, and such display data used to display the process result and the like on the display screen on the display apparatus 15.

The display data expanded on the RAM 4 is transferred via the display control apparatus 8 to the display apparatus 15. Upon receipt of the display data, the display apparatus 15 displays a display content corresponding to the display data on the display screen thereof.

The HD 5 is a recording medium operable in such a manner that in response to an instruction issued from the CPU 2, this recording medium records thereon a program, control data, text data, image data, and the like. It should be noted that data/program read/write-operations with respect to this hard disk HD 5 are executed by a hard disk drive (not shown in detail).

The floppy disk drive FDD 6 corresponds to such a device used to execute either a read operation or a write operation with respect to a floppy disk (FD) 13. In response to an instruction issued from the CPU 2, this FDD 6 may read/write a program, control data, text data, image data, and the like with respect to the FD 13.

The CD-ROM drive 7 corresponds to such a device capable of reading a program and/or data previously recorded on a CD-ROM 14 in response to an instruction issued from the CPU 2. The CD-ROM 14 is such a read-only memory using a compact disk (CD).

The display apparatus 15 is connected to the display control apparatus 8. The display apparatus 15 is equipped with a monitor and a speaker used to output speech. The monitor is constructed of a cathode-ray tube (CRT), a liquid crystal display (LCD), and the like.

Figure 2:
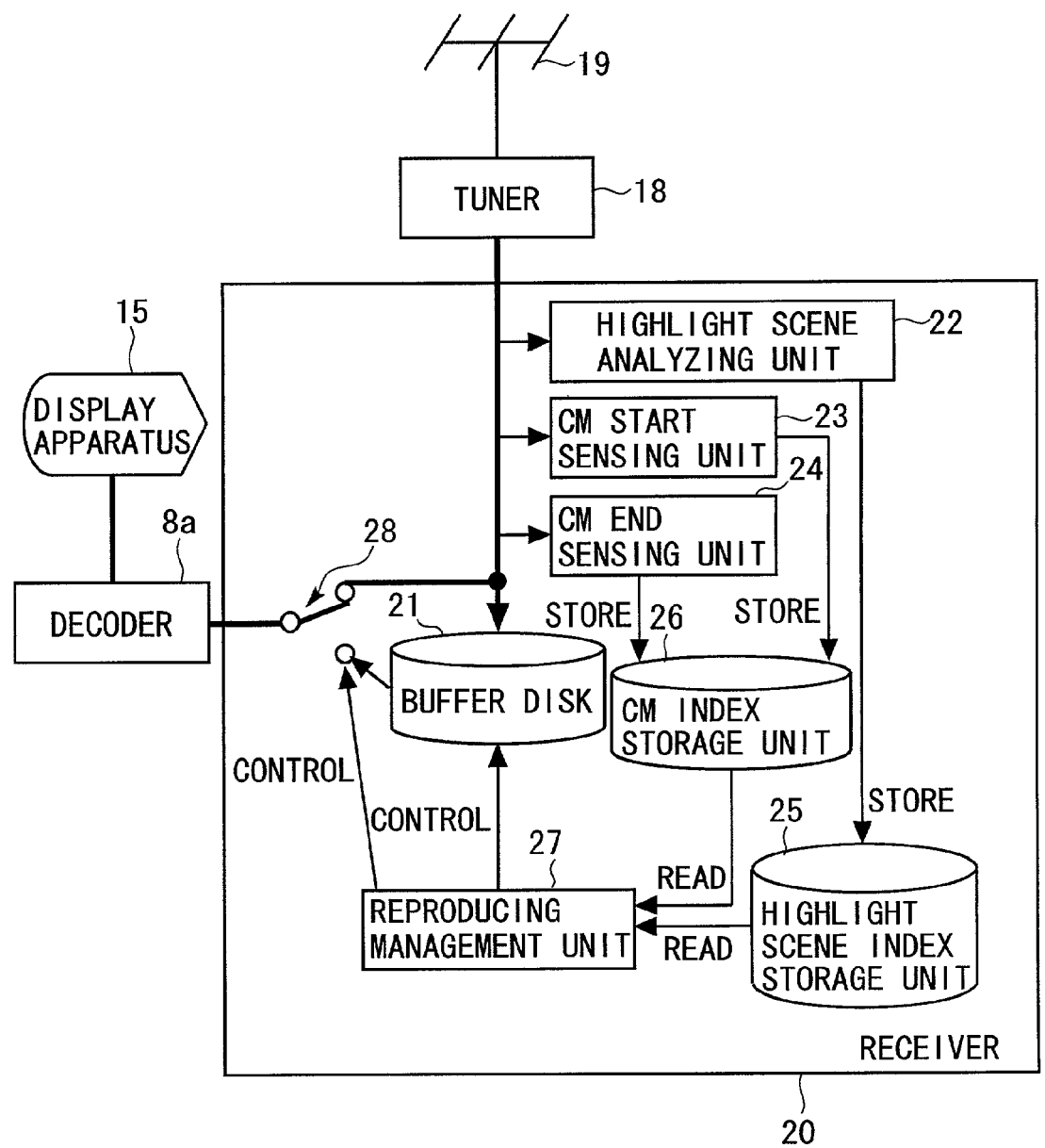
FIG. 2 is a functional block diagram of a broadcast receiver according to a first embodiment of the present invention.

The display control apparatus 8 contains a decoder 8a (see FIG. 2). The decoder 8a decodes, or demodulates both image data and speech (voice, sound) data contained in broadcast data inputted into the computer 1 so as to obtain such data having a format processable by the display apparatus 15. Both the image data and the speech data contained in the broadcast data entered into the computer 1 are demodulated by the display control apparatus 8, and then, the demodulated image/speech data are processed by way of either the image display control process or the speech output control process, if required. Thereafter, the processed image/speech data are supplied to the display apparatus 15.

To the communication control apparatus 9, a communication line connected to a network (not shown) is connected. In response to an instruction issued from the CPU 2, the communication control apparatus 9 transmits/receives (involving uploads/downloads) a program and/or data with respect to another computer.

A keyboard (KBD) 16 is connected to the interface I/F 10. This keyboard (KBD) 16 is provided with a plurality of keys (character input keys and cursor key etc.), and is used by an operator in order to input an instruction and data to the computer 1.

Either a mouse 17 or a pointing device such as a track ball, a flat space, and a joystick is connected to another interface I/F 11. The mouse 17 is used to input a selection instruction by employing a cursor displayed on the monitor of the display apparatus 15.

A tuner 18 used to receive a digital television broadcasting program is connected to another interface I/F 12. This tuner 18 is connected to an antenna 19 for receiving digital television broadcasting electromagnetic waves such as CS broadcasting programs. The tuner 18 converts a digital TV broadcasting electromagnetic wave into a digital signal containing image data and speech data, and then, this converted digital signal is entered into the I/F 12. The I/F 12 converts a digital TV signal entered from the tuner 12 into such data having a format processable by the computer 1, and then, outputs this converted data to the bus BUS.

The CPU 2 executes various sorts of programs stored in the ROM 3, the HD 5, the FD 13, and the CD-ROM 14 (namely, these devices correspond to "recording medium" of the present invention). As a result, the computer 1 may function as a broadcast receiver according to the present invention. It should be understood that the above-described programs and also data to be saved in the recording medium such as the HD 5 may be recorded on this recording medium by an operator in a manual manner. Alternatively, the computer 1 may download these programs/data from another computer to be recorded on the recording medium.

Furthermore, the arrangement of the computer 1 shown in FIG. 1 may be replaced by that the tuner 18 is built in the computer 1. Also, the decoder may be provided outside this computer 1.

It should also be noted that the CPU 2 may realize a highlight scene detecting unit, a means for storing a highlight scene into a storage device, a CM detecting unit, a CM start detecting unit, and a reproduction control unit. The hard disk HD 5 (buffer disk 21) corresponds to the storage device according to the present invention.

Functional Block of Broadcast Receiver

FIG. 2 is a functional block diagram for showing an arrangement of a broadcast receiver according to a first embodiment of the present invention. The computer 1 indicated in FIG. 1 may function as a receiver 20 which is connected to the tuner 18 and the decoder 8a contained in the display control apparatus 8, as shown in FIG. 2, since the CPU 2 executes a computer program.

The tuner 18 receives a broadcasting electromagnetic wave received by the antenna 19, and then enters both image (video) data and speech (audio) data contained in the broadcasting electromagnetic wave into this receiver 20. The decoder 8a decodes (demodulates) both the image data and the speech data contained in the broadcasting electromagnetic wave, and then, supplies the decoded image/speech data to the display apparatus 15.

As a result, an image data (picture) produced from the image data is displayed on the monitor of the display apparatus 15, and also speech (voice) produced from the speech data is outputted from the speaker. Therefore, the television broadcast programs may be provided with audiences.

The receiver 20 is equipped with a buffer disk 21, a highlight scene analyzing unit 22, a CM start sensing unit 23, a CM end sensing unit 24, a highlight index storage unit 25, a CM index storage unit 26, a reproducing management unit 27, and a switch 28. The highlight scene analyzing unit 22 (will be referred to as an "analyzing unit 22" hereinafter) corresponds to a highlight scene detecting unit. The CM start sensing unit 23 corresponds to a CM detecting unit, and a CM start detecting unit. The CM end sensing unit 24 corresponds to a CM detecting unit. The highlight index storage unit 25 corresponds to a means for storing a highlight scene into the storage device. The reproducing management unit 27 corresponds to a reproduction control unit. The analyzing unit 22, the CM start sensing unit 23, the CM end sensing unit 24, and also the reproducing management unit 27 are such functions which can be realized by that the CPU 2 executes a computer program.

The buffer disk 21 corresponds to such a ring buffer for temporarily storing thereinto broadcast data portions outputted from the tuner 18 only for a predetermined time duration. When the buffer disk 21 stores the broadcast data up to a final address, the next address is returned to a head address. While the tuner 18 and the receiver 20 are initiated, this buffer disk 21 arbitrarily, or temporarily stores thereinto the broadcast data of the selected channel.

In this example, the buffer disk 21 is constituted by employing a hard disk. Alternatively, if random accessible media are available, then any type of random accessible media, for example, a RAM disk may be used as this buffer disk 21.

The analyzing unit 22 acquires the broadcast data which is stored from the tuner 18 to the buffer disk 21, and then, analyzes the acquired broadcast data so as to detect a highlight scene of a broadcasting program. This analyzing unit 22 stores index information corresponding to the detected highlight scene into the highlight index storage unit 25.

The analyzing unit 22 detects the highlight scene in accordance with both a detection starting condition and a detection end condition of the highlight scene, which are previously set, while using both the image data and the speech data contained in the broadcast data. In other words, the analyzing unit 22 detects as the highlight scene such broadcast data defined from a data portion coincident with the detection starting condition up to a data portion coincident with the detection end condition, as a result of an image recognition process, and a speech recognition process, and also a combination of these process operations.

The analyzing unit 22 sets as a detection starting condition, for instance, such a condition that a difference between a preceding frame and a succeeding frame within an image is calculated, and an absolute value of this difference is larger than a predetermined threshold value, and further, a level of speech corresponding to the image is higher than a preselected threshold value. Then, the analyzing unit 22 detects image data defined from the image portion capable of satisfying this detection starting condition up to the image portion capable of satisfying a detection end condition as the above-described highlight scene.

Also, the analyzing unit 22 detects the highlight scene, while a change in major colors of a screen is sensed so as to sense a change in displayed images, or a change in luminance brightness is utilized. Alternatively, the analyzing unit 22 detects as the highlight scene such an image where a specific key word (for example, name of hero) is recognized, while the image recognition process is combined with the speech recognition process.

Then, the analyzing unit 22 detects both the starting time instant and the end time instant of the highlight scene, the addresses (namely, both starting address and end address) of the highlight scene on the buffer disk 21, and also the length of the highlight scene. The analyzing unit 22 stores all of the above-described data into the highlight index storage unit 25 as the index information.

FIG. 3 is an explanatory diagram for explaining the content of the highlight index storage unit 25 shown in FIG. 2. As indicated in FIG. 3, the highlight index storage unit 25 corresponds to such a table which records thereon index information of highlight scenes every highlight scene. This index information implies a starting time instant, a starting address, an end time instant, an end address, and a length. This table is formed on the RAM 4.

Returning back to FIG. 2, the CM start sensing unit 23 senses a start of a CM (commercial) program contained in a broadcasting program in such a manner that the CM start sensing unit 23 judges as a CM starting time instant, such a time instant at which a sound mode contained in broadcasting data stored in the buffer disk 21 is changed from a monoral sound mode to a stereophonic sound mode. When the CM start sensing unit 23 senses starting of the CM program, this CM start sensing unit 23 acquires this starting time instant, and the address (starting address) of the broadcasting data corresponding to this starting time instant in the buffer disk 21. Then, the CM start sensing unit 23 stores the acquired CM starting time instant and the starting address into the CM index storage unit 26.

The CM end sensing unit 24 senses an end of a CM (commercial) program contained in a broadcasting program in such a manner that the CM end sensing unit 24 judges as a CM end time instant, such a time instant at which a sound mode contained in broadcasting data stored in the buffer disk 21 is changed from a stereophonic sound mode to a monoral sound mode. When the CM end sensing unit 24 senses the end of the CM program, this CM end sensing unit 24 acquires this end time instant, and the address (end address) of the broadcasting data corresponding to this end time instant in the buffer disk 21. Then, the CM end sensing unit 24 stores the acquired CM end time instant and the end address into the CM index storage unit 26.

As the CM start sensing method by the CM start sensing unit 23, or the CM end sensing method by the CM end sensing unit 24, either the CM starting point or the CM end point may be sensed from a blank image portion between two continuous senses by way of a method similar to the analyzing unit 22, or may be sensed by utilizing such a fact that a sound volume level of a CM program is higher than that of a broadcasting program.

FIG. 4 is an explanatory diagram for explaining the content of the CM index storage unit 26 shown in FIG. 2. As indicated in FIG. 4, the CM index storage unit 26 corresponds to such a table which records thereon index information of a CM program every CM broadcasting band. This index information implies a starting time instant, a starting address, an end time instant, an end address, and a length. This table is formed on the RAM 4.

Returning back to FIG. 2, the reproducing management unit 27 manages reproducing operations of broadcasting data stored in the buffer disk 21 based upon CM index information and highlight index information.

In other words, the reproducing management unit 27 manages both the highlight index information stored in the highlight index storage unit 25 and the CM index information stored in the CM index information storage unit 26. At a time instant when a CM broadcast is commenced, the reproducing management unit 27 detects the index information of the proper highlight scene from the highlight index storage unit 25, and sets the read address of the buffer disk 21 to the starting address which is written into the detected index information.

The switch 28 switches the broadcast data inputted from the tuner 18 and the broadcast data which is time-shifted and is supplied from the buffer disk 21 under control of the reproducing management unit 27.

While one end of the switch 28 is connected to the decoder 8a, any one of the broadcast data inputted from the tuner 18 and the broadcast data supplied from the buffer disk 21 is entered to this decoder 8a. The decoder 8a decodes the entered broadcast data, and the decoded data is outputted from the display apparatus 15. It should also be noted that the switch 28 need not be physically realized, but may be realized by way of a conceptional idea. When this switch 28 is realized in a software manner, this switch 28 may be realized by the internal condition judgement. In other words, this switch 28 may be realized even by a mechanical switch, or an electronic switch.

The reproducing management unit 27 performs the management of the reproducing operation in accordance with the below-mentioned sequential operation. In other words, the reproducing management unit 27 detects the proper index information from the highlight index storage unit 25 at such a time instant when the CM start sensing unit 23 senses the commencement of the CM broadcast. Subsequently, the reproducing management unit 27 sets the starting address of this index to the data read position of the buffer disk 21, and also switches the switch 28 to the switch side of the buffer disk 21.

Thereafter, the reproducing management unit 27 reads the broadcast data from the buffer disk 21 to supply the read broadcast data to the decoder 8a until the CM end sensing unit 26 senses the end of this CM broadcast. At such a time instant when the CM broadcast is ended, the reproducing management unit 27 switches the switch 28 to the switch side of the tuner 8a. As a result, while the CM program is broadcasted, the highlight scene data portion contained in the broadcast data recorded on the buffer disk 21 is supplied to the decoder 8a.

Figure 5:
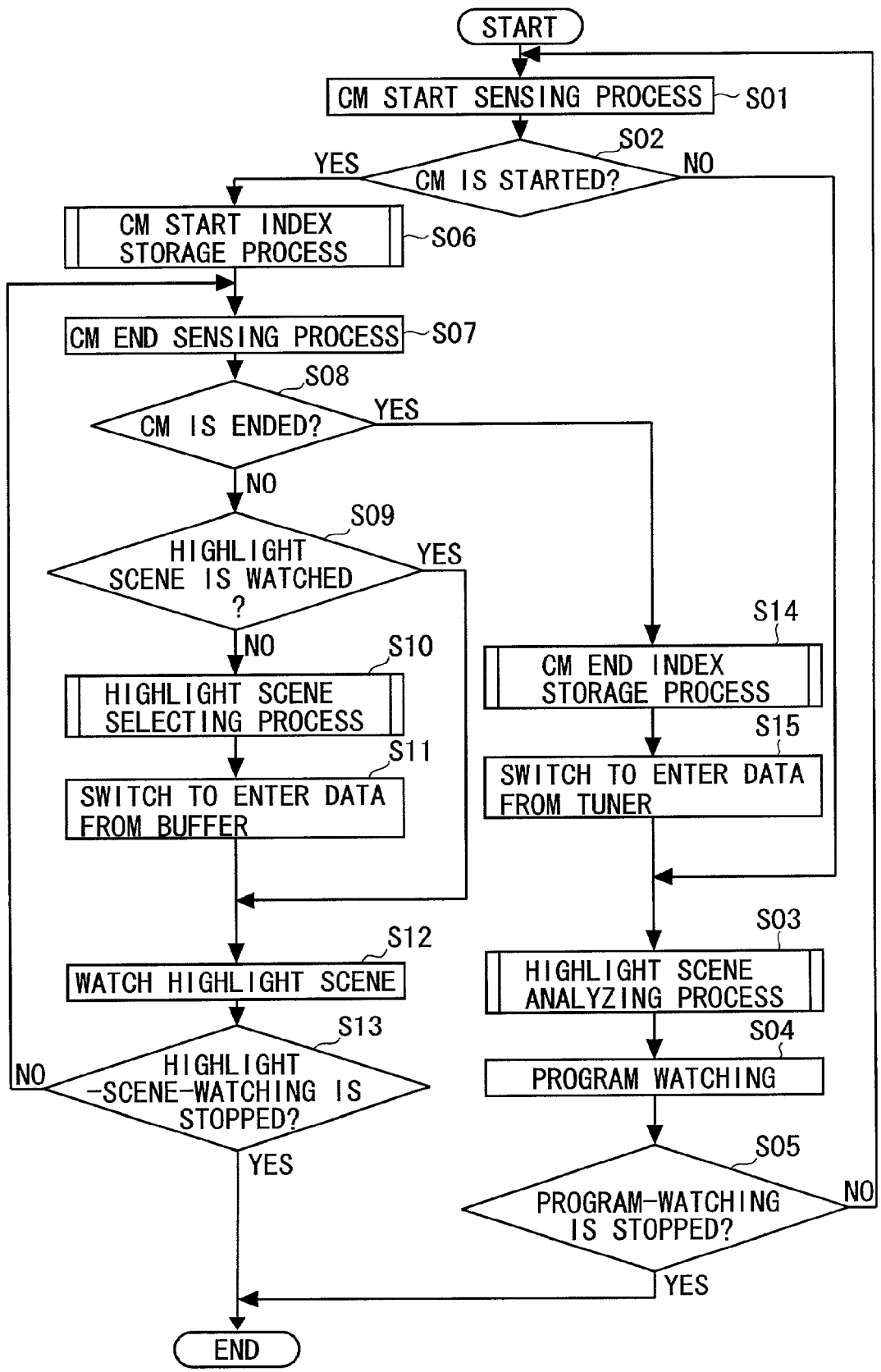
FIG. 5 is a flow chart for describing operations of the broadcast receiver according to the first embodiment.
Figure 6:
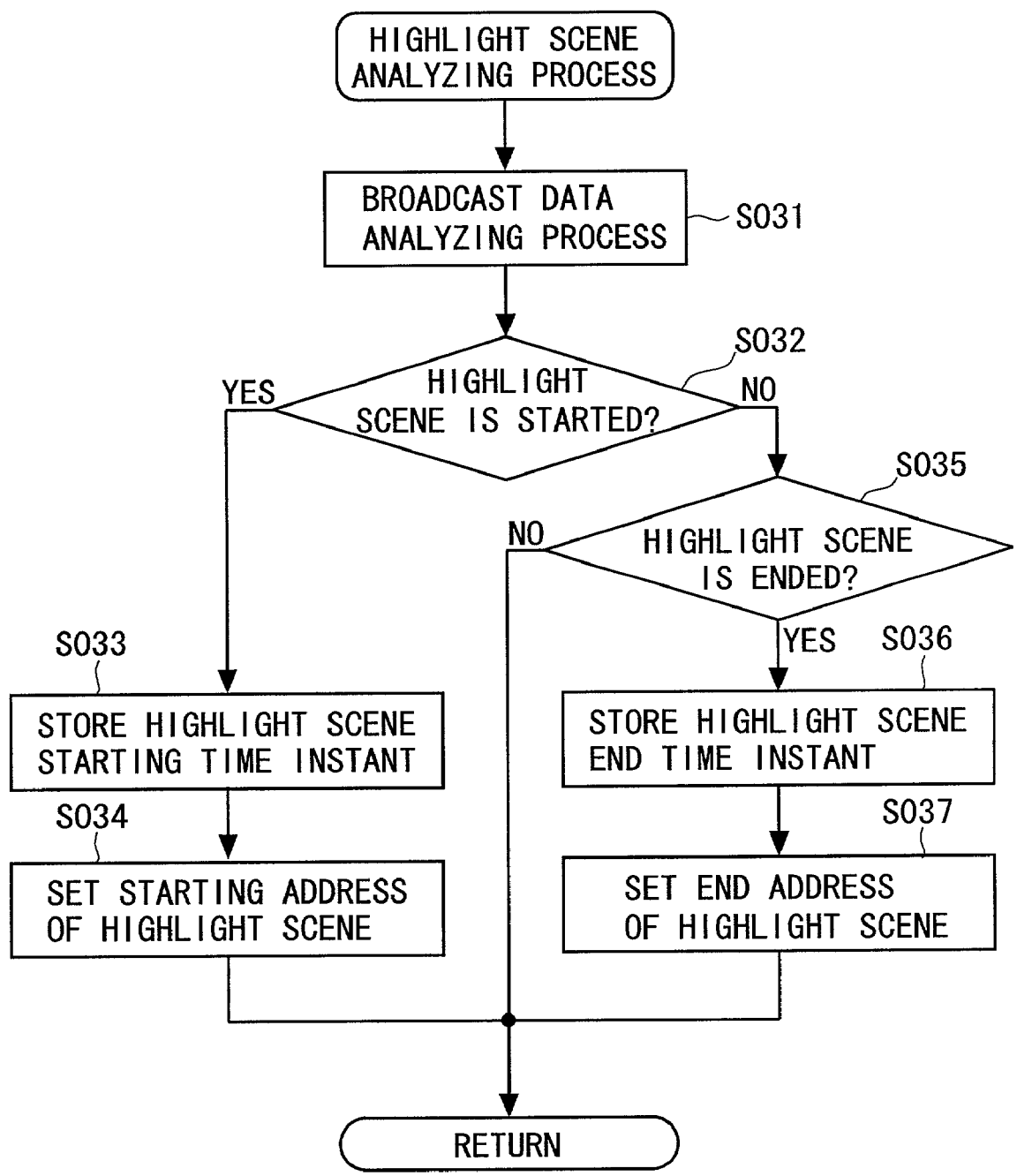
FIG. 6 is a flow chart for describing a highlight analyzing process operation of the broadcast receiver according to the first embodiment.
Figure 7:
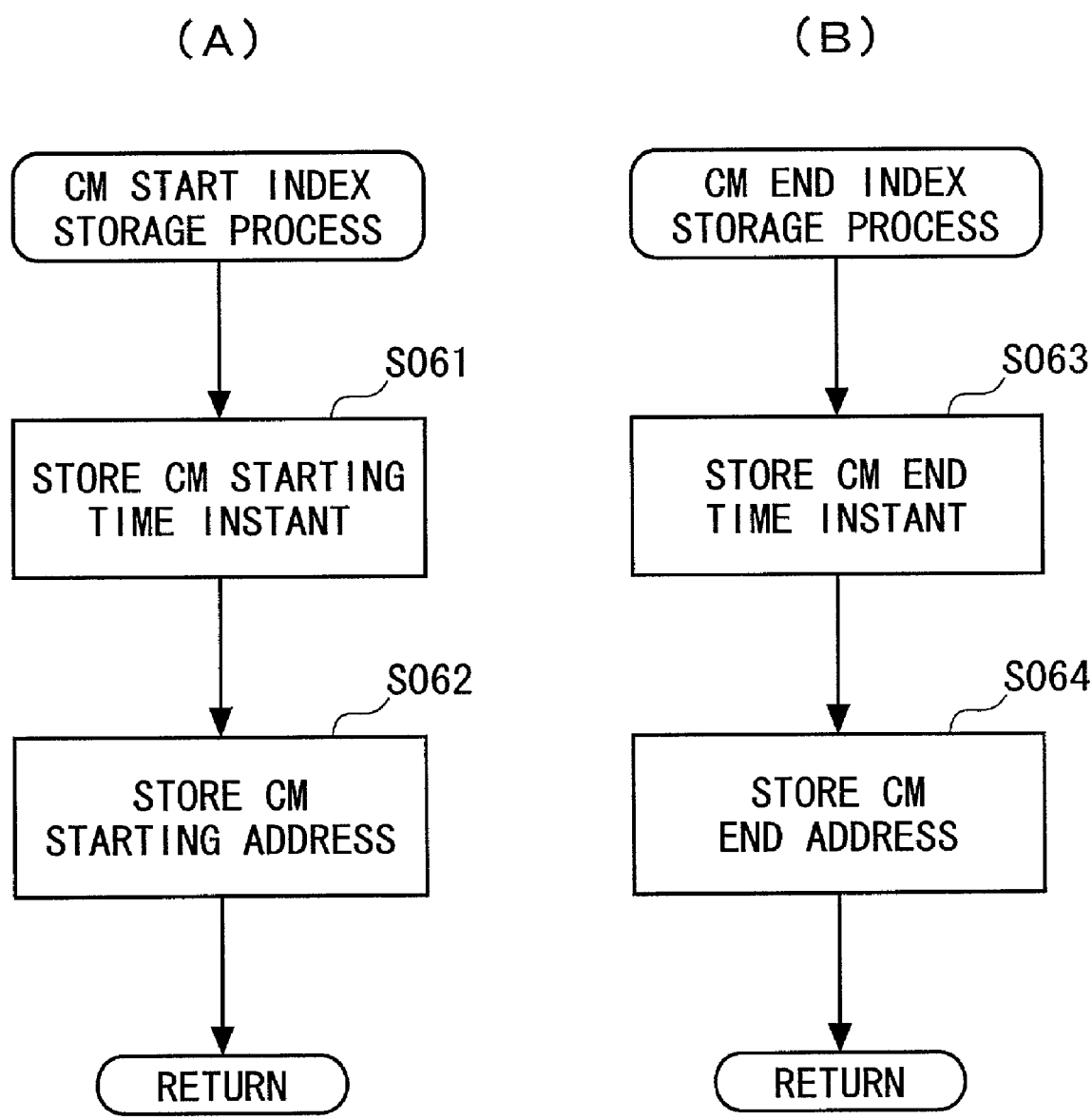
FIGS. 7A and 7B are flow charts for describing both a CM starting index storage process operation and a CM end index storage process operation, which are executed in the broadcast receiver according to the first embodiment.
Figure 8:
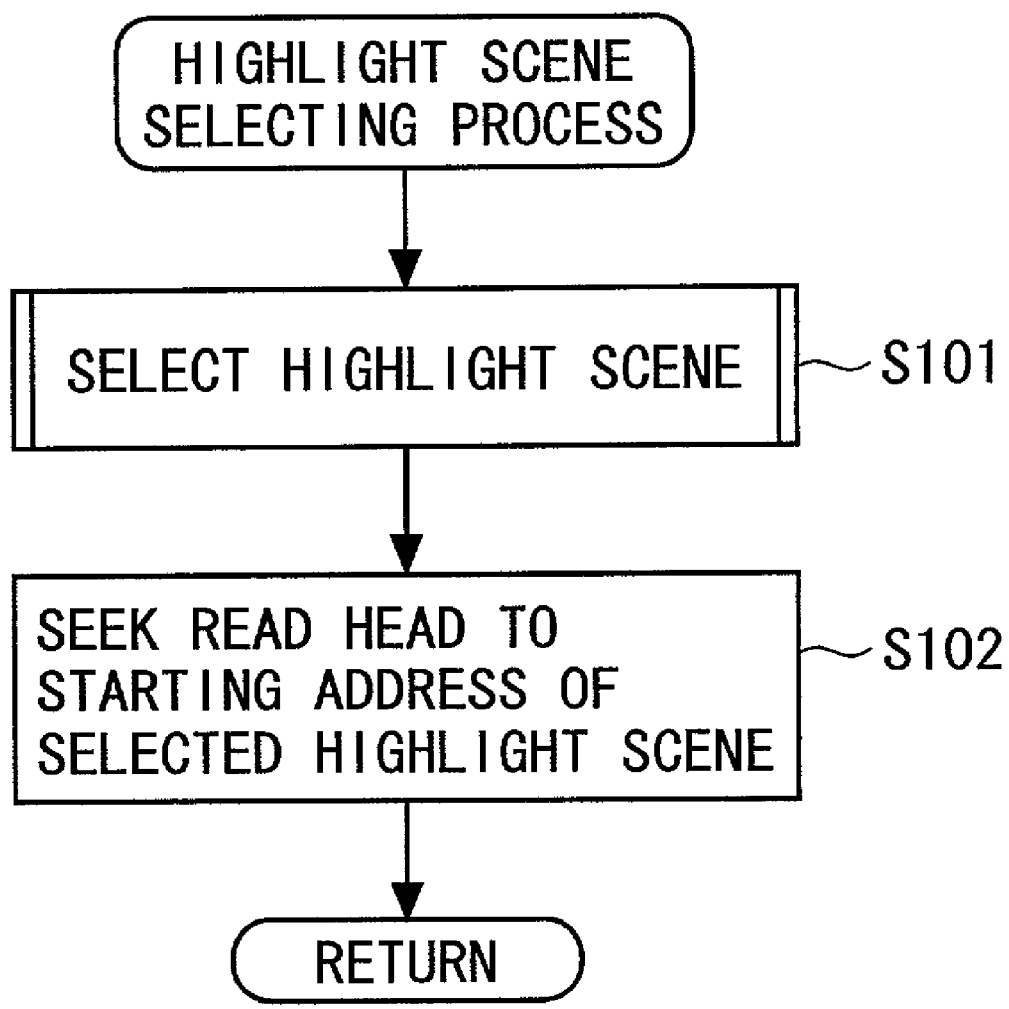
FIG. 8 is a flow chart for describing a highlight selecting process operation of the broadcast receiver according to the first embodiment.

FIG. 5 to FIG. 8 are flow charts for representing operations of the receiver 20 according to the first embodiment of the present invention. FIG. 5 is a flow chart for explaining operations of the receiver 20 when broadcast data is received. FIG. 6 is a flow chart for explaining the content of the highlight analyzing process operation indicated in FIG. 5. FIG. 7(A) is a flow chart for explaining the content of the CM start index storage process operation shown in FIG. 5. FIG. 7(B) is a flow chart for describing the content of the CM end index storage process operation shown in FIG. 5. FIG. 8 is a flow chart for describing the content of the highlight selection process operation indicated in FIG. 5.

The process flow operation indicated in FIG. 5 is commenced by initiating the tuner 18, the receiver 20, the decoder 8a, and also the display apparatus 15 by turning ON the power supplies thereof in order that an audience watches a broadcasting program outputted from the display apparatus 15.

As indicated in FIG. 5, at a step S01 of this flow chart, the CM start sensing process operation is executed. In other words, the CM start sensing unit 23 monitors the broadcast data supplied from the tuner 18, and judges as to whether or not a CM broadcast is commenced (step S02). At this time, when the CM broadcast is commenced, this CM start sensing process is advanced to a step S06, whereas when the CM broadcast is not yet commenced, this sensing process operation is advanced to another step S03.

At this step S03, a subroutine of the highlight analyzing process operation is executed. In other words, as indicated in FIG. 6, the analyzing unit 22 analyzes the broadcast data supplied from the tuner 18 (step S031) so as to judge as to whether or not the highlight scene is commenced (step S032). At this time, the analyzing unit 22 stores a starting time instant of the highlight scene into the highlight index storage unit 25 (step S033) when this analyzing unit 22 judges that the highlight scene is commenced (step S032; YES). Also, the analyzing unit 22 stores into the highlight index storage unit 25, a recording position (starting address) in the buffer disk 21 as to the broadcast data, which corresponds to this starting time instant, and thereafter, the highlight analyzing process is accomplished. Subsequently, the process operation is advanced to a step S04 of FIG. 5.

On the other hand, at the step S032, when the analyzing unit 22 judges that the highlight scene is not commenced (step S032; NO), the analyzing unit 22 judges as to whether or not the highlight scene is ended (step S035). When the analyzing unit 22 judges that the highlight scene is not yet ended (step S035; NO), the highlight analyzing process operation is ended, and the process operation is returned to the step S04 of FIG. 5.

To the contrary, when the analyzing unit 22 judges that the highlight scene is ended (step S035; YES), the analyzing unit 22 stores an end time instant of the highlight scene into the highlight index storage unit 25 (step S036), and also stores both a recording position (end address) in the buffer disk 21 as to the broadcast data, which corresponds to this end time instant, and a length of the highlight scene into the highlight index storage unit 25 (step S037). Thereafter, the highlight analyzing process operation is accomplished, and then the process operation is advanced to the step S04 of FIG. 5.

At the step S04, the broadcast program watching process for the audience is performed. In other words, the broadcast program providing process operation with respect to the audience is carried out. Concretely speaking, the broadcast data supplied from the tuner 18 is supplied to the decoder 8a, both the image data and the speech data contained in the broadcast data are decoded, or demodulated by this decoder 8a, and then, the image (picture) and the speech (voice) corresponding to the decoded image data and the decoded speech data are outputted from the display apparatus 15. Thereafter, the process operation is advanced to a step S05.

At this step S05, the CPU judges as to whether or not the audience completes watching of the broadcast program, namely, the operation capable of accomplishing the process operation by the receiver 20 is executed. As this accomplishing operation, for example, the power supply of the computer 1 (receiver 20) is stopped, and the application program capable of realizing the receiver 20 is completed. At this time, in the case that the process accomplishing operation is executed, the CM start sensing process operation shown in FIG. 5 is ended. To the contrary, when the process accomplishing operation is not executed, this process operation is returned to the previous step S01.

On the other hand, at the step S06, a subroutine of the CM start index storage process operation is executed by that the CM start sensing unit 23 judges the commencement of the CM broadcast at the previous step S02. In other words, as indicated in FIG. 7(A), the CM start sensing unit 23 detects a starting time instant of this CM broadcast to store this detected starting time instant into the CM index storage unit 26 (step S061), and also stores a recording position (starting address) in the buffer disk 21 as to the broadcast data, which corresponds to this starting time instant into the CM index storage unit 26 (step S062). Thereafter, the CM starting index storage process operation is completed, and then, the process operation is advanced to a further step S07 of FIG. 5.

At the step S07, a CM end sensing process operation is executed. That is, the CM end sensing unit 24 monitors the broadcast data so as to judge as to whether or not the CM broadcast is completed (step S08). At this time, when the CM end sensing unit 24 judges that the CM broadcast is ended (step S08; YES), the process operation is advanced to a step S14. To the contrary, when the CM end sensing unit 24 judges that the CM broadcast is not ended (step S08; NO), the process operation is advanced to a step S09.

At this step S09, the reproducing management unit 27 judges as to whether or not the audience watches the highlight scene. In other words, the reproducing management unit 27 judges as to whether or not the broadcast data recorded on the buffer disk 21 is supplied to the decoder 8a in the present stage. When the audience watches the highlight scene (step S09; YES), the process operation is advanced to a step S12, whereas when the audience does not watch the highlight scene (step S09; NO), the process operation is advanced to a step S10.

At the step S10, a subroutine of the highlight selection process operation is carried out. In other words, as shown in FIG. 8, the reproducing management unit 27 selects proper index information from the index information stored in the highlight index information storage unit 25 (step S101). In this case, as an example, the index information is selected in the order of the latest starting time instant. It should also be noted that the index information of the highlight scene may be selected in accordance with an arbitrary condition.

Thereafter, the reproducing management unit 27 seeks the read head of the buffer disk 21 at a starting address contained in the selected index information (step S102). As a consequence, such a condition may be established that the reproducing operation is commenced from the starting address of the highlight scene. Thereafter, the highlight selection process operation is ended, and the process operation is advanced to a step S11 of FIG. 5.

At the step S11, the reproducing management unit 27 switches the switch 28 from the switch side of the tuner 18 to the switch side of the buffer disk 21. As a consequence, the broadcast data which are sequentially read out from the starting address of the highlight scene are supplied to the decoder 8a. Thereafter, the process operation is advanced to a step S12.

At this step S12, both pictures (images) and speech (voice) are outputted from the display apparatus 15, which are produced based upon the broadcast data decoded by the decoder 8a. As a consequence, the audience can watch the highlight scene recorded on the buffer disk 21. Thereafter, the process operation is advanced to a step S13.

At the step S13, similar to the above-described step S05, it is judged as to whether or not the audience stops watching of the broadcast program. When the audience stops watching of the broadcast program, the process operation of FIG. 5 is ended. To the contrary, when the audience does not yet stop watching of the broadcast program, the process operation is returned to the previous step S07.

On the other hand, in such a case that it is so judged at the step S08 that the CM broadcast is ended and then the process operation is advanced to a step S14, a CM end index storage process operation is carried out. In other words, as shown in FIG. 7(B), the CM end sensing unit 24 stores an end time instant of the CM broadcast into the CM index storage unit 26 (step S063), and also stores into this CM index storage unit 26, both a storage position (end address) in the buffer disk 21 as to the broadcast data corresponding to this end time instant, and further, a length of this CM broadcast (step S064). As a result, the CM end index storage process operation is accomplished, and the process operation is advanced to a step S15 of FIG. 5.

At the step S15, the reproducing management unit 27 switches the switch 28 from the switch side of the buffer disk 21 to the switch side of the tuner 18. This may cause such a condition that the broadcast data entered from the tuner 18 is supplied to the decoder 8a, so that the program watching mode is set. That is, the audience watches the broadcast program in real time. Thereafter, the process operation is advanced to the above-described step S03.

In the flow chart of FIG. 5, after the highlight analyzing process operation defined at the step S03 has been carried out, the program watching operation defined at the step S04 is executed in this order. Alternatively, the process sequence order of the steps S03 and S04 may be carried out in such an order opposite to the above-explained order.

Also, the process operation defined at the step S11 (switching process operation of switch 28) may be carried out at any process steps defined after the commencement of the CM broadcast is sensed and up to such a time instant when the data corresponding to the highlight scene is actually commenced to be processed. Also, in the case that the switch 28 has already been switched, no specific process operation needs to be performed.

Figure 9:
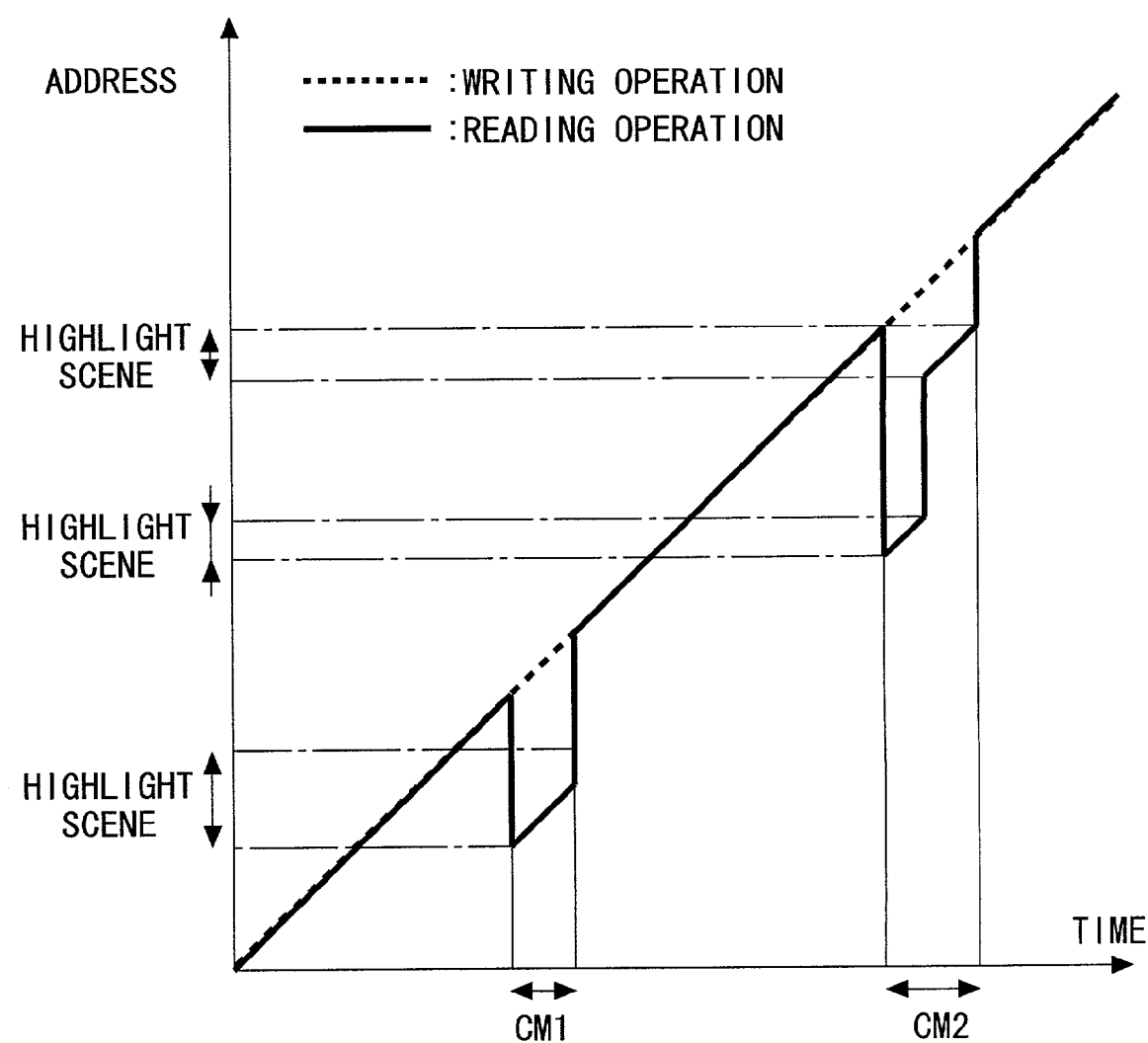
FIG. 9 is a diagram for representing a relationship between a write address and a read address with respect to a buffer disk of the broadcast receiver according to the first embodiment.

FIG. 9 is a diagram for indicating a relationship between a write address and a read address in the buffer disk 21 employed in the receiver 20 according to the first embodiment. In FIG. 9, there are indicated that at a CM broadcast starting time instant, a starting address corresponding to a starting time instant of a highlight scene is sought, whereas at a CM broadcast ending time instant, the present address is returned to a position of a received broadcast program (starting address becomes address before being sought).

In FIG. 9, this relationship indicates such a case that a length of a highlight scene contained in a commercial broadcast "CM1" is made longer than a CM broadcasting time range. In this case, when the CM broadcast is ended, the watching position is returned to the real-time watching position.

Another commercial broadcast "CM2" shows an example where two pieces of highlight scenes are inserted into a single broadcasting time range. The highlight scenes are reproduced in the order of the latest starting time instant. As previously explained, when the reproducing operation of a certain highlight scene contained in the CM broadcast is accomplished, another highlight scene is selected and reproduced until the end of the CM broadcast is sensed.

In accordance with the receiver 20 of this first embodiment, only such a data portion (broadcast data) of a broadcast program defined by a constant (predetermined) time duration is stored into the buffer disk 21, and this broadcast program is provided via the receiver 20 to an audience. A highlight scene is detected from the broadcast data stored in this buffer disk 21, and both a starting address and an end address in the buffer disk 21 as to this detected highlight scene are saved.

Thereafter, in such a case that the audience watches a broadcast program in real time (program watching mode), when a CM broadcast is commenced, the broadcast data of the highlight scene stored in the buffer disk 21 is read based on both the saved starting address and the saved end address, and then, the read broadcast data is reproduced. As a result, both the picture and the speech produced based upon this highlight scene broadcast data are supplied to the audience (highlight watching mode). Then, either a single piece or plural pieces of highlight scenes may be provided to the audience until the end of this CM broadcast is sensed.

Thereafter, when the end of this CM broadcast is sensed, both a picture (image) and speech (voice) produced based on broadcast data acquired from the tuner 18 are provided to the audience. In other words, the present highlight watching mode is switched back to the program watching mode, so that the audience may watch the broadcast program in real time.

As a consequence, while the CM program is being broadcasted (either CM broadcasting time range within program or CM broadcasting time range between programs), the audience can watch the highlight scenes recorded on the buffer disk 21.

In accordance with the first embodiment, at the time when the CM broadcast is commenced, the audience can automatically watch such a program one more time, which has been watched so far, so that such useless operation as zapping operation executed while the CM program is broadcasted is no longer required. Also, since the highlight scene of the broadcast program is reproduced, it is possible to avoid such a fact that the audiences will loose their concentration and their interests to the broadcast program. Therefore, the audiences can further enjoy watching the program, as compared with that of the conventional broadcast receiver. Further, since the highlight scenes are automatically reproduced, this broadcast receiver can eliminate cumbersome operations of replay designations by the audiences.

[Second Embodiment]

Figure 10:
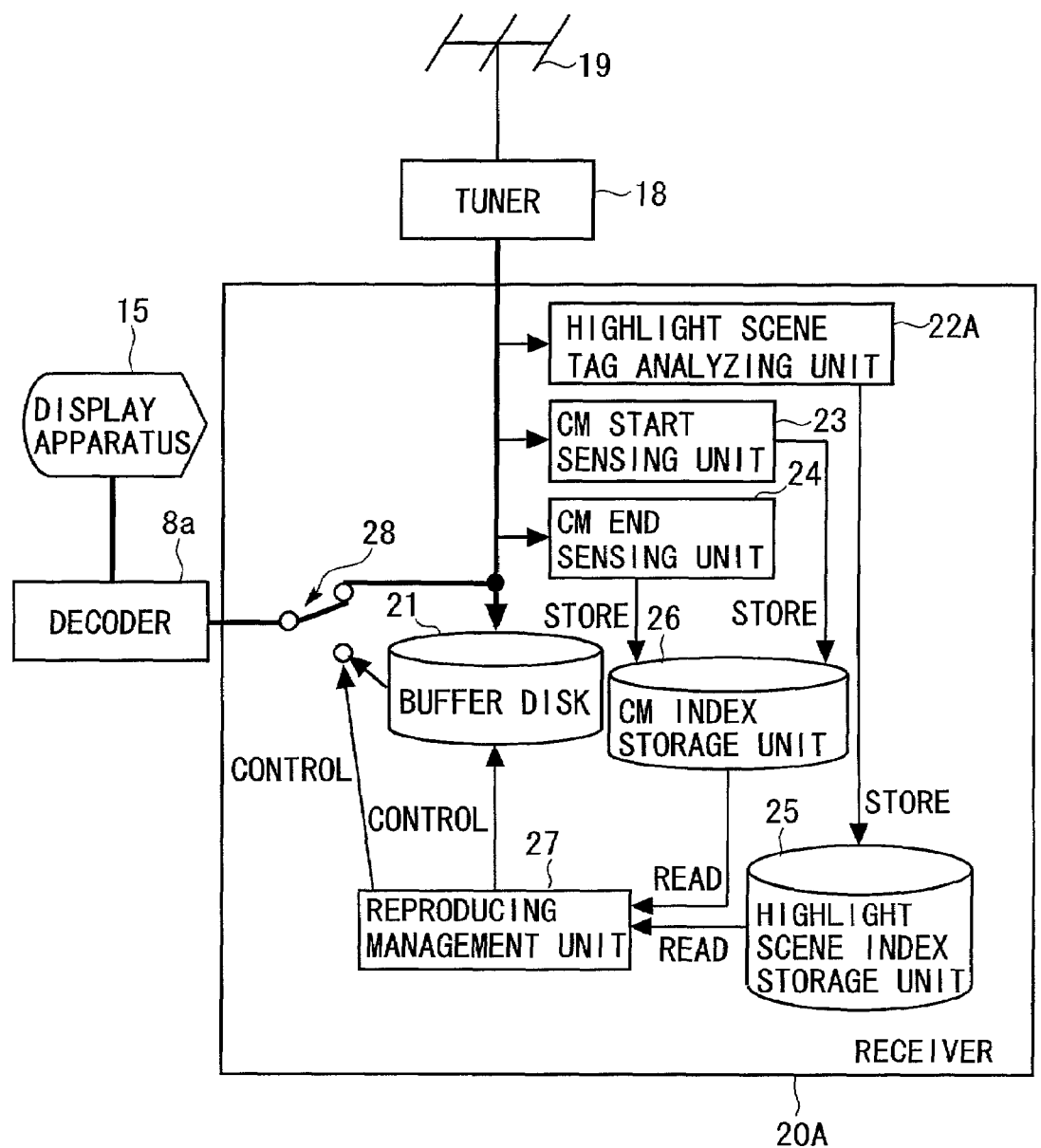
FIG. 10 is a functional block diagram of a broadcast receiver according to a second embodiment of the present invention.

FIG. 10 is a functional block diagram of a receiver 20A according to a second embodiment of the present invention. It should be noted that the receiver 20A of this second embodiment may be realized by employing the hardware structure (see FIG. 38) as explained in the above-explained first embodiment, and the functional block of FIG. 10 is substantially the same as that of the first embodiment, except that a highlight tag analyzing unit 22A (will be referred to as an "analyzing unit 22A" hereinafter) is provided instead of the highlight scene analyzing unit 22 employed in the first embodiment.

The analyzing unit 22A interprets tag information (equal to index) corresponding to a highlight scene previously inserted into the broadcast data. In other words, while a broadcast station previously inserts specific tag information into a user area of broadcast data and then transmits the tag-inserted broadcast data, since the highlight tag analyzing unit 22A interprets the inserted tag from the received broadcast data, both a starting position and an end position of the highlight scene can be grasped which is designated on the side of the broadcast station.

A highlight index sorts highlight scenes interpreted by tags in the temporal order, and a data structure of a highlight index storage unit 25 is similar to that of the first embodiment.

Although operations of the receiver 20A according to the second embodiment are substantially equal to those of the first embodiment (see FIG. 5), this receiver 20A owns such a different operation in the content of the highlight analyzing process operation step (step S03) by the analyzing unit 22A. In other words, in the receiver 22A of the second embodiment, instead of the operations defined in the flow chart of FIG. 6, this receiver 22A is operated in accordance with a highlight analyzing process operation shown in FIG. 11 according to the second embodiment.

Figure 11:
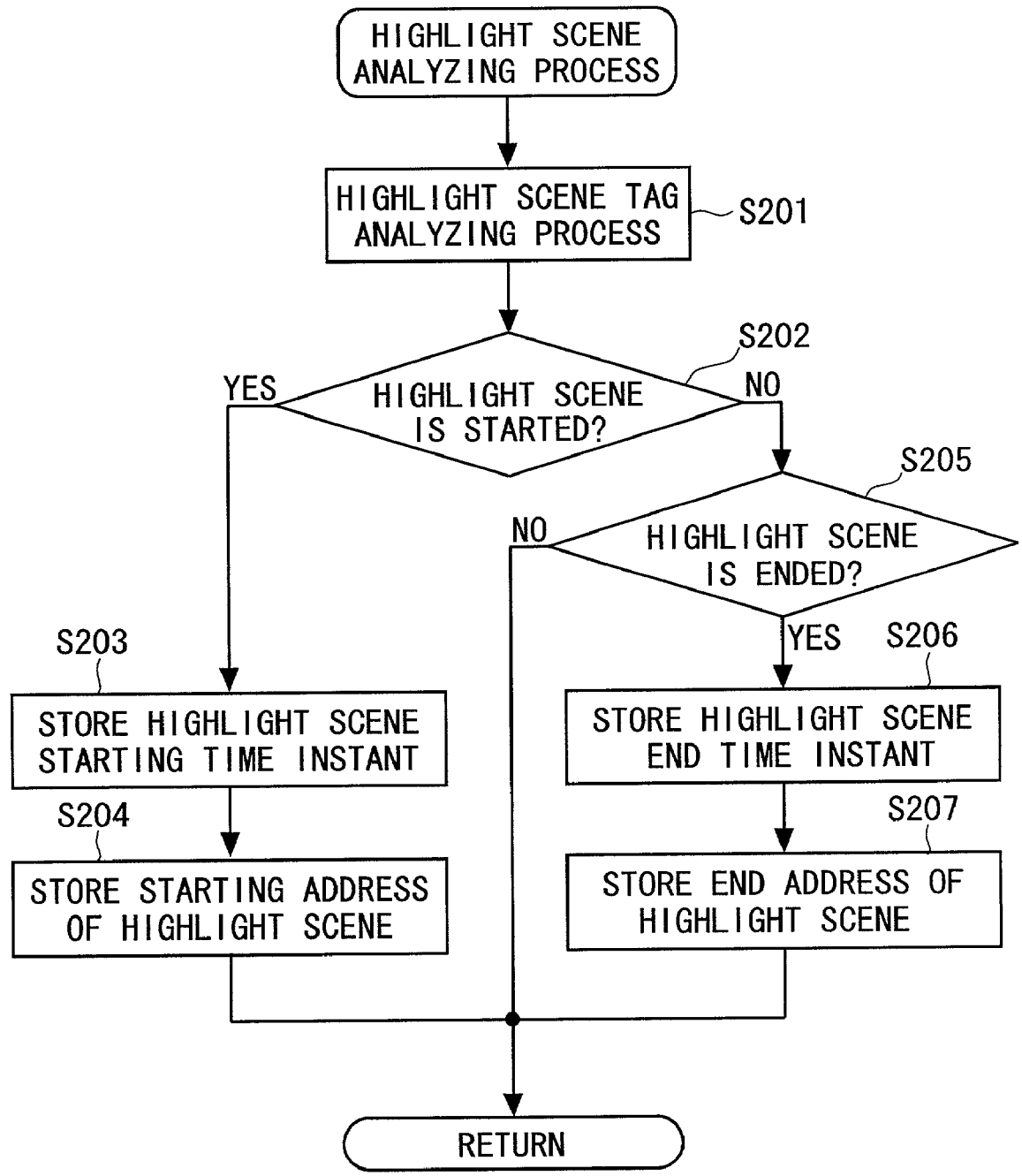
FIG. 11 is a flow chart for describing a highlight analyzing process operation executed in the broadcast receiver according to the second embodiment.

In FIG. 11, at a step S201, the analyzing unit 22A executes a highlight tag analyzing process operation and then, analyzes/judges as to whether or not a tag indicative of a highlight scene is contained in broadcast data (step S202).

At this time, as a result of analysis, when the analyzing unit 22A detects such a tag indicative of a commencement of this highlight scene (step S202; YES), this analyzing unit 22A stores as a highlight index into the highlight storage unit 25, both a starting time instant of the highlight scene corresponding to this tag and also a position (starting address) corresponding to this starting time instant as to the buffer disk 21 (steps S203 and S204).

Also, in the case that the analyzing unit 22A detects such a tag indicative of an end of the highlight scene (step S205; YES), this analyzing unit 22A writes into the relevant positions of the highlight index storage unit 25, both an end time instant of the highlight scene corresponding to this tag and also a position (end address) corresponding to this end time instant as to the buffer disk 21 (steps S206 and S207).

Similar to the first embodiment, subsequently, when a CM broadcast is commenced, the reproducing management unit 27 may provide the highlight scene recorded on the buffer disk 21 to the audience instead of the CM broadcast, in accordance with the highlight scene index.

In this second embodiment, while the broadcasting station previously multiplexes the tag information on the data of the broadcast program to broadcast the multiplexed broadcast data with such tag information functioning as the index indicative of the highlight scene, the receiver 20A interprets this tag information to detect the highlight scene indicated by the tag information, and then reproduces the highlight scene while the CM program is broadcasted.

Similar to the above-explained first embodiment, as a consequence, the audience can automatically watch such a program, which has been so far watched, at the time when the CM broadcast is commenced. Furthermore, the receiver 20A need not detect the highlight scene by executing the image recognition process operation and the speech recognition process operation, but also the highlight scene intentionally designated by the broadcast station can be supplied to the audience, so that the audience can enjoy watching of the broadcast program.

[Third Embodiment]

Figure 12:
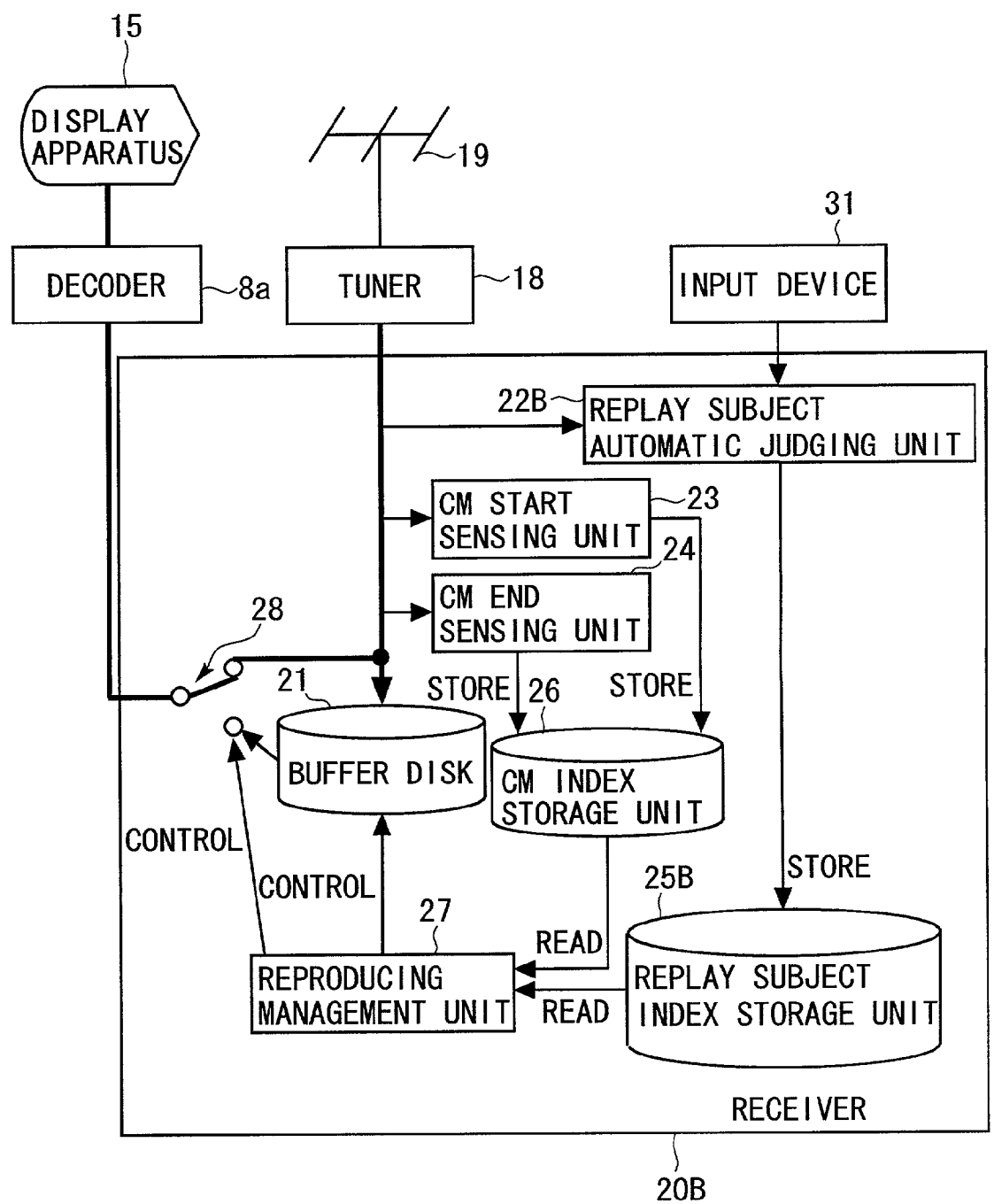
FIG. 12 is a functional block diagram of a broadcast receiver according to a third embodiment of the present invention.

FIG. 12 is a functional block diagram of a receiver 20B according to a third embodiment of the present invention. It should be noted that the receiver 20B of this third embodiment may be realized by employing the hardware structure (see FIG. 38) as explained in the above-explained first embodiment, and the functional block of FIG. 12 is substantially same as that of the first embodiment, except that a replay subject automatic judging unit 22B (will be referred to as a "judging unit 22B" hereinafter) is provided instead of the highlight scene analyzing unit 22, a replay subject index storage unit 25B is employed instead of the highlight index storage unit 25, and furthermore, an input device 31 is newly employed.

Figure 38:
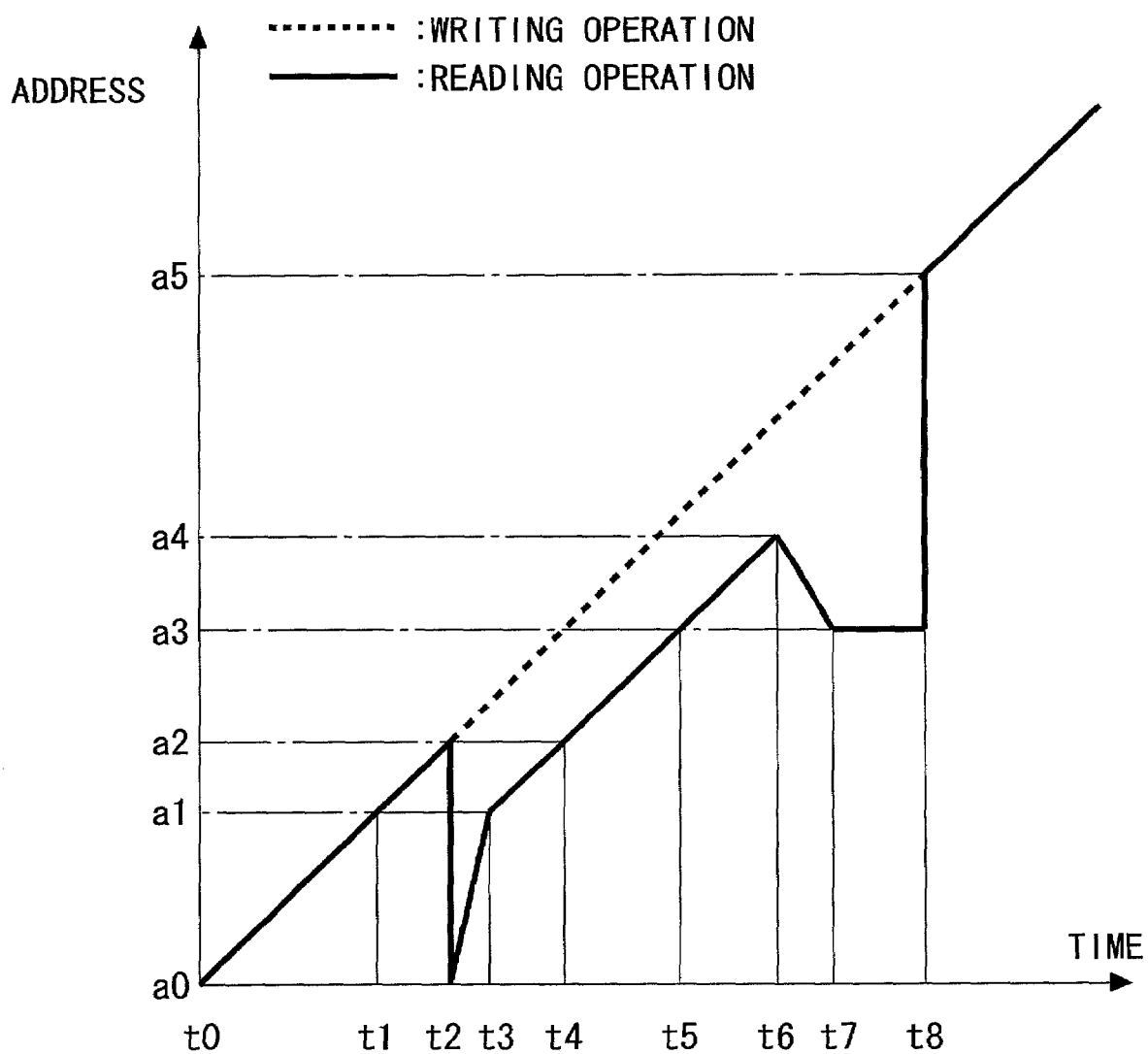
FIG. 38 is a diagram for representing the relationship among the write address, the read address, and the reproduction time with respect to the buffer disk during time shift watching operation.

The input device 31 may be arranged by employing the keyboard 16 and the mouse 17 indicated in FIG. 38. Also, the input device 31 may be arranged by using a remote controller 32. Alternatively, the input device 31 may be arranged by a microphone and a speech recognizing apparatus. This microphone is used to instruct the receiver 20B by a speech manner.

Figure 13:
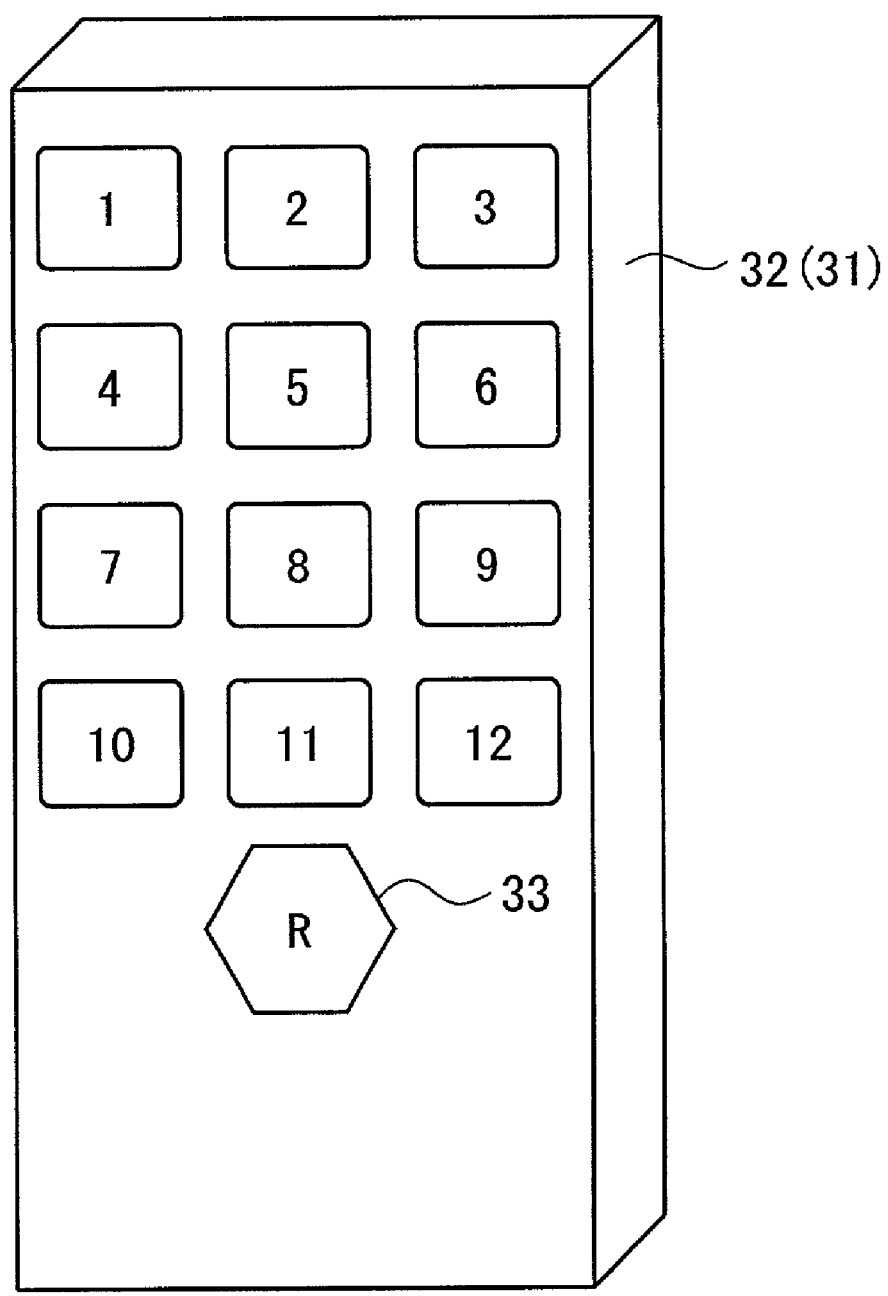
FIG. 13 is a diagram for explaining an input device (remote controller) of the broadcast receiver according to the third embodiment.

In the third embodiment, the remote controller 32 is employed as this input device 31. FIG. 13 is a diagram for indicating an example of this remote controller 32. The remote controller 32 is arranged in such a way that a designation button 33 is provided with the conventional television remote controller. This designation button 33 (subject to be replayed later) is exclusively used to designate a replay subject. When an audience again wishes to watch a scene (namely, audience judges this scene as a highlight scene) while a broadcast program is watched, if the audience depresses this designation button 33, then this audience may watch such a scene corresponding to the designated replay subject (highlight scene) during the subsequent CM broadcasting time.

In such a case that the audience designates the relay subject by using the input device 31 (by pressing designation button 33), the judging unit 22B automatically judges the replay subject in accordance with this designation.

For instance, the judging unit 22B sets positions as a replay subject, which are defined from one position corresponding to a time instant preceding to such a time instant when a designation is received by a predetermined time duration up to another position corresponding to the time instant when the designation is received. Alternatively, the judging unit 22B may set as a replay subject, a predetermined time duration before/after a designated time instant as a center. Also, the length of the replay subject may be selected to be a fixed length, or may be changed by the audience manipulating the input device 31.

Then, the judging unit 22B acquires a starting time instant of the replay subject, a starting address thereof, an end time instant of the replay subject, and an end address thereof. This judging unit 22B stores these acquired items into the replay position index storage unit 25B.

The replay position index storage unit 25B stores the starting time instant of the replay subject, the starting address thereof, the end time instant of the replay subject, and the end address, which are acquired by the judging unit 22B, in a table form for every replay subject. A data structure of the replay position index storage unit 25B is identical to that of the highlight index storage unit 25 shown in FIG. 3.

Figure 14:
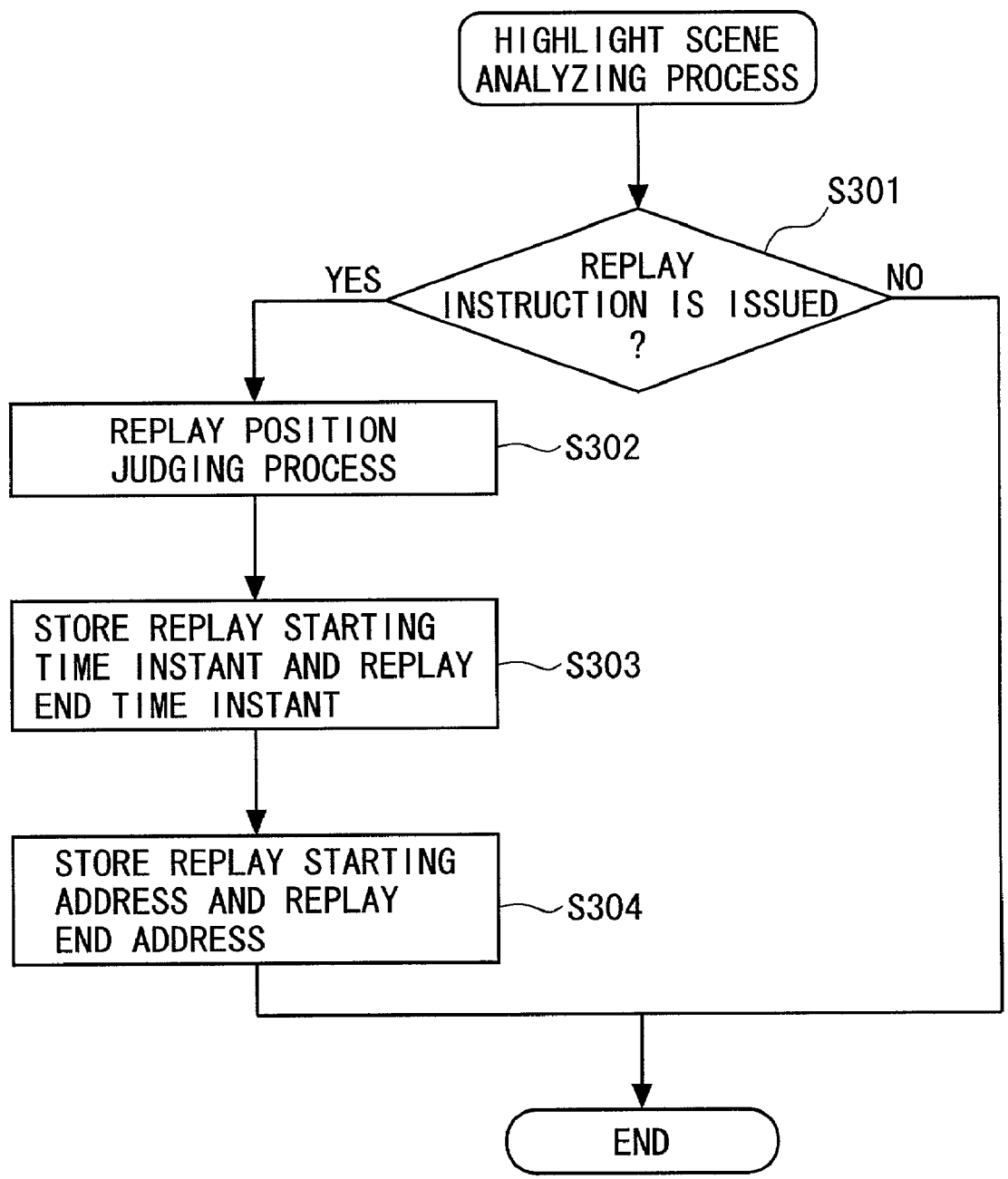
FIG. 14 is a flow chart for describing a highlight analyzing process operation executed in the broadcast receiver according to the third embodiment.

Operations of the receiver 20B according to the third embodiment are substantially equal to those of the first embodiment (see FIG. 5). There is only such a different operation, namely a content of a highlight analyzing process operation (step S03) executed by the judging unit 22B. In other words, in accordance with the receiver 20B of this third embodiment, operations are executed in accordance with such a highlight analyzing process operation shown in FIG. 14, instead of the process operation of the flow chart indicated in FIG. 6.

While a broadcast program is received, in the case that a designation of a replay subject from an audience is entered into the receiver 20B by manipulating the input device 31 (step S301; YES), the judging unit 22B automatically judges the replay subject based upon a time instant when the designation is received (step S302).

Subsequently, the judging unit 22B stores both a starting time instant of the replay subject and also an end time instant thereof into the subject index storage unit 25B (step S303), and also stores into this replay subject index storage unit 25B, both a starting address of this replay subject and an end address thereof as to the buffer disk 21 (step S304).

The subsequent operation of this receiver 20B is substantially equal to that of the first embodiment. In such a case that the commencement of the CM broadcast is detected, the reproducing management unit 27 reads out a proper replay subject index from the replay subject index storage unit 25B, and then, reads out broadcast data corresponding to this read replay subject index from the buffer disk 21 to supply the read broadcast data to the decoder 8a. As a result, in the CM broadcast time range, both the picture and the speech, which correspond to the replay subject (highlight scene) designated by the audience, may be supplied instead of the CM broadcast program.

Similar to the first embodiment, in accordance with the third embodiment, since the highlight scene is reproduced during the CM broadcast time, both the problem occurred while the CM program is watched and the problem of the zapping operation can be solved at the same time. Furthermore, since the replay subject wanted by the audience is registered as the highlight scene, the audience can more deeply enjoy watching the broadcast program.

[Fourth Embodiment]

Next, a description is made of a fourth embodiment according to the present invention. A receiver of this fourth embodiment owns such an arrangement capable of solving the below-mentioned problems.

In the first to third embodiments, in the case that length of the highlight scene is longer than the length of the CM program, the reproducing operation of the highlight scene is automatically accomplished at the time instant when the end of this CM program is sensed, and then, the highlight scene watching mode is returned to the program watching mode. As a result, the first to third embodiments cannot satisfy such a requirement made by the audience that this audience wishes to continuously watch the highlight scene.

Since both a hardware construction and a functional block of the receiver according to the fourth embodiment are similar to those of the above-explained first embodiment (see FIG. 1 and FIG. 2), explanations of these hardware construction/functional block are omitted. It should be understood that the operation of the receiver according to the fourth embodiment is different from that of the first embodiment.

Figure 15:
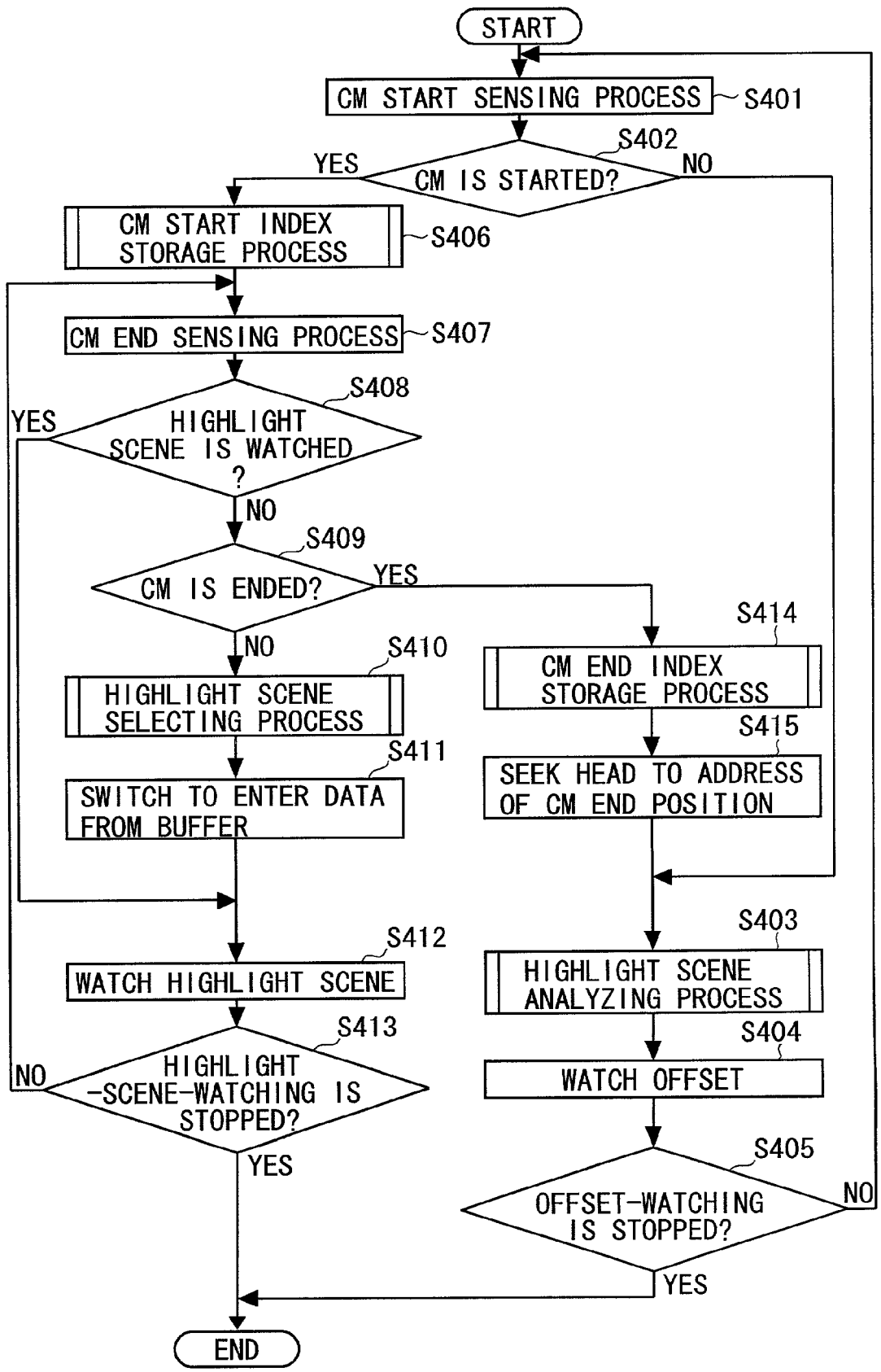
FIG. 15 is a flow chart for describing operations of a broadcast receiver according to a fourth embodiment of the present invention.

FIG. 15 is a flow chart for explaining operation of the receiver 20 according to the fourth embodiment. This receiver operation of the fourth embodiment is different from the receiver operation (see FIG. 5) of the first embodiment as follows.

(1) The execution order of both the condition judgment (step S08) for judging the end of the CM broadcast and the condition judgment (step S09) made while the highlight scene is watched, is reversed, ad compared with that of the first embodiment (see steps S408 and S409).

(2) When the end of the CM broadcast is detected (step S409; YES), the address of the CM end position is sought (step S415) and the present mode is advanced to an offset watching mode (step S404).

In other words, in the first embodiment, when the end of the CM broadcast is sensed, the highlight scene watching mode is immediately advanced to the program watching mode (step S04 of FIG. 5). To the contrary, in the receiver of the fourth embodiment, the highlight scene watching mode is not advanced to the program watching mode until the reproducing operation of the highlight scene is accomplished which is being reproduced during the CM broadcasting operation.

As a consequence, in such a case that a length of a highlight scene reproduced in the CM broadcast time range is longer than this CM broadcast time range, when the end position of the CM broadcast is returned after the highlight scene has been watched, the present watching mode is brought into an offset watching mode delayed by preselected time from the program watching mode (real time watching mode).

Figure 16:
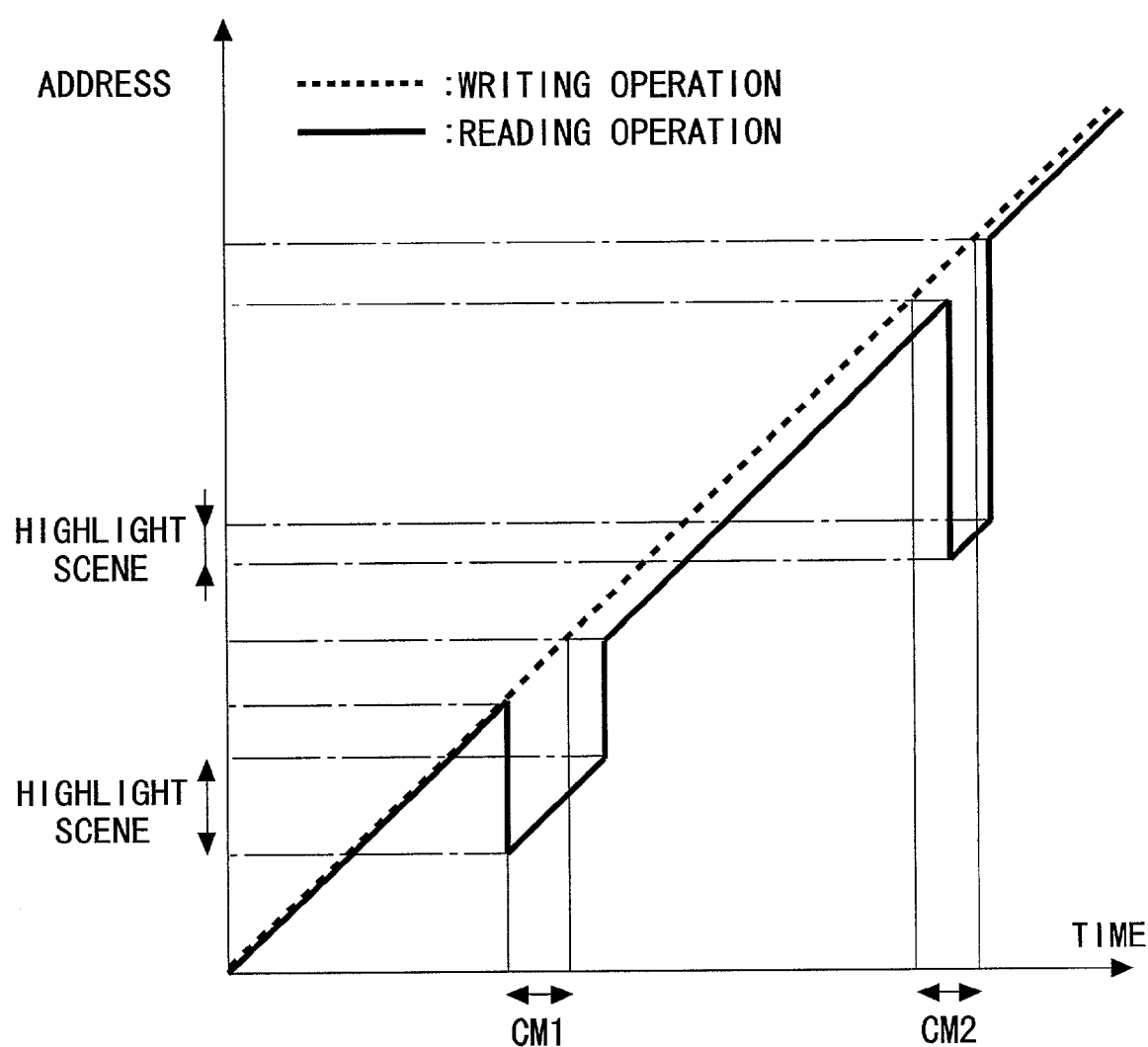
FIG. 16 is a diagram for representing a relationship between a write address and a read address with respect to a buffer disk employed in the broadcast receiver according to the fourth embodiment of the present invention.

FIG. 16 is a diagram for indicating a relationship between a write address and a read address to the buffer disk 21 in the receiver 20 of the fourth embodiment. In FIG. 16, when a CM program starts to be broadcasted, a starting address of a highlight scene is sought and thus, the sought highlight scene is reproduced.

Thereafter, in such a case that the reproducing operation of the highlight scene is not yet accomplished even at the time instant when the CM broadcast is ended, the present watching mode is returned to the CM end position after this highlight scene is accomplished. Thereafter, the offset watching mode is continued until a commencement of a next CM broadcast is sensed. This operation is indicated between the CM broadcast "CM1" and the CM broadcast "CM2" shown in FIG. 16. As apparent from this drawing, there is a time delay from the real time watching operation.

Similar to the program watching mode, in such a case that a commencement of a CM broadcast is sensed during the offset watching mode, a highlight scene is sought. When the highlight scene is ended, the present watching mode is returned to the CM end position. This fact is represented as a portion related to the commercial "CM2" in FIG. 16.

In accordance with the receiver of the fourth embodiment, when the CM broadcast is ended, the present watching mode is not immediately returned to the original broadcasting operation, but the reproducing operation is commenced from the CM end position of the original broadcasting operation after the highlight scene has been accomplished, while using the principle idea of the offset watching mode of the time shift watching operation. As a consequence, even when the length of the highlight scene is long, the audience can continuously watch the program without receiving any stress.

[Fifth Embodiment]

Next, a description is made of a fifth embodiment according to the present invention. A receiver of this fifth embodiment owns such an arrangement capable of solving the below-mentioned problems.

In a television broadcasting program such as movies, for an audience to have a clear recognition of a movie story, a CM program is not inserted into this movie television broadcasting program for a preselected time after this broadcasting program is commenced. However, since a time duration required to broadcast CM programs is determined based upon a contract, these CM programs are concentrately broadcasted in a rear half portion of a broadcast program. As a result, while interests of the audience become emphasized in this rear half program portion, the CM programs are frequently broadcasted, so that this audience may feel strong stress while this audience watches the movie on television.

Since both a hardware construction and a functional block of the receiver according to the fifth embodiment are similar to those of the above-explained first embodiment (see FIG. 1 and FIG. 2), explanations of these hardware construction/functional block are omitted. Also, similar to the fourth embodiment, in the receiver of this fifth embodiment, when a CM broadcast is accomplished while a highlight scene is reproduced, after the reproducing operation of the highlight scene is ended, the offset watching mode is commenced (see FIG. 15).

It should be understood that the operation of the receiver according to the fifth embodiment is different from that of the fourth embodiment. That is, the reproducing time of the highlight scene which is provided to the audience while the CM program is broadcasted is always made longer than the CM broadcasting time. As a result, in the CM broadcasting time range which is inserted into the rear half portion of the broadcast program, a time difference between a real time watching operation and an offset watching operation (time difference between broadcasting time instant and reproducing time instant in television broadcasting operation) may become longer than the CM broadcasting time. As a consequence, the audience can watch this television broadcasting program under such a condition that the CM broadcast is completely cut from this television broadcasting program.

Figure 17:
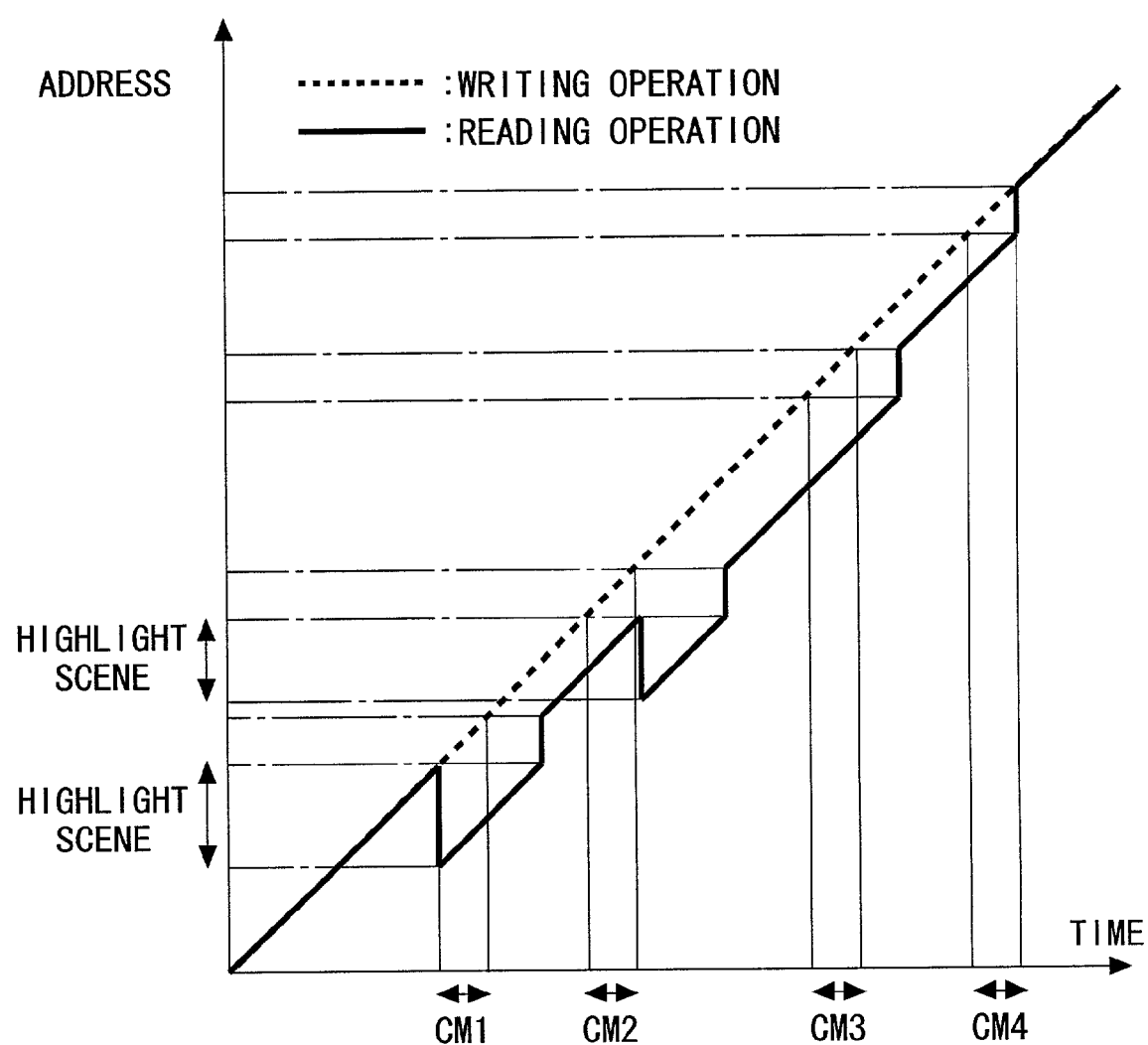
FIG. 17 is a diagram for indicating a relationship between a write address and a read address with respect to a buffer disk employed in a broadcast receiver according to a fifth embodiment of the present invention.

FIG. 17 is a diagram for indicating a relationship between a write address and a read address to the buffer disk 21 in the receiver 20 of the fifth embodiment. In FIG. 17, when a CM program starts to be broadcasted, a starting address of a highlight scene is sought and thus, the sought highlight scene is reproduced. At this time, the present watching operation is returned to the end position of the CM broadcast.

In this embodiment, the reproducing time of the highlight scene is made slightly longer, and this highlight scene is inserted to a front half portion of a broadcast program and is reproduced while a CM program is broadcasted. As a result, in the CM broadcasting time range which is inserted into a rear half portion of the broadcast program, the time difference between the real time watching operation and the offset watching operation is prolonged. As a result, in the CM broadcasting time range of the program rear half portion, even when the highlight scene is not reproduced, the CM broadcasting operation can be cut. This fact is indicated as a portion of a commercial program "CM3" and a portion of a commercial program "CM4" indicated in FIG. 17.

In accordance with the fifth embodiment, the length of the highlight scene is continuously prolonged and inserted in the CM broadcast time in the front half portion of the program, whereas no highlight scene is inserted in the CM broadcast time in the rear half portion of this program. As a result, as the program proceeds to the real half portion, the time difference between the original program broadcast and the actually watched scenes will become longer. This time is allocated to the CM broadcast time in the rear half portion of the program, and may be used so as to cut the CM program.

As a consequence, in such a case that the audience watches such a program having a story such as movies and TV dramas on the television, this audience can be released from the CM programs which are frequently inserted into the rear half portion of the program, and therefore, can watch a climax portion of this program without interruptions of the CM programs. As a result, the audience can watch this broadcast program with his satisfaction.

[Sixth Embodiment]

Next, a description is made of a sixth embodiment according to the present invention. Since both a hardware construction and a functional block of a receiver according to the sixth embodiment are similar to those of the above-explained first embodiment (see FIG. 1 and FIG. 2), explanations of these hardware construction/functional block are omitted.

It should be understood that the operation of the receiver according to the sixth embodiment is different from that of the first embodiment as to such a point that a program digest is used as a highlight scene. This program digest implies that highlight scenes contained in a broadcast program, and acquired from a time instant when a preceding CM broadcasting time range is ended up to another time instant when a present CM broadcasting program is commenced (CM broadcasting time range) are coupled to each other without deteriorating a flow of a story.

The program digest may be formed in such a manner that the reproducing management unit 27 reproduces a plurality of highlight scenes detected by the analyzing unit 22 in accordance with, for instance, the below-mentioned method.

(1) In such a case that a plurality of highlight scenes are detected by the analyzing unit 22 from a program during a CM broadcasting time range, and the present CM broadcast is commenced, the reproducing management unit 27 reproduces a plurality of detected highlight scenes in a time sequential manner by equally increasing a reproducing speed.

(2) While the analyzing unit 22 detects, for example, a scene where actors speak many lines as a plurality of highlight scenes from broadcast data in a program during a CM broadcasting time range, the reproducing management unit 27 continuously reproduces a plurality of detected highlight scenes when a CM broadcast is commenced.

It should also be noted that if a content of a program during a CM broadcast time range is used and also a story of this program content is not deteriorated, then this program digest may be edited in any way.

Figure 18:
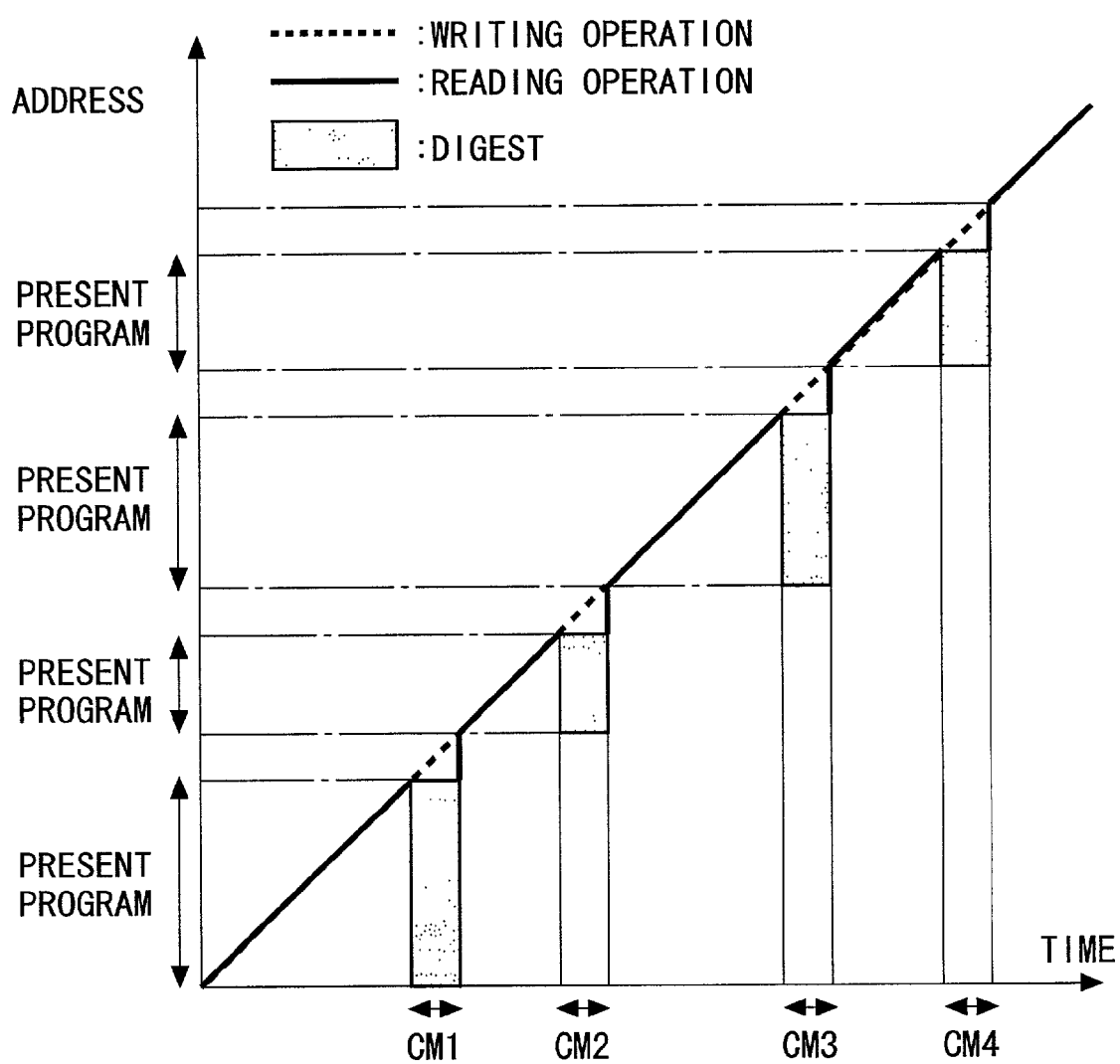
FIG. 18 is a diagram for representing a relationship between a write address and a read address with respect to a buffer disk employed in a broadcast receiver according to a sixth embodiment of the present invention.

FIG. 18 is a diagram for indicating a relationship between a write address and a read address to the buffer disk 21 in the receiver 20 of the sixth embodiment. In FIG. 18, a grey meshed portion indicates such a fact that a program digest is reproduced, and this program digest is related to such a program which has been broadcasted in the CM broadcasting time range immediately before in each of the CM broadcasting time ranges.

For example, in a CM broadcasting time range of "CM2", a program digest is provided to an audience. This program digest is related to a content of a program defined from a time instant when "CM1" is completed until "CM2" is commenced, which correspond to a CM broadcasting time range before this "CM2". Thereafter, when the end of this CM broadcast is sensed, the reproduction of the program digest is ended, and then, the present watching mode is advanced to the program watching mode.

In accordance with the sixth embodiment, as the highlight scene, such a program digest is reproduced, which is acquired for a time duration defined from a position where the preceding CM is inserted until the present CM is commenced. As a consequence, when the audience watches such a program having a story such as movies and dramas, this audience can confirm a rough outline of this story during the CM broadcasting time, and can again confirm the content of the program in such a case that the audience has not grasped the content of this story under heartless condition. Since the program digest is automatically displayed during the CM broadcasting time, this program digest display may give very large merits to the user.

[Seventh Embodiment]

Next, a description is made of a seventh embodiment according to the present invention. Since both a hardware construction and a functional block of a receiver according to the seventh embodiment are similar to those of the above-explained first embodiment (see FIG. 1 and FIG. 2), explanations of these hardware construction/functional block are omitted. It should be understood that the operation of the receiver according to the seventh embodiment is different from that of the first embodiment as to such a point that a CM broadcast program portion of a CM broadcast program, which is temporally returned (retraced) back from a starting time instant of this CM broadcast program by a constant time period, is used as a highlight scene.

For example, in the case that a CM broadcasting time range contained in a broadcast program is 2 minutes, the analyzing unit 22 detects a program portion of a CM broadcast program as a highlight scene, and this program portion is temporally returned back from a starting time instant of this CM broadcast program by 2 minutes. Then, the analyzing unit 22 records a highlight index (staring address, end address, etc.) of this highlight scene on the highlight index storage unit 25. Thereafter, when the commencement of the CM broadcast is sensed, the reproducing management unit 27 reproduces this program portion in accordance with the highlight index.

Thereafter, when the CM end sensing unit 24 senses an end of this CM broadcast, the reproducing management unit 27 switches the present watching mode to the program watching mode. As a consequence, the audience can watch the broadcast program under such a condition that the CM broadcast program has been cut out from this program.

Figure 19:
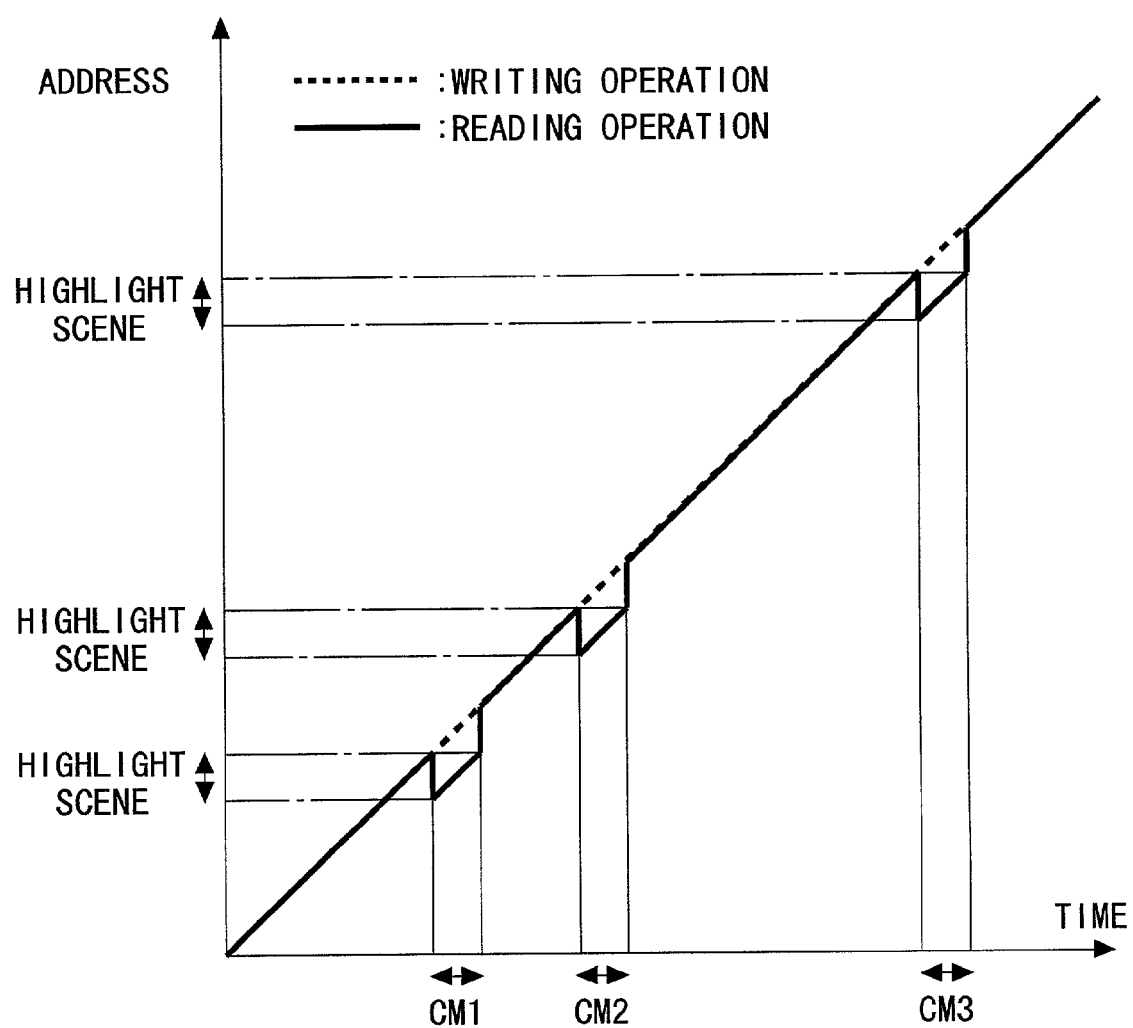
FIG. 19 is a diagram for indicating a relationship between a write address and a read address with respect to a buffer disk employed in a broadcast receiver according to a seventh embodiment of the present invention.

FIG. 19 is a diagram for indicating a relationship between a write address and a read address to the buffer disk 21 in the receiver 20 of the seventh embodiment. In FIG. 19, when a CM program starts to be broadcasted, such a fact is indicated that an address retraced for a length of a CM broadcasting time range is sought.

Also, there is shown such a fact in FIG. 19, that at a time instant when an end of a CM broadcast is sensed, the present watching mode is advanced to the program watching mode, and then, an audience watches a program in real time. This may achieve the same effect in the case that the audience watches the program from which the CM broadcast is cut out.

In accordance with the seventh embodiment, as the highlight scene, the CM program portion is reproduced, which is retraced from the broadcast program just before the CM program is commenced only by a previously-designated time duration. As a result, when the audience watches such a program having a story such as movies and dramas, the audience can continuously watch this program without the story being interrupted by the CM program, which is very useful for the audience.

[Eighth Embodiment]

Next, a description is made of an eighth embodiment according to the present invention. Since both a hardware construction and a functional block of a receiver according to the eighth embodiment are substantially similar to those of the above-explained first embodiment (see FIG. 1 and FIG. 2), explanations of these hardware construction/functional block are omitted. It should be understood that the operation of the receiver according to the eighth embodiment is different from that of the first embodiment. That is to say, while the analyzing unit 22 applies weight with respect to a plurality of detected highlight scenes, the reproducing management unit 27 changes a reproducing speed in response to a weight of a highlight scene.

FIG. 20 is an explanatory diagram for explaining a data structure of a highlight index storage unit 25H employed in the receiver of the eighth embodiment. In FIG. 20, this highlight index storage unit 25H saves thereinto, every highlight scene, the weighing values (importance degrees: in this example, any value of 1 to 10) of the highlight scenes calculated by the analyzing unit 22 in addition to the starting address, the starting time instant, the end address, the end time instant, and the length of the highlight scene, which are explained in connection with the first embodiment.

The analyzing unit 22 performs the weighing operation in accordance with the below-mentioned manner, for example. That is, in such a scene that a screen owns small movement, the analyzing unit 22 sets the weight of the highlight scene to a small weight value. The reason resides in that even when the screen is fed in a fast speed, since a change in the screens is small, the audience can easily trace the story. To the contrary, in such a scene that a screen owns strong movement, the analyzing unit 22 sets the weight of the highlight scene to a large weight value. The reason resides in that when the screen is fed in the fast speed in such a scene where the movement thereof is strong, it is conceivable that the audience cannot grasp the story. Also, in such a case that the weighting operation is carried out by way of the speech (voice) manner, for example, the analyzing unit 22 sets the small weighting value in such a scene where the actor's lines are few, whereas the analyzing unit 22 sets the large weighting value in such a scene where the actor's lines are alot. Alternatively, the analyzing unit 22 may set the weighing value by combing these parameters.

Figure 21:
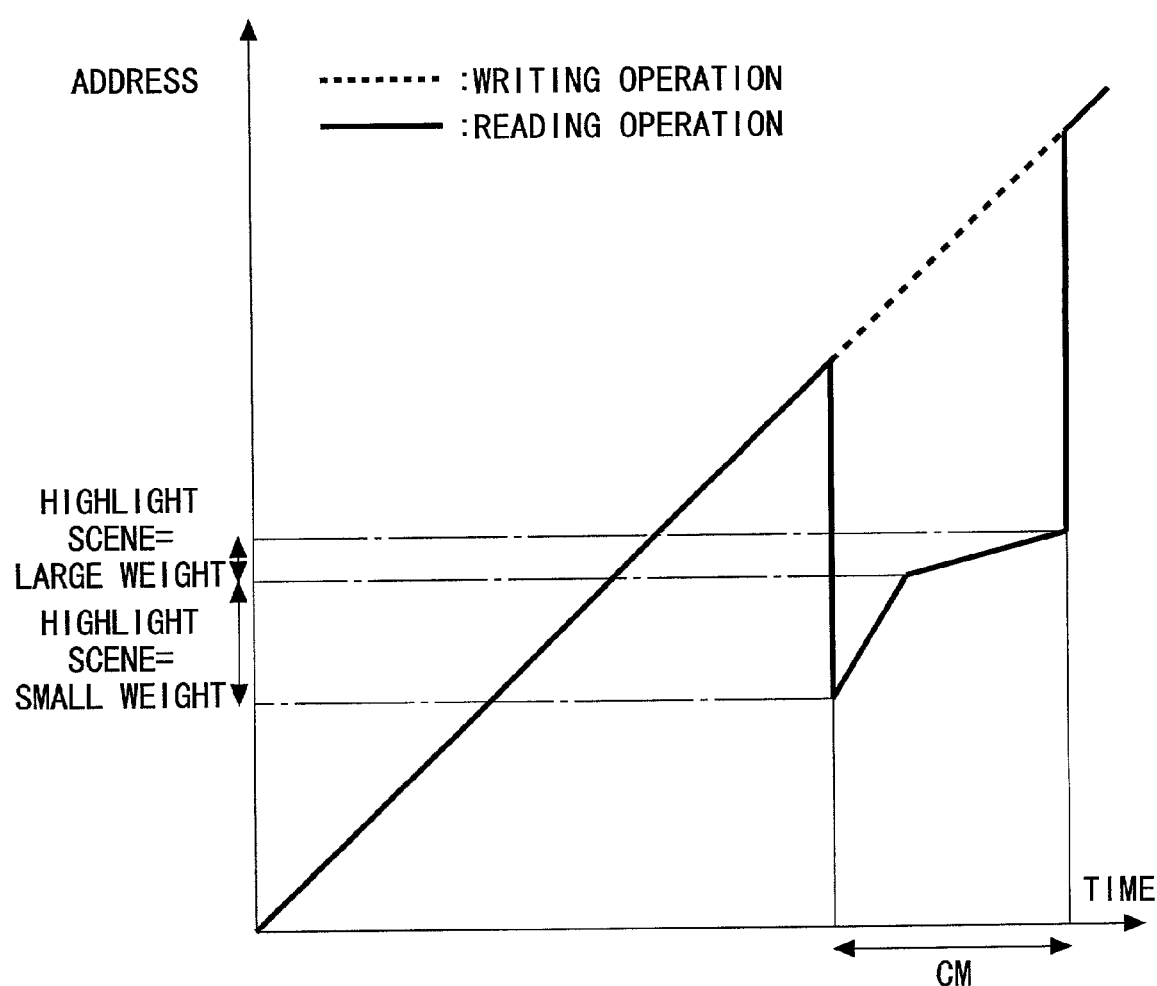
FIG. 21 is a diagram for representing a relationship between a write address and a read address with respect to a buffer disk employed in the broadcast receiver according to the eighth embodiment of the present invention.

FIG. 21 is a diagram for indicating a relationship between a write address and a read address to the buffer disk 21 in the receiver 20 of the eighth embodiment. In FIG. 21, as the highlight scene to be reproduced in the CM broadcasting time range, the weighted scene is used. The highlight scene which has a low importance degree is reproduced in the fast feeding mode, whereas the highlight scene which has a high importance degree is reproduced in the slow feeding mode.

It should also be noted that the above-described arrangement of the receiver of this eighth embodiment may be substituted by the below-mentioned arrangement. That is, as explained in the second embodiment, while both a tag and such data indicative of an importance degree may be added to broadcast data on the side of a broadcast station, the data indicative of the importance degree may be detected by the analyzing unit 22 on the side of the receiver. Alternatively, as explained in the third embodiment, while an audience may designate an importance degree by employing the input device 31, the analyzing unit 22 may detect the designated importance degree.

In the eighth embodiment, an image is provided to the audience, in which the reproducing speed is changed in response to the importance degree of the highlight scene. As a consequence, the audience can confirm the detailed portion of the important scene by way of the slow reproducing operation. Conversely, the audience can watch such a scene having a low importance degree by way of the fast-feed reproducing operation. Accordingly, the audience can watch the important portion in detail, while grasping the entire story to some extent.

[Ninth Embodiment]

Next, a description is made of a ninth embodiment according to the present invention. A receiver of this ninth embodiment owns such an arrangement capable of solving the below-mentioned problems.

In the case that a prize contest source of gifts is displayed to audiences in a broadcast program, this prize contest source is normally displayed only for several seconds. As a consequence, it is practically difficult for audiences to completely write this prize contest source on a memorandum and the like. As a consequence, the audiences memorize this prize contest source and thereafter write the memorized prize contest source on paper, or several audiences try to partially memorize this prize contest source, and thereafter, finally construct the complete prize contest source. To avoid such a difficulty, one broadcast receiver is commercially available and is equipped with such a function that one frame contained in a broadcast program is captured as a still image on a separate window.

However, in this type of broadcast receiver, when such a still image as a destination address displayed on the separate window becomes unnecessary, this still image must be discarded. This still picture discarding operation must be carried out in a manual manner. Also, since the still image is displayed on the separate window, this still image must be located on the uppermost position on the display screen, or the display screen must be changed. Furthermore, in such a case that the still image is displayed in a reducing size mode, resolution of the characters is decreased. There is such a drawback that these characters can be hardly read by the audiences.

Since both a hardware construction and a functional block of a receiver according to the ninth embodiment are substantially similar to those of the above-explained first embodiment (see FIG. 1 and FIG. 2). It should be understood that the operation of the receiver according to the ninth embodiment is different from that of the first embodiment as to such a technical point that the reproducing management unit 27 provides a still image of one scene contained in a broadcast program as a highlight scene to an audience.

Figure 22:
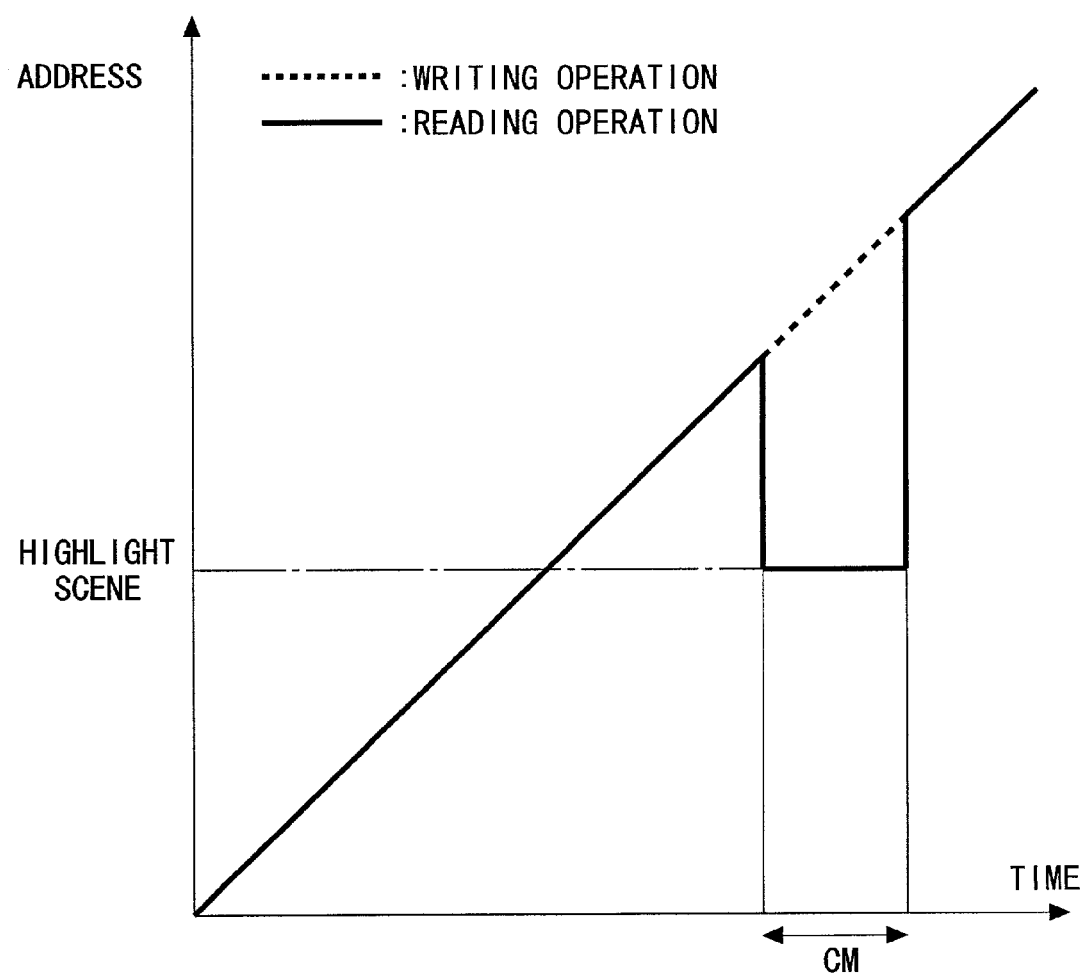
FIG. 22 is a diagram for indicating a relationship between a write address and a read address with respect to a buffer disk employed in a broadcast receiver according to a ninth embodiment of the present invention.

FIG. 22 is a diagram for indicating a relationship between a write address and a read address to the buffer disk 21 in the receiver 20 of the ninth embodiment. In FIG. 22, in accordance with this ninth embodiment, one scene within a broadcast program is displayed by a still image as a highlight scene which is reproduced in a CM broadcasting time range. When the ending of the CM broadcast is sensed, the present watching mode is returned to the program watching mode.

As the still image to be reproduced, for instance, a prize contest source displayed in a broadcast program may be used. The scene of this prize contest source is detected as the highlight scene by the analyzing unit 22, and the reproducing management unit 27 reproduces this highlight scene in the CM broadcasting time range, so that the audiences can correctly write down the prize contest source.

In accordance with the ninth embodiment, as the highlight scene, a plurality of frames (at least one frame) contained in the broadcast program can be utilized by scanning the frames. As a result, the destination address of the prize contest for the audiences, which is displayed in the broadcast program, can be correctly written down on memorandums and the like, while using the CM broadcasting time range, so that the audiences can effectively utilize their own time.

It should also be noted that the method for detecting the highlight scene provided as the still image may be realized by employing either the detecting method of the second embodiment or the third embodiment.

Alternatively, the receiver of the ninth embodiment may be equipped further with a means for notifying an end of a CM broadcast to audiences in such a case that the end of this CM broadcast is sensed. In this alternative case, the following selection may be made. That is, while the destination address is being written down, when the CM broadcast is completed, the still image may be continuously watched by the audiences, or the original broadcast program may be again watched by the audiences. Therefore, such obsessions that the audiences must write down the destination address by the CM broadcast is ended may be lessened.

[Tenth Embodiment]

Figure 23:
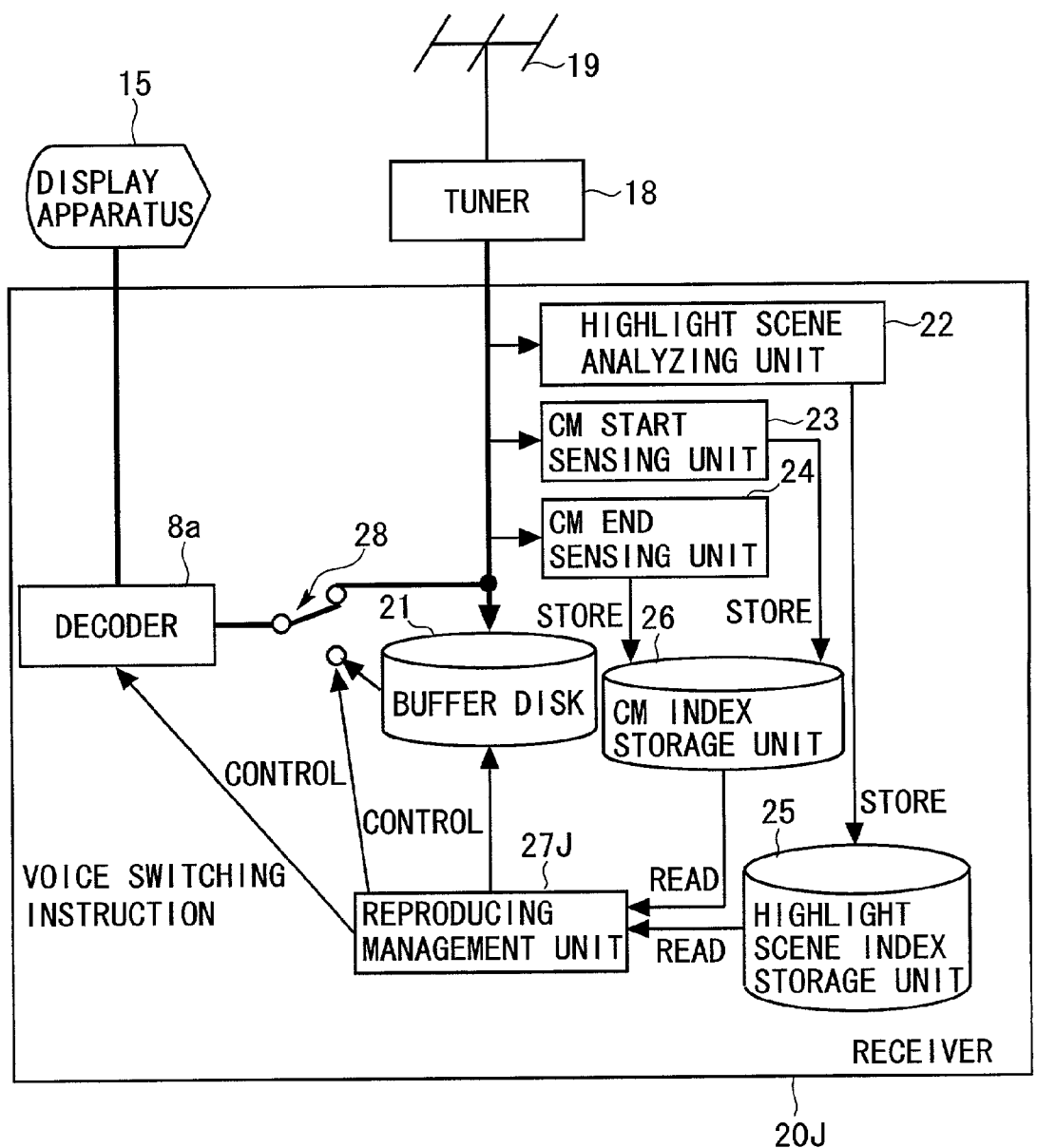
FIG. 23 is a functional block diagram of a broadcast receiver according to a tenth embodiment of the present invention.

Subsequently, a tenth embodiment of the present invention will now be described. FIG. 23 is a functional block diagram for showing a receiver 20J according to the tenth embodiment. As indicated in FIG. 23, in the receiver of the tenth embodiment, a reproducing management unit 27J is different from the above-explained reproducing management unit 27 of the first embodiment.

In other words, since this reproducing management unit 27J switches speech (voice) modes when the highlight scene watching mode is selected and the program watching mode is selected, the reproducing management unit 27J instructs the decoder 8a to switch these speech modes, if required. That is to say, the reproducing management unit 27J may function as a speech control means of the present invention. Other structural elements of this receiver 20J are similar to those of the first embodiment, so that further explanations thereof are omitted.

Figure 24:
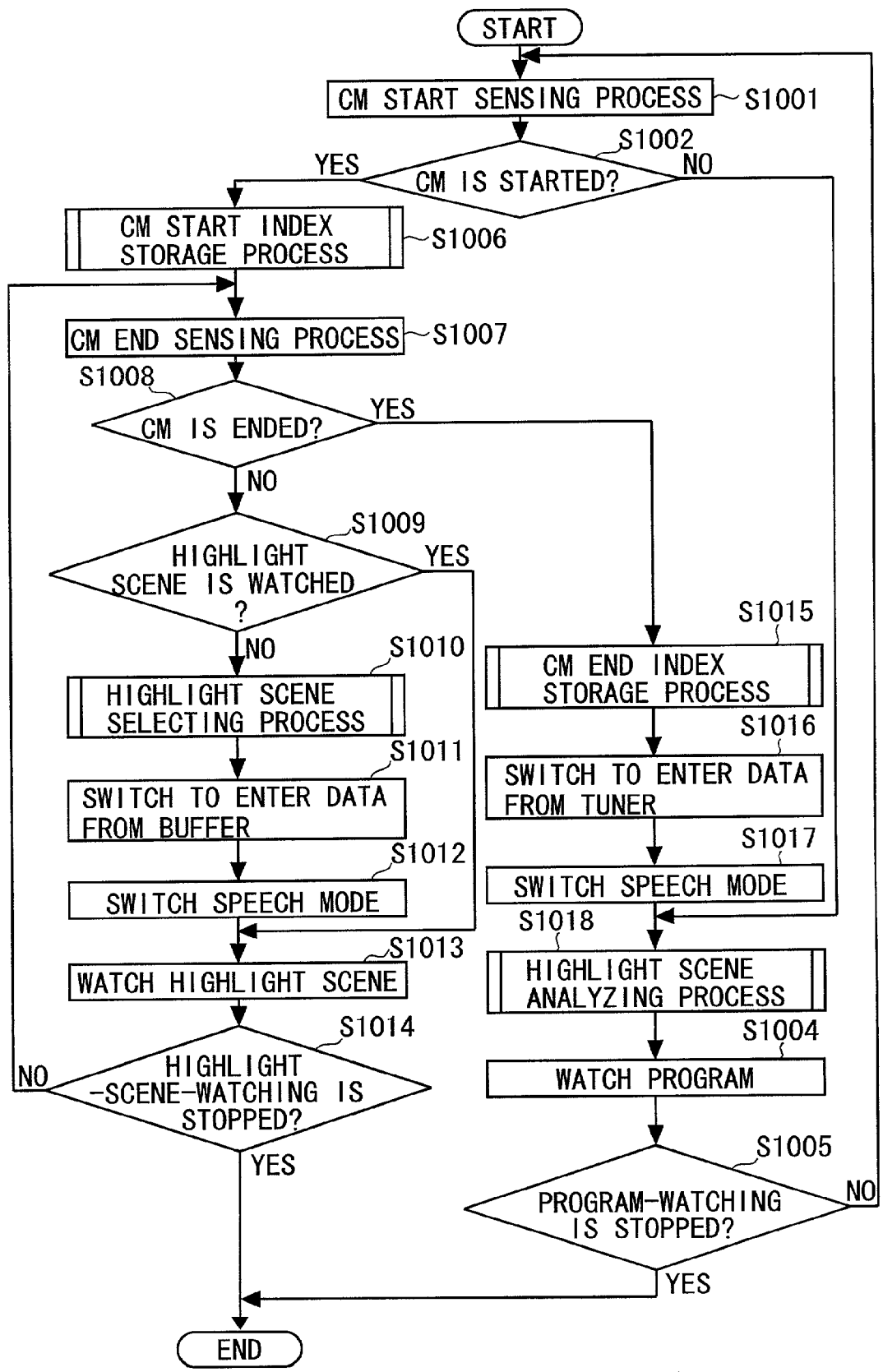
FIG. 24 is a flow chart for describing operations of the broadcast receiver according to the tenth embodiment.

FIG. 24 is a flow chart for explaining the operation of the receiver 20J according to the tenth embodiment. This receiver operation of the tenth embodiment is different from the receiver operation (see FIG. 5) of the first embodiment in that, the flow chart of FIG. 24 is made different from the flow chart shown in FIG. 5 of the first embodiment as to such a technical point that a speech mode switching process defined at steps S1012 and S1017 is interposed between the steps S11 and S12, and also interposed between the steps S15 and S03. The process operations at steps other than the above-described steps are the same as those of the first embodiment. Processings in the other steps are the same as in the first embodiment.

Concretely, in the case that commencement of a CM broadcast is sensed while a broadcast program is watched (step S1002; YES) the reproducing management unit 27J selects a highlight scene (step S1010), and then enters both image data and speech data of the selected highlight scene into the decoder 8a (step S1011).

Furthermore, the reproducing management unit 27J applies the following instruction to the decoder 8a as the speech mode switching process operation. This instruction may switch a speech output channel from a main speech channel to a sub-speech channel (step S1012). As a consequence, the speech (voice) of the highlight scene is outputted from the sub-speech channel.

Thereafter, in the case that the end of the CM broadcast is sensed (step S1008), the reproducing management unit 27J executes the switching operation from the highlight scene watching mode to the program watching mode (step S1016). Subsequently, as the speech mode switching process operation, the reproducing management unit 27J switches the speech output channel from the sub-speech channel to the main speech channel (step S1017).

In the above-explained receiver example, the speech of the broadcast program is watched via the main speech channel in the program watching mode. While the speech of the broadcast program is watched via the sub-speech channel in the program watching mode, contrary to the above example in such a case that this program watching mode is changed into the highlight scene watching mode, this sub-speech channel is switched into the main speech channel. In the case that this highlight scene watching mode is changed into the program watching mode, the main speech channel is switched into the sub-speech channel.

In accordance with the receiver 20J of the tenth embodiment, when the highlight scene is reproduced, both the image of this highlight scene and the sub-speech (sub-voice) of this highlight scene are provided to the audience. As a result, in particular, when a foreign movie is played, the audience watches the Japanese dubbed version of this foreign movie during the main broadcasting program, whereas the audience may watch by the hero's lines in the original language version, in the highlight scene by utilizing the CM broadcasting time. Furthermore, while the audience watches the main broadcasting program in the original language, the audience may watch the Japanese conversion version of the highlight scene during the CM broadcasting time. As a result, the audience may confirm such a scene which could not be understood in the original language, which may be effectively utilized in the foreign language study using the foreign movies.

[Eleventh Embodiment]

Figure 25:
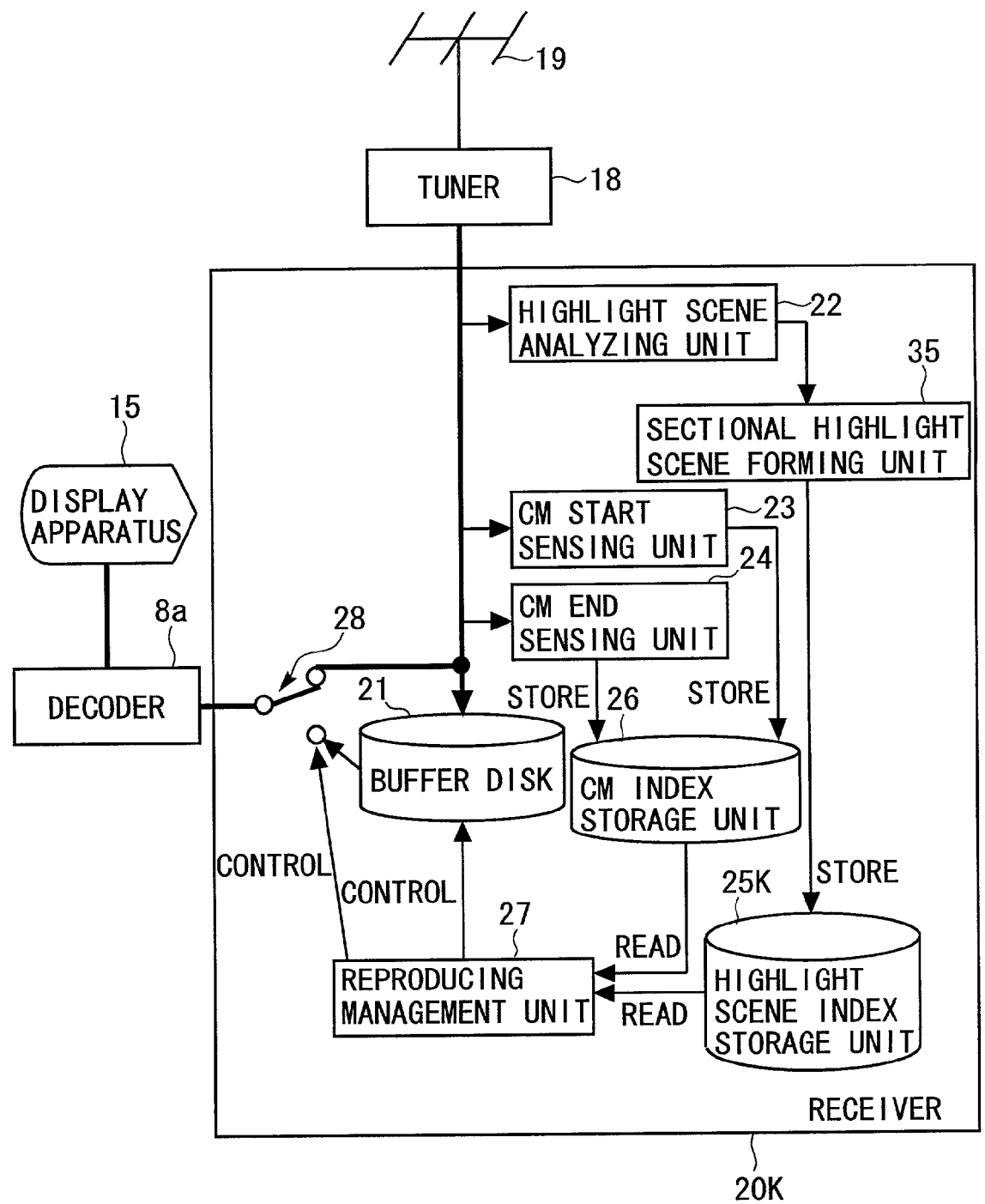
FIG. 25 is a functional block diagram of a broadcast receiver according to an 11th embodiment of the present invention.

Next, a description is made of an eleventh embodiment according to the present invention. A hardware construction of a receiver according to the eleventh embodiment is similar to those of the above-explained first embodiment. FIG. 25 is a functional block for explaining a receiver 20K according to the eleventh embodiment. This receiver 20K owns such a structural difference from that of the receiver 20 (see FIG. 2) according to the first embodiment, that a segmental highlight scene forming unit 35 (will be referred to as a "forming unit 35" hereinafter) is employed between the analyzing unit 22 and the highlight index storage unit 25.

The forming unit 35 is such a function realized by executing a computer program by the CPU2. The forming unit 35 cuts and sorts highlight scenes detected by the analyzing unit 22 into constant lengths thereof. In other words, end time instants of the highlight scenes detected by the analyzing unit 22 are changed in such a manner that the lengths of these highlight scenes become constant, and addresses corresponding to the changed end time instants are acquired as end addresses. Then, this forming unit 35 stores such a highlight index related to the highlight scenes whose lengths are cut and sorted into the highlight index storage unit 25.

As a constant length, for example, a single CM program is normally formed by a time duration of 15 seconds, or multiplication values thereof (15 seconds, 30 seconds, 1 minute). A single CM broadcasting time range is constituted by combining a plurality of CM programs, and therefore, may have a length of either 1 minute or 2 minutes. To this end, the forming unit 35 cuts and sorts the highlight scenes in the unit of 15 seconds. Otherwise, since there are many cases that a one-spot CM program is broadcasted in the unit of 1 minute, the forming unit 35 forms the highlight scenes in the segment of 1 minute.

As a consequence, the highlight scenes whose lengths are made coincident with the length of the CM program can be reproduced while one CM broadcasting program is broadcasted which is made coincident with either a length of a single CM program or a length of plural CM programs, which are broadcasted within one CM broadcasting time range. As a result, a time instant when the CM broadcast is ended can be made coincident with another time instant when the reproduction of the highlight scene is ended.

In accordance with the receiver of the eleventh embodiment, since a length of a single CM program is essentially determined by a preselected value, the CM program is formed coincident with the length of the highlight scene CM, so that the highlight scene may be reproduced only during the CM broadcasting time. In other words, since the forming unit 35 forms the length of the highlight scene in the unit of 1 minute, in such a case that the length of the CM broadcasting time range is increased or decreased in the unit of 1 minute, the highlight scene can be just inserted into this CM broadcasting time range. As a consequence, the audience can completely watch the highlight scene instead of the CM program.

[Twelfth Embodiment]

Figure 26:
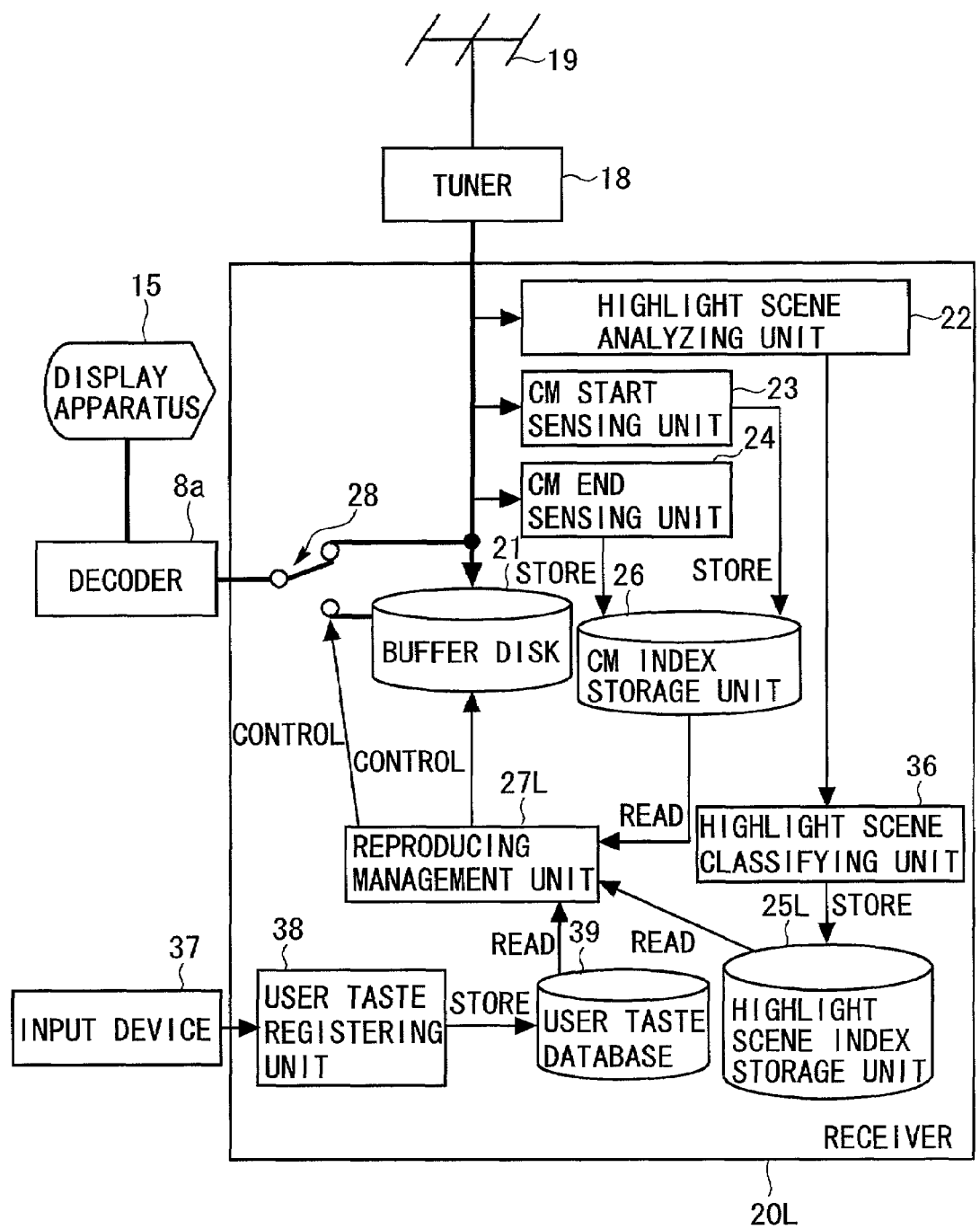
FIG. 26 is a functional block diagram of a broadcast receiver according to a 12th embodiment of the present invention.

Next, a description will now be made of a twelfth embodiment of the present invention. A construction of a receiver according to the twelfth embodiment is substantially the same as that of the first embodiment (see FIG. 1). FIG. 26 is a functional block of a receiver 20L according to the twelfth embodiment.

It should be understood that since the receiver 20L is similar to the receiver 20 of the first embodiment except for the below-mentioned technical aspect, common technical aspects thereof are omitted.

(12-1): A highlight scene classifying unit 36 (will be referred to as "classifying unit 36" hereinafter) is provided between the analyzing unit 22 and a highlight index storage unit 25L.

(12-2): The input device 37 is provided outside the receiver 20L, and also both a user taste registering unit 38 and a user taste database 39 are provided inside the receiver 20L.

The classifying unit 36 corresponds to such a function realized by executing a computer program by the CPU 2. The classifying unit 36 classifies a highlight scene detected by the analyzing unit 22 into any one of the plurality of genres. A genre indicates an attribute of a highlight scene, for instance, this attribute represents a nature scene, an action scene, a love scene, and the like.

Similar to the analyzing unit 22, the classifying unit 36 may classify a highlight scene in accordance with a previously saved classification condition, by using a speech recognition of this highlight scene, an image recognition thereof, and a combination of these speech/image recognitions. The classification condition may be defined in accordance with a screen element contained in a scene, and a trend (directivity) of a speech.

For example, when the classified genre is a natural scene, since there is a small number of screen elements constituted by straight lines, in such a case that the straight line components of the screen elements of the highlight scene are smaller than or equal to a preselected value, the classifying unit 36 judges the relevant highlight scene as the natural scene, and then classifies this highlight scene into such a genre corresponding to the natural scene.

Also, when the classified genre is an action scene, the following trend may exist. That is, an object greatly moves around, and BGM and effective sounds become active and strong. As a consequence, in such a case that screen elements and sounds of a highlight scene are made coincident with the above-explained trend, the classifying unit 36 judges this highlight scene as the action scene.

Furthermore, generally speaking, a love scene is constituted by two persons. There is such a trend that voices of these persons are low, and BGM such as a ballad is used. As a result, when screen elements of a highlight scene is made coincident with this trend, the classifying unit 36 judges this highlight scene as the love scene.

It should be noted that the present invention is not limited to the above-explained example, but may be applied to the following case. That is, when the classification condition is determined in accordance with a trend (directivity) responding to an attribute of a specific genre, a highlight scene may be furthermore classified into a plurality of genres.

For instance, while voice of a specific actor and a talent are sampled, if a highlight scene contains such voice coincident with the sampled voice, then only such a scene that either a specific actor or a talent appears may be collected.

Then, the classifying unit 36 allocates a numeral value indicative of a genre to a highlight scene in accordance with a classification result of this highlight scene, and stores this numeral value into the highlight index storage unit 25L as one of the elements of highlight indexes.

FIG. 27 is an explanatory diagram for explaining a data structure of a highlight index storage unit 25L employed in the receiver of the twelfth embodiment. As shown in FIG. 27, this highlight index storage unit 25L saves thereinto the numeral values (in this example, any one of 1 to 10) indicative of the genres of the highlight scenes in addition to the starting address, the starting time instant, the end address, the end time instant, and the length of the highlight scene (see FIG. 3), which are explained in connection with the first embodiment.

The input device 37 may be arranged by the pointing device such as the keyboard 16 and the mouse 17, a remote controller, or a microphone for processing a speech recognition of an audience and a speech recognizing apparatus. The input device 37 may be used so as to register own tastes of the audiences (users). Concretely speaking, an audience inputs a numeral value indicative of the own degree of taste with respect to each of previously-prepared genres by employing the input device 37.

The user taste registering unit 38 corresponds to such a function realized by executing a computer program by the CPU 2. When the degree of taste is entered from the input device 37, the user taste registering unit 38 registers this inputted degree of taste into the user taste database 39.

FIG. 28 is an explanatory diagram for explaining a data structure of the user taste database 39. As indicated in FIG. 28, the user taste database 39 owns such data items as to genres of highlight scenes, and also the degrees of taste of audiences corresponding to these genres. In this database, the larger the numeral value the degree of taste, the higher the taste characteristic.

It should be noted that in this example, only the table with respect to one audience is indicated. Alternatively, while plural sets of such tables shown in FIG. 28 are provided, the degrees of taste of plural audiences may be registered into these tables.

A reproducing management unit 27L manages reproducing operations of the highlight scenes recorded on the buffer disk 21 based upon the CM index, the highlight index, and also the content saved in the user taste database 39.

Operations of the receiver 20L according to the twelfth embodiment is substantially the same as those of the receiver according to the first embodiment, shown in FIG. 5. It should also be noted that the operations of a highlight selection process operation defined in a step S10 is different from that of the first embodiment. That is, in the twelfth embodiment, the below-mentioned operation is carried out at the step S10.

The reproducing management unit 27L sequentially selects and reproduces such highlight scenes which may agree to the taste of the audience from a plurality of highlight scenes as a highlight scene to be reproduced while a CM program is broadcasted.

In other words, the reproducing management unit 27L recognizes the degrees of taste with respect to the respective genres of the audiences with reference to the user taste database 39. Subsequently, the reproducing management unit 27L sequentially selects and reproduces such highlight scenes of genres in which the degrees of taste of the users are high with reference to the highlight index storage unit 25L. As a result, the highlight scenes in which the degree of taste of the user is high are reproduced with top priority among a plurality of highlight scenes.

As a consequence, the audience of the broadcast program can watch the highlight scenes in the CM broadcasting time range in the order of the own desirable taste.

In accordance with the receiver of the twelfth embodiment, when the degrees of taste of the audiences are previously registered, the highlight scenes are reproduced in the order of the degrees of taste thereof. In other words, in accordance with the twelfth embodiment, the highlight scenes can be provided with the audiences in response to the tastes which are defined based on the attributes (sex, age, character, etc.) of the audience. Therefore, the audiences can have the satisfactory feelings made by watching the highlight scenes over a wide range.

[Thirteenth Embodiment]

Figure 29:
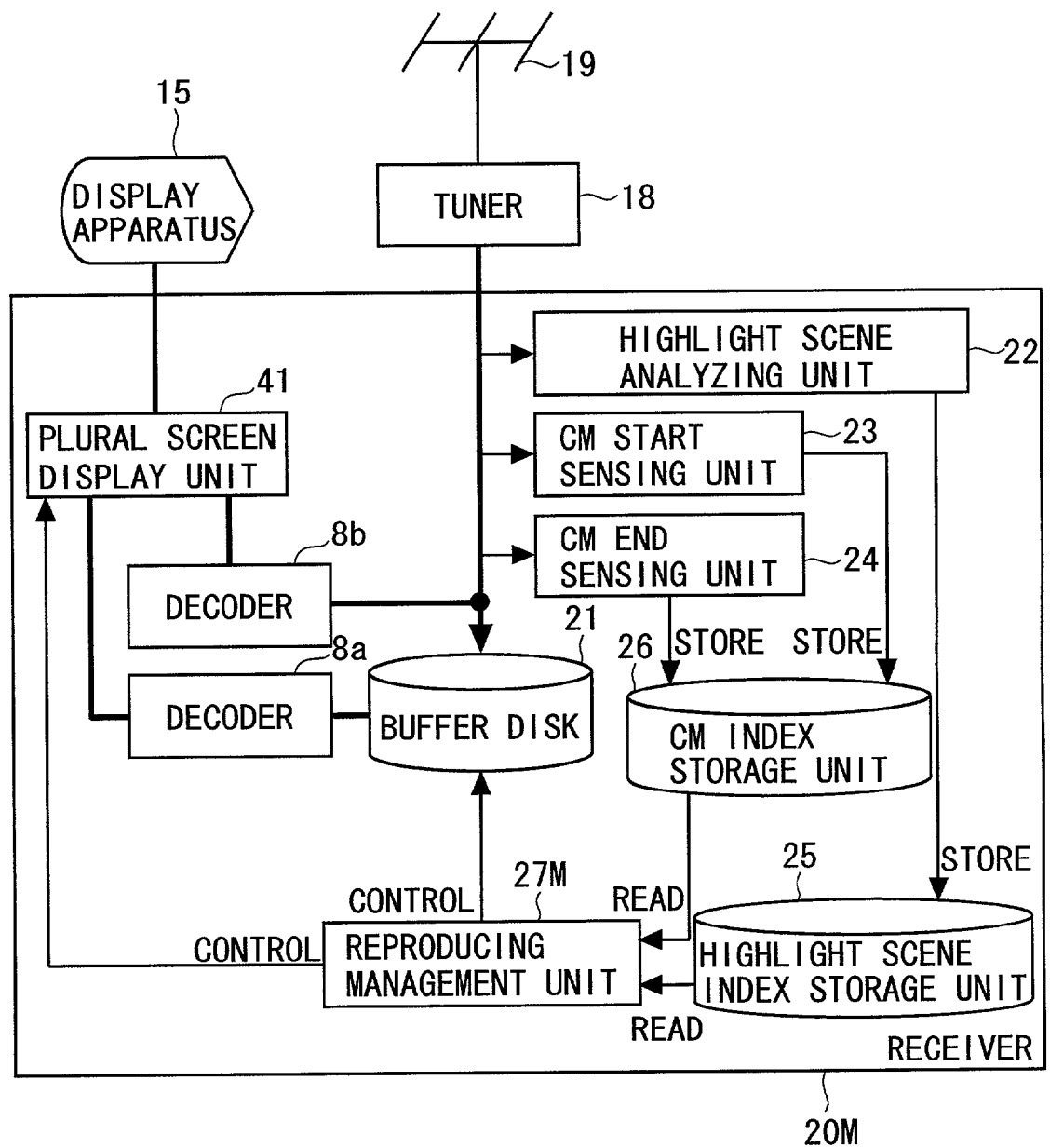
FIG. 29 is a functional block diagram of a broadcast receiver according to a 13th embodiment of the present invention.

Next, a description will now be made of a thirteenth embodiment of the present invention. A construction of a hardware according to the thirteenth embodiment is substantially the same as that of the first embodiment (see FIG. 1). FIG. 29 is a functional block of a receiver 20M according to the thirteenth embodiment.

It should be understood that since the receiver 20M is similar to the receiver 20 of the first embodiment except for the below-mentioned technical aspect, common technical aspects thereof are omitted.

(13-1): No switch 28 is employed. A decoder 8b into which only broadcast data derived from the tuner 18 is entered is connected in parallel to another decoder 8c into which only broadcast data derived from the buffer disk 21 is entered.

(13-2): A plural screen display unit 41 (equal to display control unit) is employed which is connected to the respective decoders 8b and 8c, and furthermore, to the display apparatus 15.

(13-3): A reproducing management unit 27M controls operation of the plural screen display unit 41.

Figure 30:
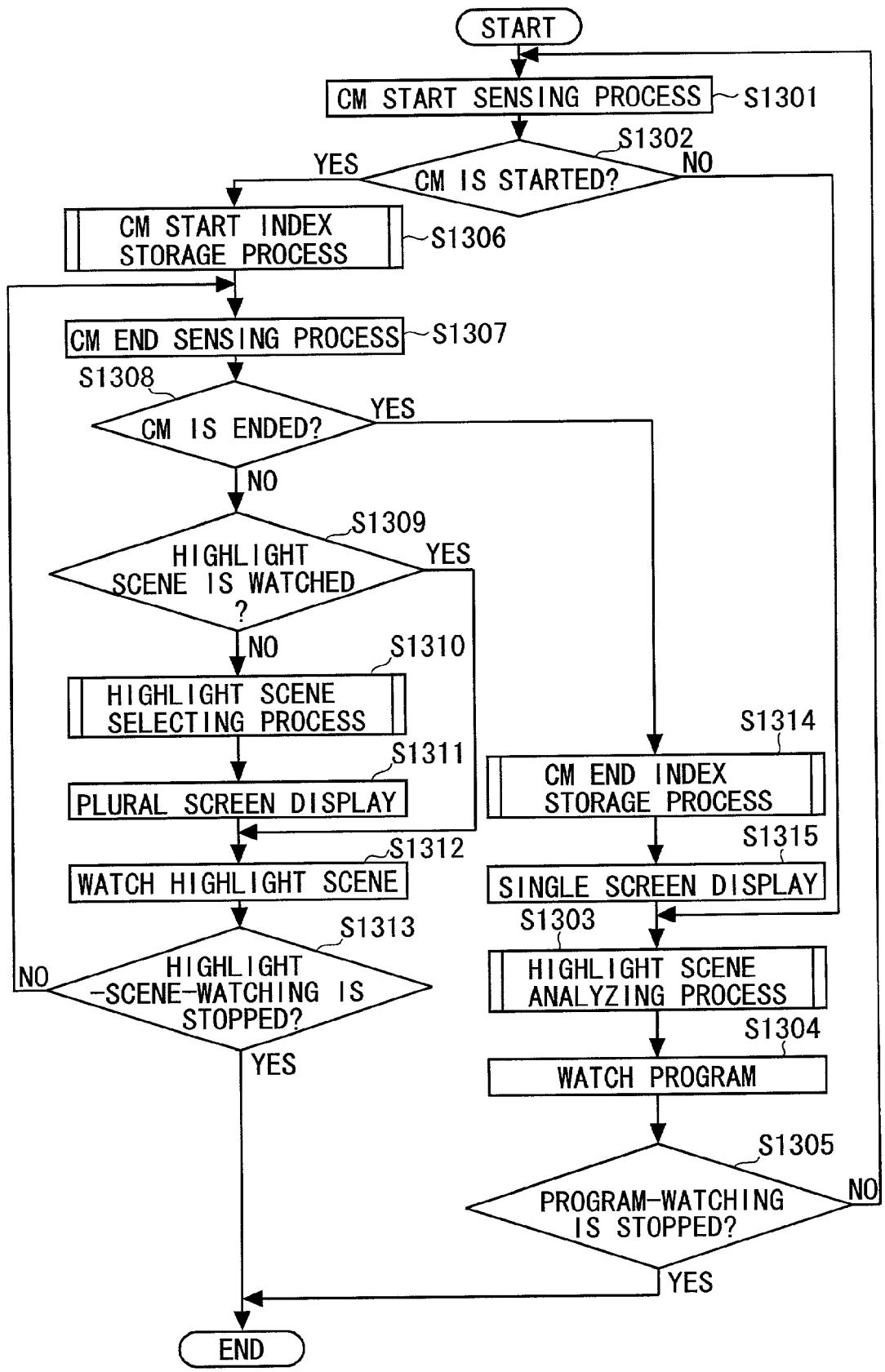
FIG. 30 is a flow chart for describing operations of the broadcast receiver according to the 13th embodiment.

FIG. 30 is a flow chart for indicating operations of the receiver 20M according to the thirteenth embodiment. The flow chart of FIG. 30 owns such a different step, instead of the process operations defined at the steps S11 and S15 in the flow chart of the first embodiment (shown in FIG. 5), a plural screen display process operation (step S1312) is executed instead of the step S11, and also a single screen display process (step S1317) is executed instead of the step S15. The process operations other than those of the above-explained steps are the same as those of the first embodiment.

Concretely speaking, since the receiver 20M of the thirteenth embodiment employs the arrangement of FIG. 29, the broadcast data supplied from the tuner 18 is always inputted into the decoder 8b while the audience watches the broadcast program. When the commencement of the CM broadcast is sensed (step S1302), the reproducing management unit 27M instructs the plural screen display unit 41 in such a manner that both the broadcasting screen of the program and the screen of the highlight scene are displayed at the same time on the monitor of the display apparatus 15 (step S1311).

On the other hand, when the end of the CM broadcast is sensed (step S1308), the reproducing management unit 27M instructs the plural screen display unit 41 in such a manner that only the broadcast screen of the program is displayed on the monitor of the display apparatus 15 (step S1315). In this way, the audience is able to watch the highlight scene on a plural screen display during the CM broadcast time range, and when the CM broadcast time range ends, to watch the subsequent program on a single screen display.

Figure 31:
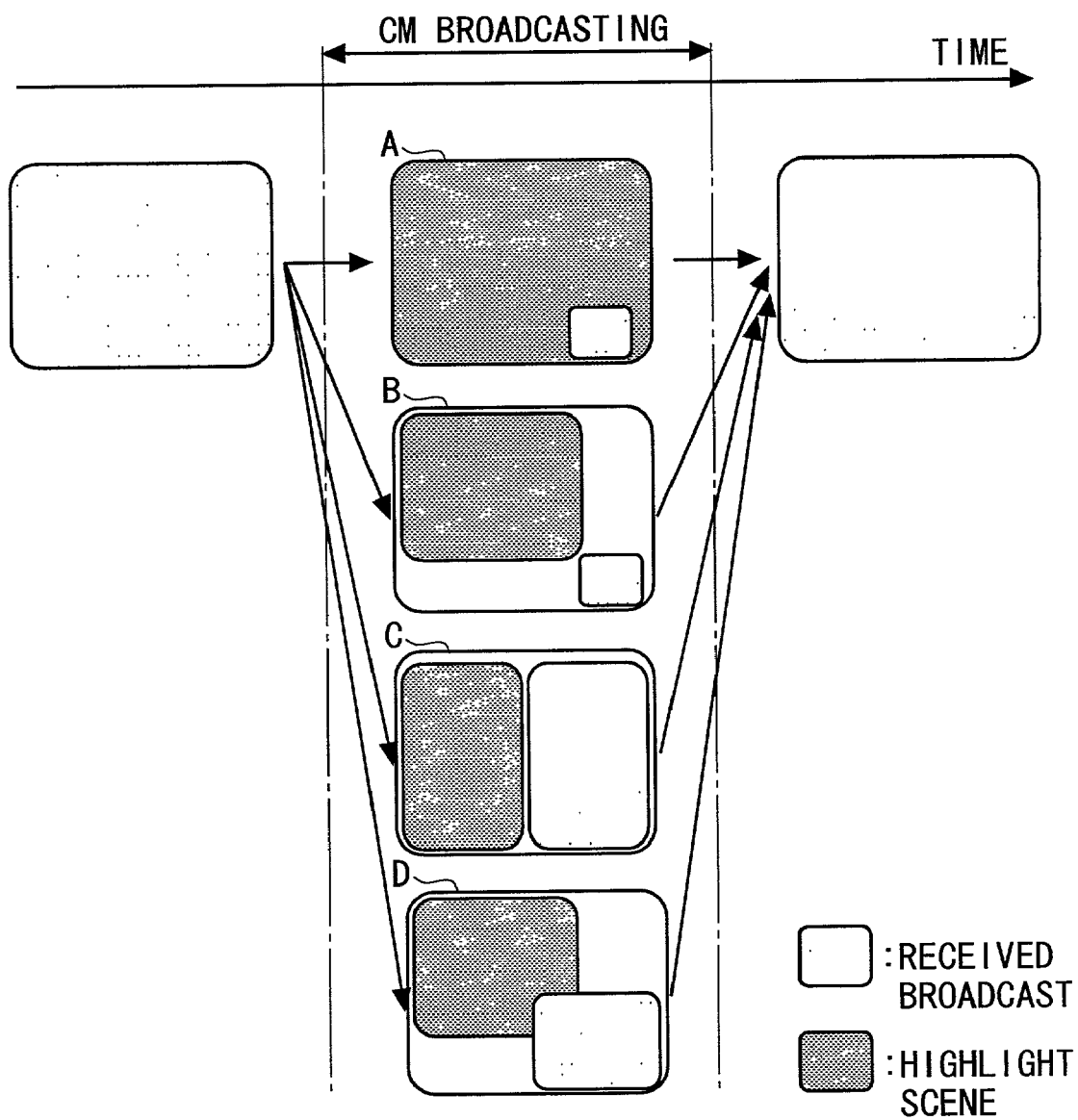
FIG. 31 is a diagram for indicating an example of a screen display image of the broadcast receiver according to the 13th embodiment.

FIG. 31 illustratively shows an example of a screen display image of the receiver according to the thirteenth embodiment. In FIG. 31, 4 pattern examples "A" to "D" are displayed as a pattern example of a plural screen display in a CM broadcasting time range. It should be noted that if the plural screen display is realized, then other pattern examples than the above-explained patterns "A" to "D" may be employed.

The pattern example "A" corresponds to such a display pattern that a screen of a highlight scene (highlight screen) is displayed in a full-sized screen, and a screen received in real time (received broadcast screen) is overlapped on this highlight screen located at a lower right corner in a small screen display.

The pattern example "B" and the pattern example "C" correspond to such a pattern example that the highlight screen is not overlapped with the received broadcast screen. The pattern example "B" is featured by that the size of the highlight screen is larger than the size of the received broadcast screen. The pattern example "C" is featured by that the size of the highlight screen is equal to the size of the received broadcast screen.

In accordance with the receiver of the thirteenth embodiment, both the highlight screen and the received broadcast screen of the CM broadcast are simultaneously displayed on the display apparatus 15 while the CM broadcast is carried out. As a result, the audience can watch the highlight scene at the same time as when the audience watches the received broadcast screen of the CM broadcast. As a consequence, this receiver can meet such a requirement of the audience, that although the audience wishes to watch only a popular CM program and a CM program in which a favorite talent appears, the audience does not wish to watch other CM programs than the above-explained CM programs.

It should also be noted that the highlight scene reproduced in the thirteenth embodiment may be acquired by way of the method of the second or the third embodiment.

[Fourteenth Embodiment]

Next, a description will now be made of a fourteenth embodiment of the present invention. A construction of a hardware according to the fourteenth embodiment is substantially the same as that of the first embodiment (see FIG. 1). A functional block of a receiver 20M according to this fourteenth embodiment is similar to that of the thirteenth embodiment (see FIG. 29).

It should be noted that operations of the receiver of the fourteenth embodiment are different from those of the thirteenth embodiment. In other words, in the fourteenth embodiment, in such a case that both a highlight scene and a CM broadcast are displayed in a plural screen display mode, when the CM broadcast is ended, the plural screen display mode (display mode) is changed. Thereafter, when the reproduction of the highlight scene is ended, the display mode is advanced to the single screen display of the received broadcast screen.

Figure 32:
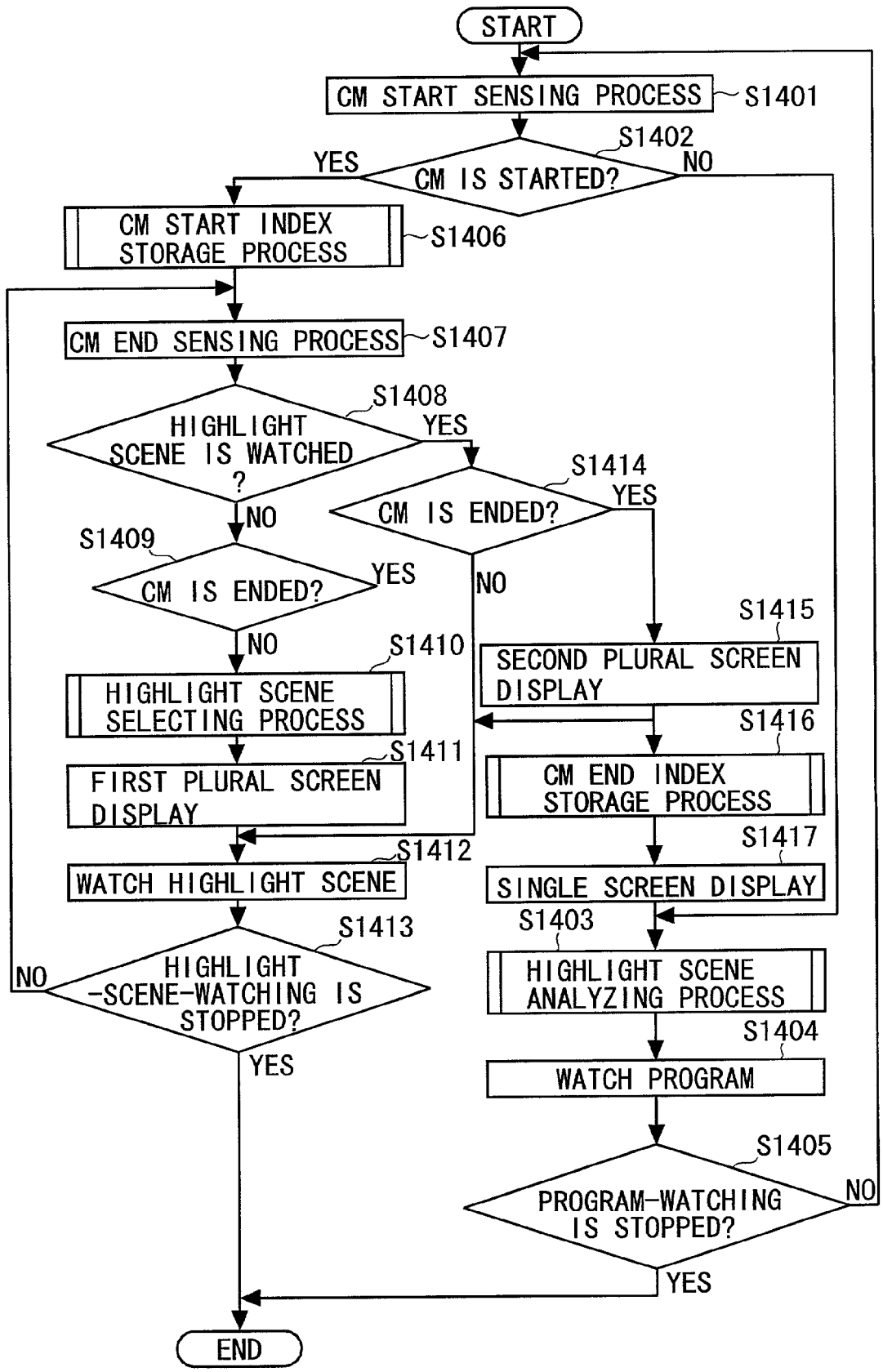
FIG. 32 is a flow chart for describing operations of a broadcast receiver according to a 14th embodiment of the present invention.

FIG. 32 is a flow chart for describing operations of the receiver 20M according to the fourteenth embodiment. Referring now to FIG. 32, a major operation of this receiver 20M will be explained.

At a step S1402, the CM start sensing unit 23 analyzes the broadcast data received from the tuner 18 so as to judge whether or not the CM broadcast is commenced. At this time, when the CM broadcast is not yet commenced (step S1402; NO), a highlight analyzing process operation (step S1403: see FIG. 6) is carried out, and thereafter, the audience watches the broadcast program (step S1404). It should also be noted that the processing order of the steps S1403 and S1404 may be reversed. Thereafter, when the audience continues to watch the broadcast program (step S1405; NO), the process is returned to the step S1401.

On the other hand, in the case that the CM start sensing unit 23 senses the start of the CM broadcast (step S1402; YES), a CM start index storage process operation is executed (step S1406: see FIG. 7(A)). Thereafter, the reproducing operation of the highlight scene is carried out until the end of the CM broadcast is sensed in a CM end sensing process operation (S1407).

That is to say, a highlight selection process operation is executed if required (step S1410: see FIG. 8). A first plural screen display process operation (step S1411) is carried out which is similar to the plural screen display process operation (step S1311) of the thirteenth embodiment. As a result, the audience can watch the highlight scene in the plural screen display mode (step S1412).

Thereafter, when the CM end sensing process (step S1407) is carried out, if the reproducing operation of the highlight scene (step S1408; NO) and also the CM broadcast is accomplished (step S1409; YES), then a CM end index storage process operation (step S1416: see FIG. 7(B)) is executed. Thereafter, the single screen display process operation similar to that of the thirteenth embodiment is carried out (step S1417), and the present watching mode is advanced to the program watching mode (step S1404).

On the other hand, when the CM end sensing process operation (step S1407) is executed, in such a case that the reproducing operation of the highlight scene is not yet ended (in case of highlight watching mode) (step S1408; YES), a check is made as to whether or not the CM broadcast is ended (step S1414).

At this time, when the CM broadcast is not yet ended (step S1414; NO), the process is advanced to a further step S1412. At this step S1412, the reproducing operation/plural screen display operation of the highlight scene are continued. To the contrary, in the case that the CM broadcast is ended while the audience watches the highlight scene (step S1414; YES), a second plural screen display process operation (step S1415) is carried out, and the display pattern of the plural screen display is changed. Thereafter, the process operation is advanced to a step S1412.

Figure 33:
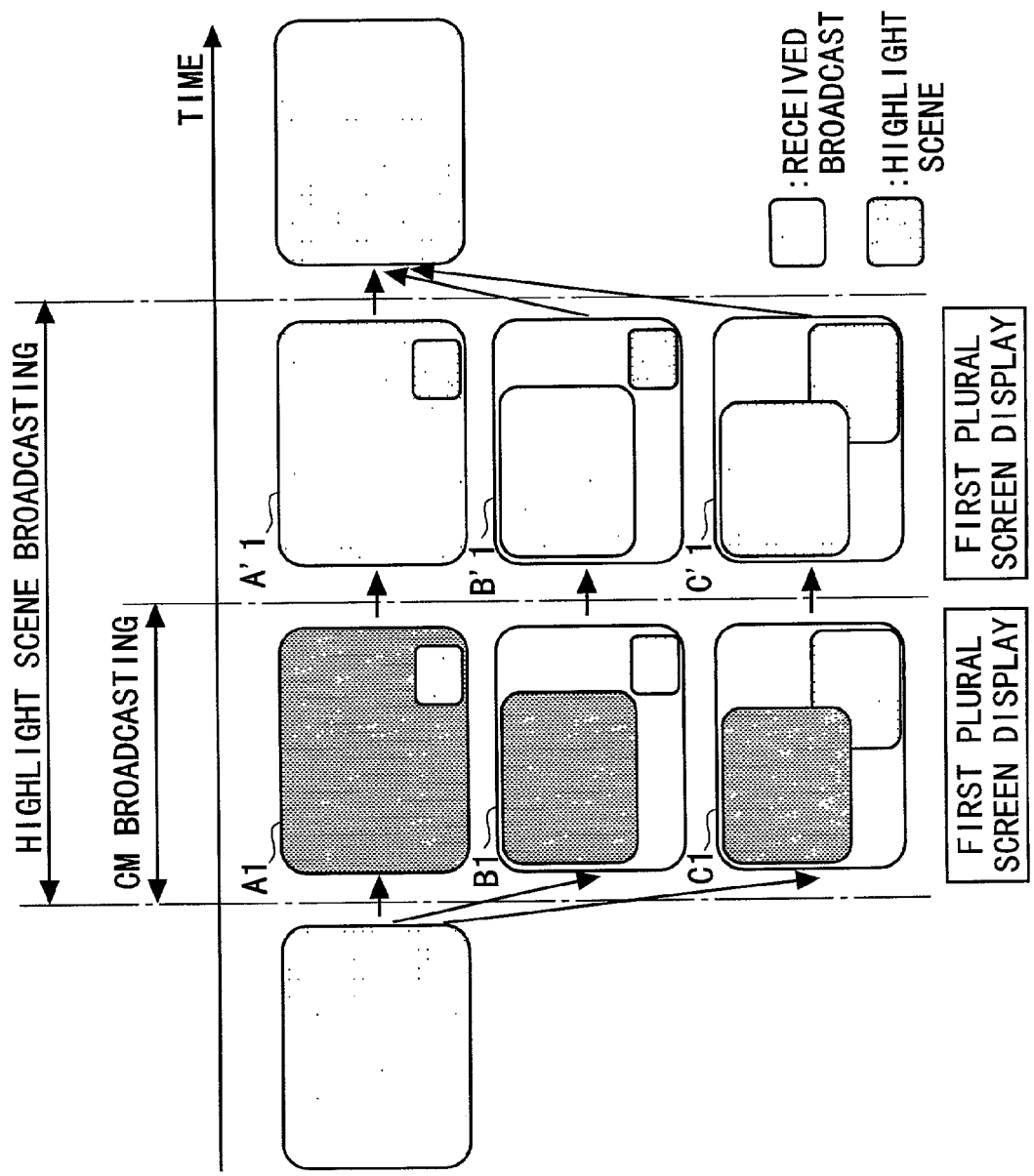
FIG. 33 is a diagram for indicating an example of a screen display image of the broadcast receiver according to the 14th embodiment.

FIG. 33 is an explanatory diagram for explaining a screen display example obtained in connection with the operations of the receiver of the fourteenth embodiment. In FIG. 33, there are three pattern examples A1, B1, and C1. As indicated in FIG. 33, before the CM broadcast is commenced, the received broadcast screen is displayed in the single screen display mode. Thereafter, when the CM broadcast is commenced, the first plural screen display operation is carried out. In the first plural screen display operation, both the highlight screen and the received broadcast screen of the CM broadcast are displayed on the monitor at the same time. On the respective screens, sizes of screens and ordering of display positions are previously given.

In other words, both the pattern examples A1 and B1 are such pattern examples that the orders of the highlight screens are high in view of screen sizes, and the sizes of the highlight screens are larger than the sizes of the received broadcast screens. To the contrary, the pattern example C1 corresponds to such a pattern example that the order of the received broadcast screen of the CM broadcast is high in view of the display position, and the received broadcast screen is displayed in front of the highlight screen.

In such a case that the CM broadcast is accomplished while the audience watches the highlight scene, the display mode is changed into the second plural screen display mode under control of the plural screen display unit 41 by the reproducing management unit 27M. This display mode change is carried out by reversing, for example, the order in the first plural screen display operation.

Pattern examples A'1, B'1, and C'1 shown in FIG. 33 and corresponding to the example of the second plural screen display are such pattern example obtained by reversing the ordering of the first plural screen display, in which the highlight screen is substituted by the received broadcast screen of the program. Thereafter, at a time instant when the audience ends watching the highlight screen, the present screen display operation is returned to the original single screen display operation of the received broadcast screen.

In accordance with the receiver of the fourteenth embodiment, even when the CM broadcast is ended, since the plural screen display operation is executed, the audience can watch the highlight scene and the broadcast program at the same time even after the CM broadcast is ended, and therefore, it is possible to prevent such watching of the highlight scene half way.

Also, the ordering are previously given to both the sizes and the display positions as to the highlight screen and the received broadcast screen in the plural screen display operation. While the CM program is broadcasted, the order of the highlight screen is set to the high order, whereas the order of the received broadcast screen is set to the high order after the CM broadcast is ended.

As a consequence, while one member of an audience who wishes to watch the broadcast program in real time is treated with a top priority, a requirement of another member of the audience who wishes to watch a highlight scene completely can be met in the receiver of this fourteenth embodiment. It should also be noted that the ordering operation as to the highlight screen and the received broadcast screen may be made opposite to that of the above-explained example by manipulation from the audience.

[Fifteenth Embodiment]

Figure 34:
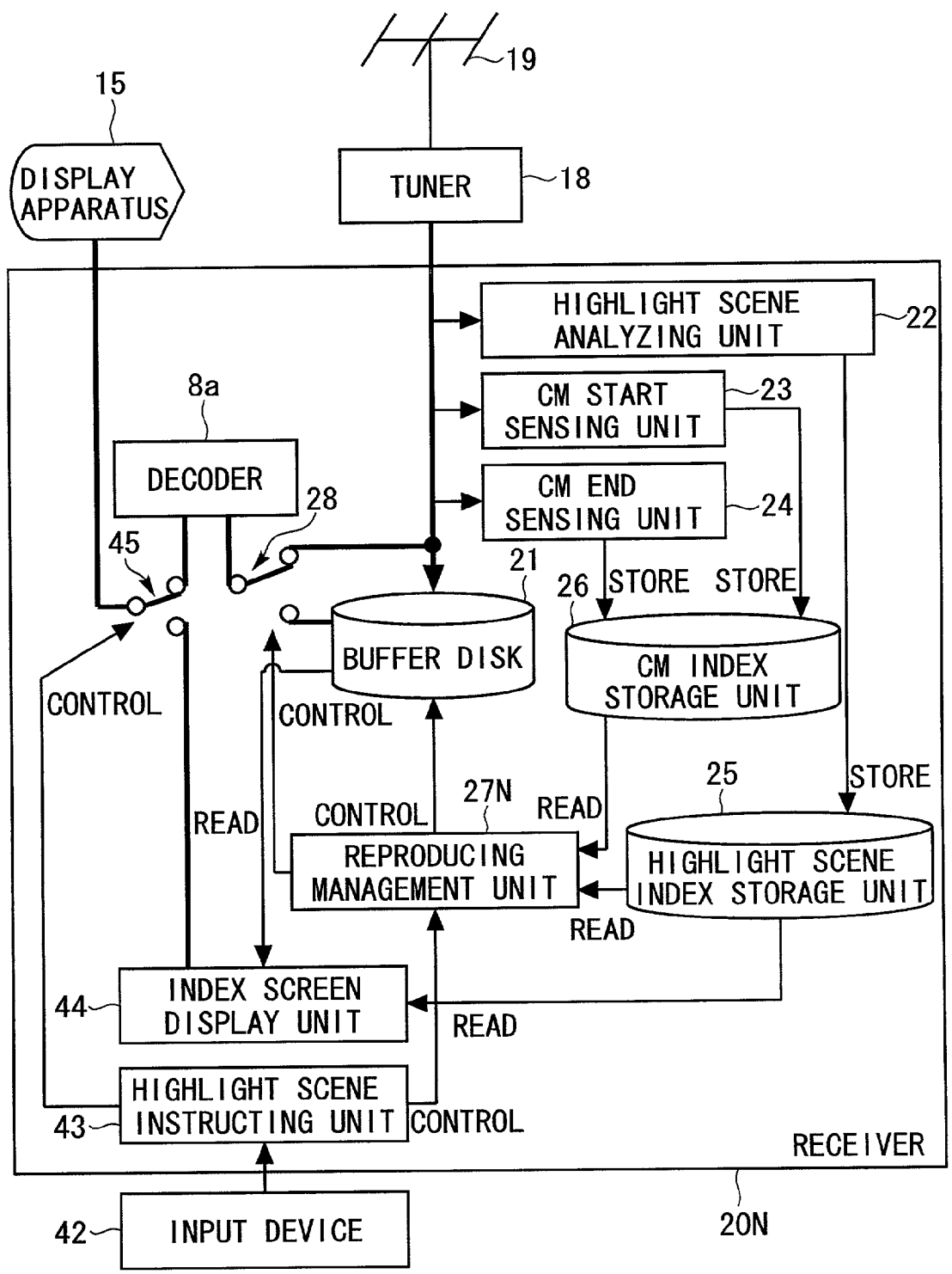
FIG. 34 is a functional block diagram of a broadcast receiver according to a 15th embodiment of the present invention.

Next, a description will now be made of a fifteenth embodiment of the present invention. A construction of a receiver according to the fifteenth embodiment may be realized by employing a similar construction of the first embodiment (see FIG. 1). FIG. 34 is a functional block diagram of a receiver 20N according to this fifteenth embodiment. The receiver 20N is arranged by adding an input device 42, an index screen display unit 44, a highlight scene instructing unit 43, and a switch 45 to the structural elements (see FIG. 2) of the first embodiment.

The index screen display unit 44 is such a function realized by executing a computer program by the CPU 2. The index screen display unit 44 reads a starting address of each highlight scene stored in the highlight index storage unit 25, reads a first scene of a highlight scene stored at this starting address from the buffer disk 21, and then, forms a still image indicative of the first scene of the highlight scene.

Then, the index screen display unit 44 saves the formed still image as an index, and outputs this saved index to the display apparatus 15. At this time, in such a case that the switch 45 is brought into such a switching state that the index screen display unit 44 is connected to the display apparatus 15, a still image of a single highlight scene, or still images of plural highlight scenes are displayed as an index screen (see FIG. 36) on the monitor of the display apparatus 15.

The input device 42 may be arranged by the pointing device such as the keyboard 16 and the mouse 17, a remote controller, or a microphone for processing a speech recognition of an audience and a speech recognizing apparatus. The input device 42 may be used so as to select a desirable highlight scene, while the audience refers to the index screen.

The highlight scene instructing unit 43 is such a function realized by executing a computer program by the CPU2. The highlight scene instructing unit 43 is initiated in such a case that the CM start sensing unit 23 senses the commencement of the CM broadcast. Then, the highlight scene instructing unit 43 switches the switch 45 to the switch side of the index screen display unit 44 so as to display an index screen on the display apparatus 15.

Thereafter, when a designation of a highlight scene is entered from the input device 42, the highlight scene instructing unit 43 controls the reproducing management unit 27N in order that this highlight scene is displayed on the display apparatus 15, and also switches the switch 45 to the side of the decoder 8a.

The reproducing management unit 27N receives the reproduction instruction of the highlight scene designated by the input device 42 from the highlight scene instruction unit 43. As a result, the reproducing management unit 27N inputs such broadcast data corresponding to the designated highlight scene into the decoder 8a in accordance with this reproduction instruction by way of the manner as explained in the first embodiment. As a consequence, the designated highlight scene is displayed on the monitor of the display apparatus 15.

The switch 45 owns a structure substantially equal to that of the switch 28. The highlight scene instructing unit 43 causes the switch 45 to be switched to any one switch side between the decoder 8a and the index screen display unit 44.

Figure 35:
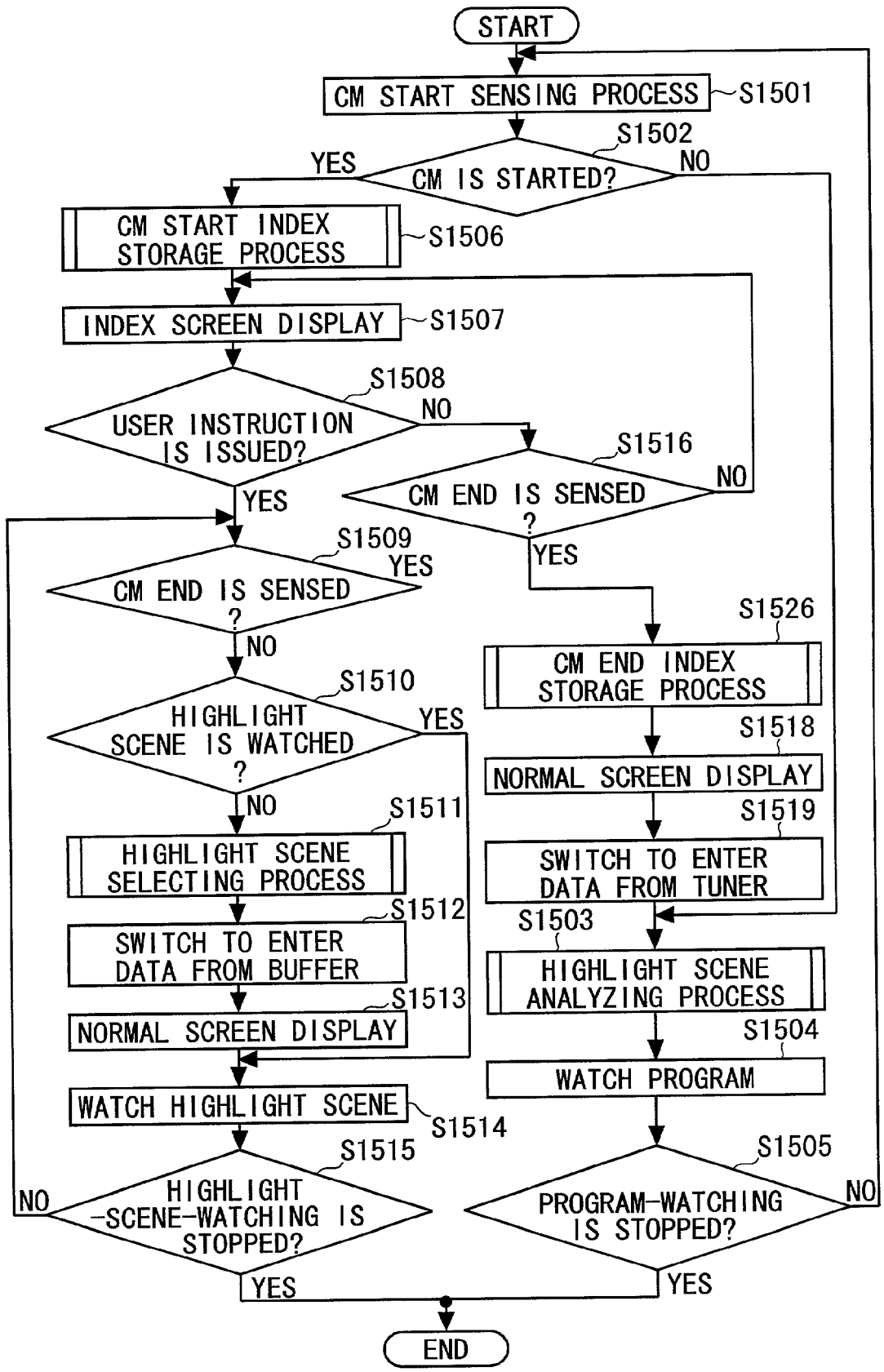
FIG. 35 is a flow chart for describing operations of the broadcast receiver according to the 15th embodiment.

FIG. 35 is a flow chart for describing process operations of the receiver 20N according to the 15th embodiment in the case that the receiver 20N receives broadcast data. Referring now to this flow chart of FIG. 35, a major operation executed in this receiver 20N will now be described.

At a step S1502 of FIG. 35, when it is so judged that a CM broadcast is not yet commenced, a highlight analyzing process operation (step S1503: see FIG. 6) is executed, and thereafter, an audience watches a broadcast program (step S1504). It should be understood that the process sequence of the steps S1503 and S1504 may be reversed, as compared with the above-explained process sequence. Next, when the audience continues to watch the broadcast program (step S1505; NO), this process operation is returned to the step S1501.

On the other hand, in such a case that a commencement of a CM broadcast is sensed (step S1502; YES), a CM start index storage process operation is carried out (step S1506; see FIG. 7(A)). Thereafter, an index screen display process operation is executed (step S1507). That is, an index screen is displayed on the display apparatus 15 by both the highlight scene instructing unit 43 and the index screen display unit 44.

When the index screen is displayed, this index screen is kept displayed until the audience (user) designates a highlight scene by manipulating the input device 42, or the CM broadcasting time range is ended (namely, loop process defined by steps S1507, S1508, and S516).

While the index screen is displayed, in the case that the audience designates (selects) the highlight scene (step S1508; YES), the designated highlight scene is reproduced by the reproducing management unit 27N until the end of the CM broadcast is sensed at the step S1509 (namely, loop process defined by steps S1509 to S1515). It should be noted that in FIG. 35, both the end sensing process operation (step S07 of FIG. 5) and the condition judging operation (step S08 of FIG. 5) are integrated with each other as steps S1509 and S1516.

In the loop process operation defined by the steps S1509 to S1515, when the highlight scene is not yet selected (step S1510; NO), a highlight selecting process operation is executed, and then, the designated highlight scene is selected (step S1511: see FIG. 8).

Thereafter, the switch 45 is switched from the broadcast data derived from the tuner 18 for the decoder 8a into the data derived from the buffer disk 21 (step 1512), and the screen display mode is returned from the index image display mode to the normal screen display mode in order that the audience watches the highlight scene (steps S1513 and S1514).

Thereafter, in the case that the end of the CM broadcast is sensed (step S1509; YES), a CM end index storage process operation (step 1517: see FIG. 7(B)) is carried out. Next, in the case that the index screen is displayed on the display apparatus 15, the index screen is switched to the normal screen (step S1518), and the switch 45 is switched from the broadcast data derived from the buffer disk 21 for the decoder 8a to the data derived from the tuner 18 (step S1519), and then, the present watching mode is advanced to the program watching mode (steps S1503 and S1504).

Figure 36:
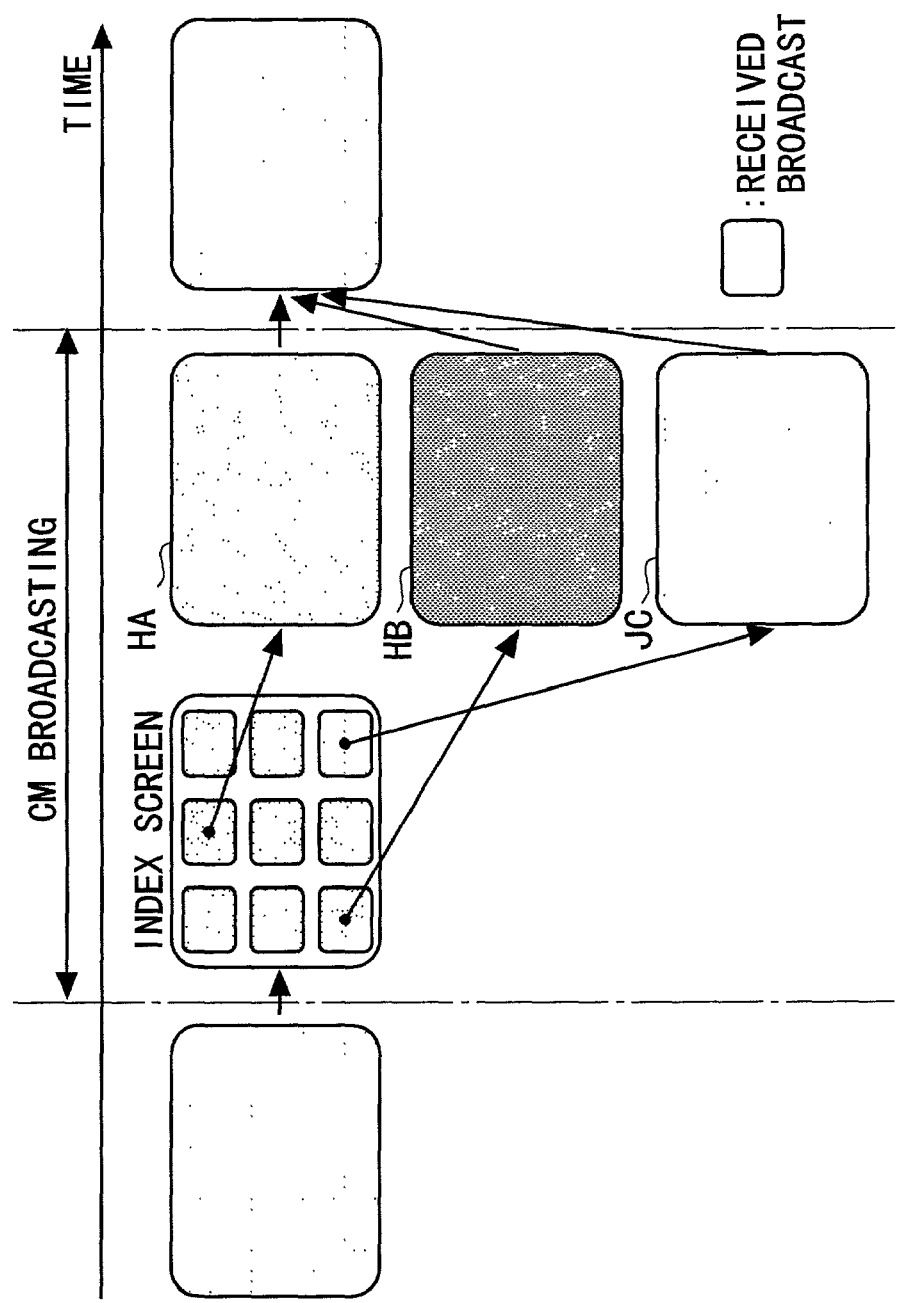
FIG. 36 is a diagram for indicating an example of a screen display image of the broadcast receiver according to the 15th embodiment.

FIG. 36 illustratively shows a screen display image of the monitor according to the 15th embodiment. As indicated in FIG. 36, just before the CM broadcast is commenced, the normal screen is displayed on the monitor. When the commencement of the CM broadcast is sensed, the normal screen is switched into an index screen. The index screen displays as an index, a still image of a head screen of such a highlight scene which is formed in the index screen display unit 44 (corresponding to index providing unit), and is selectable. The indexes are displayed on subdivided areas, for instance, which are produced by equally dividing the display area of the monitor.

While the audience refers to the indexes (still images) displayed on the index screen, if a desirable highlight scene is present, then the audience designates (selects) this desirable highlight scene by operating the input device 42. As a consequence, the index screen is switched to the normal screen, and thus, the selected highlight scene is displayed. In FIG. 36, symbols "HA" and "HB" correspond to the selected highlight scene.

To the contrary, as indicated in FIG. 36, an index of a received broadcast program which is selected when the audience wants to watch the CM program, or when the audience does not want to watch the highlight scene may be contained in the index screen.

As the index of the received broadcast, for instance, either a still image of a broadcast program appeared just before a CM broadcast is started, or another still image of the broadcast program appeared just after the CM broadcast is commenced may be formed by the index screen display unit 44 to be displayed. Alternatively, such a button used to select the received broadcast may be displayed as an index of this received broadcast.

In the case that the index of the received broadcast is selected, the switch 28 is switched to the side of the tuner 18, and also the switch 45 is switched to the side of the decoder 8a. As a result, the index screen is switched to the normal screen, and the CM broadcast is displayed on the monitor. In other words, the CM program maybe provided with the audience in real time. Thereafter, when the CM broadcast is ended, the broadcast program may be continuously provided with the audience.

In accordance with the 15th embodiment, while the index screen of the highlight scene is displayed, when the audience selects a desirable highlight scene, this selected desirable highlight scene is reproduced. As a result, since the audience can watch the desirable highlight scene, the CM broadcasting time range can be more effectively utilized, as compared with that of other embodiments. Also, in such a case that such a desirable highlight scene is not contained in the index screen, the audience may watch the CM broadcast by selection on watching of the received broadcast.

It should be noted that in the 15th embodiment, the still image is employed as the index of the highlight scene. This index may be realized by such a text indicative of a content of the highlight scene. Also, as indicated in FIG. 36, the index screen is not displayed on the area obtained by equally subdividing the index, but may be displayed in a list form.

In the flow chart shown in FIG. 35, in such a case that the length of the selected highlight scene is shorter than the CM broadcasting time range, after the reproducing operation of the selected highlight scene has been completed, the selected highlight scene is reproduced by the reproducing management unit 27 until the CM broadcasting time range is ended. To the contrary, in the case that the reproducing operation of the selected highlight scene is accomplished before the CM broadcasting time range is ended, the index screen may be displayed again.

[Sixteenth Embodiment]

Next, a description will now be made of a 16th embodiment of the present invention. A construction of a receiver according to the 16th embodiment is substantially same as that of the sixth embodiment (see FIG. 1). It should be understood that in the receiver of the 16th embodiment, a digest of the broadcast program which has been so far watched by an audience is reproduced after one broadcast program has been ended until another broadcast program subsequent to the above-mentioned broadcast program is commenced.

A recognition of a program end and a program start is carried out in accordance with the below-mentioned manner. That is, for instance, there is such a service that program information (broadcast program: "electronic program list") is provided via the Internet and the like. The data related to a starting time instant and also an end time instant of a program are acquired by utilizing this service. Then, both the program end time instant and the program starting time instant can be recognized by using these data. An electronic program list is referred to as an "EPG (Electronic Program Guide)", and is contained in broadcast electromagnetic waves in the BS digital broadcasting system. Alternatively, an audience may manually input a broadcast program (program starting time instant and program end time instant) into the receiver.

In such a case that a broadcast program is arranged by entering combined CM programs after this broadcast program is accomplished, if total time of the CM programs is counted from a starting time instant of this broadcast program, since a CM insertion ratio with respect to the broadcast program is determined. Accordingly, a time duration of the CM programs which are inserted into the broadcast program after this program is ended until the next program is commenced can be calculated backward.

The digest may be formed by coupling the program digests which are explained in the sixth embodiment. In such a case that the length of the digest is desired to be adjusted to be equal to the time duration up to the next program, for example, as previously explained in the eighth embodiment, the following length adjusting method may be employed. That is, while the importance degrees are allocated to the respective program digests, the program digests having the higher importance degrees are sequentially selected, and the selected program digests are coupled to each other. As a result, the length of the coupled program digests is adjusted in such a manner that the length of the digest is made equal to the length of the CM broadcasting time range between the two continuous broadcast programs.

Figure 37:
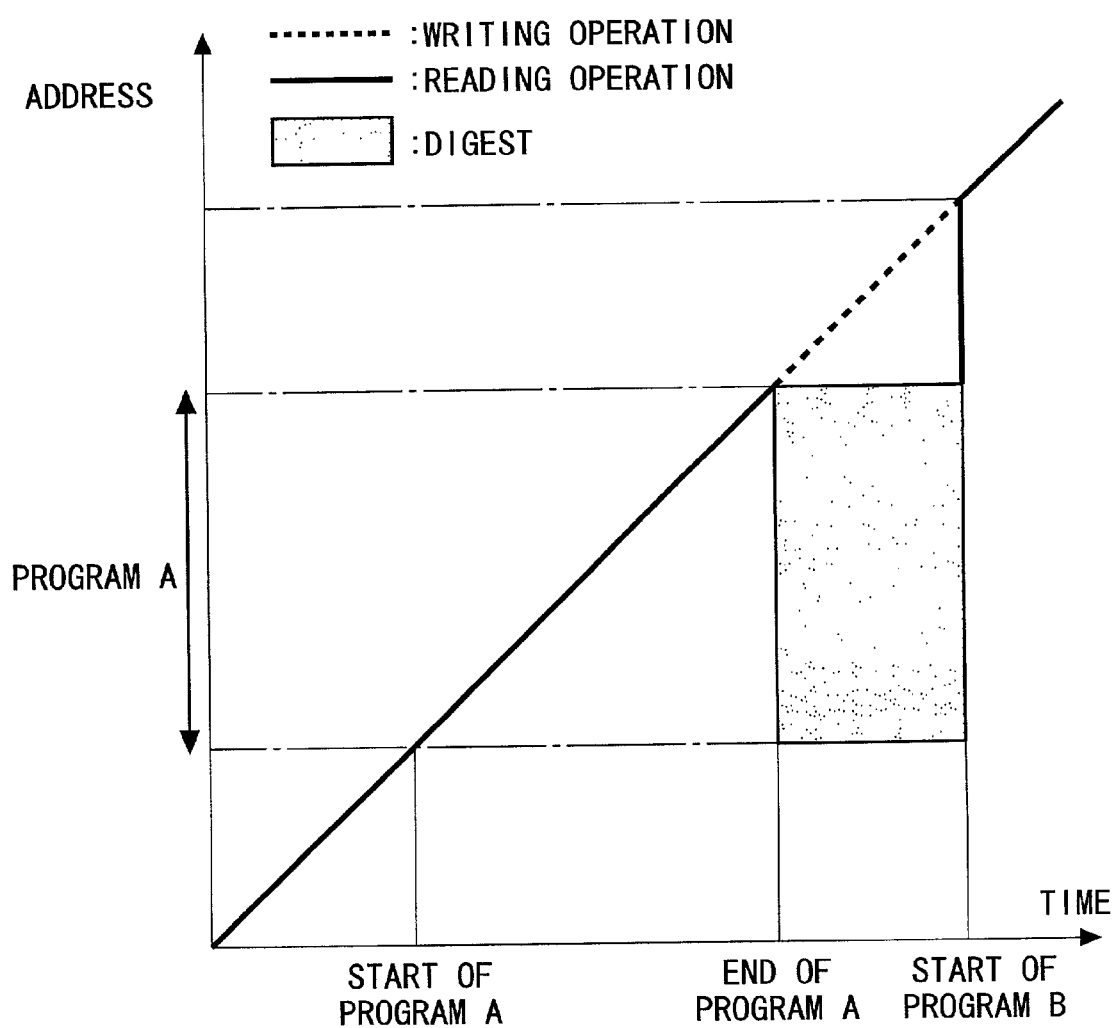
FIG. 37 is a diagram for showing a relationship between a write address and a read address with respect to a buffer disk employed in a broadcast receiver according to a 16th embodiment of the present invention.

FIG. 37 is a diagram for indicating a relationship between a write address and a read address to a buffer disk in the receiver of the 16th embodiment. In FIG. 37, during from when a program "A" is accomplished until a program "B" is commenced, a digest of the program "A" which has been so far watched is reproduced. At a time instant when the commencement of the program "B" is sensed, the present watching mode is returned to the program watching mode.

In accordance with the 16th embodiment, in the CM broadcasting time range between the two continuous programs, the digest of the broadcast program, which has been broadcasted just before this CM broadcasting time range, is reproduced. As a result, the audience can watch the digest of such a broadcast program which has been watched after one broadcast program is ended and until the next broadcast program is commenced.

As a consequence, the audience can take another look as to feelings of the program. For example, when the audience is impressed with the broadcast program, this audience can be deeply impressed with this broadcast program by watching the digest of this program. Otherwise, by watching the digest of the program, the audience can furthermore have a deep understanding of the story of the program, and thus, this audience may have other feelings different from the feelings with respect to this broadcast.

It should be understood that the CM end sensing unit 24 for sensing the end of the CM broadcast is employed in the above-explained first to 16th embodiments. Instead of this CM end sensing unit 24, a time measuring unit (timer) may be employed. This time measuring unit is operated as follows. When a predetermined time duration has passed after a commencement of a CM broadcast is sensed, the present watching mode is automatically transferred to the program watching mode. When such a time measuring unit is employed, the arrangement of the receiver can be made simpler. Moreover, if the CM broadcasting time range is previously grasped, then the CM programs can be completely cut.

It should also be noted that the arrangements of the receivers as explained in the first to 16th embodiments may be properly combined with each other.

In the broadcast receiver, the broadcast control method, and the recording medium for recording thereon the computer program, according to the present invention, the audience need not perform the zapping operation. Therefore, it is possible to avoid such a problem that the audience may loose his interests as to the broadcast program even in the CM broadcasting time range contained in this broadcast program.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A broadcast receiver to receive broadcast data, comprising:
   a highlight scene detecting unit detecting a highlight scene of a broadcasted program;
   a store unit storing at least said detected highlight scene of said program into a storage device, the storage device storing thereinto a data portion of the broadcast data corresponding to a predetermined time duration at any time;
   a CM detecting unit detecting a CM (commercial message) broadcast program; and
   a reproducing control unit reproducing said highlight scene stored in said storage device while said CM program is broadcasted, and reproducing, in such a case that when the reproduction of the highlight scene has not yet completed by end of the CM broadcast, such broadcast data, that appeared just after said CM broadcast ended, after the reproduction of said highlight scene has been completed.

2. A broadcast receiver as claimed in claim 1 wherein: said CM detecting unit includes:
   a CM start detecting unit detecting a commencement of said CM broadcast; and
   when said CM broadcast is commenced, the reproduction of said highlight scene is commenced.

3. A broadcast receiver as claimed in claim 1 wherein: the reproduced highlight scene is provided with an audience instead of said CM broadcast program.

4. A broadcast receiver as claimed in claim 1 wherein: the reproduced highlight scene is provided with an audience in conjunction with said CM broadcast program.

5. A broadcast receiver as claimed in claim 1 wherein: said highlight scene detecting unit detects the highlight scene based upon an index indicative of the highlight scene contained in broadcast data of said broadcast program.

6. A broadcast receiver as claimed in claim 1 wherein: said highlight scene detecting unit detects the highlight scene in response to an instruction issued from the audience.

7. A broadcast receiver as claimed in claim 1 wherein: in such a case that when the broadcast data is reproduced, a next CM broadcast is commenced, if a time difference between a broadcast time instant and a reproduction time instant exceeds broadcast time of the next CM broadcast program, said reproducing control unit continues to reproduce said broadcast data without executing the reproduction of said highlight scene.

8. A broadcast receiver as claimed in claim 1 wherein: said reproducing control unit reproduces a program digest constructed of a plurality of highlight scenes as said highlight scene.

9. A broadcast receiver as claimed in claim 1 wherein: said storage device stores thereinto a data portion of the broadcast data corresponding to a predetermined time duration at any time; and
   when the CM broadcast is commenced, said reproducing control unit reproduces, as said highlight scene, a broadcast data portion which is stored in said storage device and is defined as from a time instant when the CM broadcast is started and until a preselected time duration is retraced.

10. A broadcast receiver as claimed in claim 1 wherein: said storage device stores thereinto a plurality of highlight scenes to which importance degrees are allocated respectively; and
   said reproducing control unit reproduces a highlight scene at a speed corresponding to an importance degree thereof.

11. A broadcast receiver as claimed in claim 1 wherein: said reproducing control unit reproduces a still image as the highlight scene.

12. A broadcast receiver as claimed in claim 1 wherein: said broadcast program contains first speech (voice) and second speech (voice); and
   said broadcast receiver is further comprised of:
   speech control means for providing any one of said first speech and said second speech when the broadcast program is provided in connection with a broadcast time instant; and also for switching the provided speech to the other of said first speech and said second speech when the highlight scene is reproduced.

13. A broadcast receiver as claimed in claim 1 wherein: said reproducing control unit reproduces such a highlight scene having a length which is made coincident with broadcast time of a CM program inserted into the broadcast program.

14. A broadcast receiver as claimed in claim 1 wherein: said broadcast receiver is further comprised of:
   a highlight scene classifying unit classifying the highlight scenes stored in said storage device into plural sorts of classifications; and
   said reproducing control unit reads out such a highlight scene having a sort corresponding to a taste of an audience with having a top priority from said storage device to reproduce the read highlight scene in such a case that the CM broadcast is commenced.

15. A broadcast receiver as claimed in claim 4, further comprising:
   a display control unit displaying at the same time, both an image of broadcast data in response to a broadcast time instant and an image of a reproduced highlight scene on a single display screen.

16. A broadcast receiver as claimed in claim 15 wherein: said display control unit changes any one of sizes and display positions with respect to said display screen as to both a display area for said image of the broadcast data and a display area for said image of the highlight scene in the case that the CM broadcast is ended.

17. A broadcast receiver as claimed in claim 2 wherein: said storage device stores thereinto any one of a single set and plural sets of highlight scenes; and
   said broadcast receiver is further comprised of:
   an index providing unit providing an index used to select a desirable highlight scene when the CM broadcast is commenced.

18. A broadcast receiver as claimed in claim 1 wherein: said reproducing control unit reproduces any one of the highlight scene and a digest constituted of plural highlight scenes of a certain broadcast program during a time period defined after said certain broadcast program is ended and until a next broadcast program is commenced.

19. A method of controlling broadcast data comprising:
detecting a highlight scene of a broadcasted program;
storing at least said detected highlight scene of said program and a data portion of the broadcast data corresponding to a predetermined time duration at any time into a storage device;
detecting a CM (commercial message) broadcast program; and
reproducing said highlight scene stored in said storage device while said CM program is broadcasted, and reproducing such broadcast data that appeared just after said CM broadcast is ended after the reproduction of said highlight scene has been completed in such a case when the CM broadcast is ended and the reproduction of the highlight scene has not yet completed.

20. A broadcast control method as claimed in claim 19 further comprising:
detecting a commencement of said CM broadcast; and commencing the reproduction of said highlight scene when said CM broadcast is commenced.

21. A broadcast control method as claimed in claim 19 further comprising:
providing the reproduced highlight scene with an audience instead of said CM broadcast program.

22. A broadcast control method as claimed in claim 19 further comprising:
providing the reproduced highlight scene with an audience in conjunction with said CM broadcast program.

23. A broadcast control method as claimed in claim 19 further comprising:
detecting the highlight scene based upon an index indicative of the highlight scene contained in broadcast data of said broadcast program.

24. A broadcast control method as claimed in claim 19 further comprising:
detecting the highlight scene in response to an instruction issued from the audience.

25. A broadcast control method as claimed in claim 19 further comprising:
commencing a next CM broadcast if a time difference between a broadcast time instant and a reproduction time instant exceeds broadcast time of the next CM broadcast program in such a case that when the broadcast data is reproduced, and
continuing the reproduction of said broadcast data without executing the reproduction of said highlight scene.

26. A broadcast control method as claimed in claim 19 wherein:
said highlight scene is a program digest constructed of a plurality of highlight scenes.

27. A broadcast control method as claimed in claim 19 further comprising:
storing a data portion of the broadcast data corresponding to a predetermined time duration at any time into said storage device; and
reproducing a broadcast data portion which is stored in said storage device, and is defined from a time instant when the CM broadcast is started and until a preselected time duration is retraced when the CM broadcast is commenced, as said highlight scene.

28. A broadcast control method as claimed in claim 19 further comprising:
storing a plurality of highlight scenes to which importance degrees are allocated respectively into said storage device; and
reproducing a highlight scene at a speed corresponding to an importance degree thereof.

29. A broadcast control method as claimed in claim 19 further comprising:
reproducing a still image as the highlight scene.

30. A broadcast control method as claimed in claim 19 wherein:
said broadcast program contains first speech (voice) and second speech (voice); and
any one of said first speech and said second speech is provided when the broadcast program is provided in connection with a broadcast time instant; and also the provided speech is switched to the other of said first speech and said second speech when the highlight scene is reproduced.

31. A broadcast control method as claimed in claim 19 wherein:
said highlight scene owns a length which is made coincident with broadcast time of a CM program inserted into the broadcast program.

32. A broadcast control method as claimed in claim 19 further comprising:
classifying the highlight scenes stored in said storage device into plural sorts of classifications;
reading such a highlight scene having a sort corresponding to a taste of an audience with a top priority from said storage device in such a case that the CM broadcast is commenced; and
reproducing the read highlight scene.

33. A broadcast control method as claimed in claim 22 further comprising:
simultaneously displaying both an image of broadcast data in response to a broadcast time instant and an image of a reproduced highlight scene on a single display screen.

34. A broadcast control method as claimed in claim 33 further comprising:
changing any one of sizes and display positions with respect to said display screen as to both a display area for said image of the broadcast data and a display area for said image of the highlight scene in the case that the CM broadcast is ended.

35. A broadcast control method as claimed in claim 19 further comprising:
storing any one of a single set and plural sets of highlight scenes into said storage device; and
providing an index used to select a desirable highlight scene with the audience when the CM broadcast is commenced.

36. A broadcast control method as claimed in claim 19 further comprising:
reproducing any one of the highlight scene and a digest constituted of plural highlight scenes of a certain broadcast program during a time period defined after said certain broadcast program is ended and until a next broadcast program is commenced.

37. A recording medium for recording thereon a program used to cause a computer to execute a process of controlling broadcast data, comprising:
a step for detecting a highlight scene of a broadcasted program;
a step for storing at least said detected highlight scene of said program and temporarily storing thereinto a data portion of the broadcast data corresponding to a predetermined time duration into a storage device;

a step for detecting a CM (commercial message) broadcast program; and a step for reproducing said highlight scene stored in said storage device while said CM program is broadcasted, and reproducing such broadcast data that appeared just after said CM broadcast is ended after the reproduction of said highlight scene has been completed in such a case when the CM broadcast is ended and the reproduction of the highlight scene has not yet completed.

38. A computer readable recording medium as claimed in claim 37 wherein:

said CM broadcast detecting step detects a commencement of the CM broadcast; and said program is further comprised of:

a step for starting the reproduction of said highlight scene when said CM broadcast is commenced.

39. A computer readable recording medium as claimed in claim 37 wherein:

said program is further comprised of a step for providing the reproduced highlight scene with an audience instead of said CM broadcast program.

40. A computer readable recording medium as claimed in claim 37 wherein:

said program is further comprised of a step for providing the reproduced highlight scene with an audience in conjunction with said CM broadcast program.

41. A computer readable recording medium as claimed in claim 37 wherein:

in said highlight scene detecting step, the highlight scene is detected based upon an index indicative of the highlight scene contained in broadcast data of said broadcast program.

42. A computer readable recording medium as claimed in claim 37 wherein:

in said highlight scene detecting step, the highlight scene is detected in response to an instruction issued from the audience.

43. A computer readable recording medium as claimed in claim 37 wherein:

in such a case that when the broadcast data is reproduced, a next CM broadcast is commenced, if a time difference between a broadcast time instant and a reproduction time instant exceeds broadcast time of the next CM broadcast program, said program continues to reproduce said broadcast data without executing the reproduction of said highlight scene.

44. A computer readable recording medium as claimed in claim 37 wherein:

said program reproduces a program digest constructed of a plurality of highlight scenes as said highlight scene.

45. A computer readable recording medium as claimed in claim 37 wherein:

said storage device stores thereinto a data portion of the broadcast data corresponding to a predetermined time duration at any time; and when the CM broadcast is commenced, said program reproduces as said highlight scene, a broadcast data portion which is stored in said storage device, and is defined from a time instant when the CM broadcast is started and until a preselected time duration is retraced.

46. A computer readable recording medium as claimed in claim 37 wherein:

said storage device stores thereinto a plurality of highlight scenes to which importance degrees are allocated respectively; and said program reproduces a highlight scene at a speed corresponding to an importance degree thereof.

47. A computer readable recording medium as claimed in claim 37 wherein:

said program reproduces a still image as the highlight scene.

48. A computer readable recording medium as claimed in claim 37 wherein:

said broadcast program contains first speech (voice) and second speech (voice); and said program provides any one of said first speech and said second speech when the broadcast program is provided in connection with a broadcast time instant; and also switches the provided speech to the other of said first speech and said second speech when the highlight scene is reproduced.

49. A computer readable recording medium as claimed in claim 37 wherein:

said program contains such a highlight scene having a length which is made coincident with broadcast time of a CM program inserted into the broadcast program.

50. A computer readable recording medium as claimed in claim 37 wherein:

said program is further comprised of:

a step for classifying the highlight scenes stored in said storage device into plural sorts of classifications; and said program reads out such a highlight scene having a sort corresponding to a taste of an audience with having a top priority from said storage device to reproduce the read highlight in such a case that the CM broadcast is commenced.

51. A computer readable recording medium as claimed in claim 40 wherein:

a step for displaying at the same time, both an image of broadcast data in response to a broadcast time instant and an image of a reproduced highlight scene on a single display screen.

52. A computer readable recording method as claimed in claim 51 wherein:

said program changes any one of sizes and display positions with respect to said display screen as to both a display area for said image of the broadcast data and a display area for said image of the highlight scene in the case that the CM broadcast is ended.

53. A computer readable recording medium as claimed in claim 37 wherein: said storage device stores thereinto any one of a single set and plural sets of highlight scenes; and said program is further comprised of:

a step for providing an index used to select a desirable highlight scene when the CM broadcast is commenced.

54. A computer readable recording medium as claimed in claim 37 wherein:

said program reproduces any one of the highlight scene and a digest constituted by plural highlight scenes of a certain broadcast program during a time period defined after said certain broadcast program is ended and until a next broadcast program is commenced.

* * * * *